US00RE37571E

(19) United States
(12) Reissued Patent
Funke et al.

(10) Patent Number: US RE37,571 E
(45) Date of Reissued Patent: Mar. 5, 2002

(54) SUBSCRIBER RF TELEPHONE SYSTEM HAVING DISTRIBUTED CHANNEL SWITCHING CAPABILITY

(75) Inventors: Klaus E. Funke; Helena W. Roth, both of San Rafael; Kevin A. Jaeger, Glen Ellen; William S. Tighe, Santa Rosa; James L. Horn, Penn Grove, all of CA (US); Lie Gendo, Jakarta Barat; Hardianto Kamarga, Jakarta Selatan, both of (ID); Walter E. Noller, Sebastopol, CA (US)

(73) Assignee: Nusantara Communications, Inc., Petaluma, CA (US)

(21) Appl. No.: 09/579,375

(22) Filed: May 23, 2000

(Under 37 CFR 1.47)

Related U.S. Patent Documents

Reissue of:
(64) Patent No.: 5,845,201
Issued: Dec. 1, 1998
Appl. No.: 08/270,027
Filed: Jul. 1, 1994

(51) Int. Cl.[7] ..... H04Q 7/20
(52) U.S. Cl. ..... 455/403; 340/825.17
(58) Field of Search ..... 455/403, 450, 455/426, 434; 340/825.17; 375/220; 359/172

(56) References Cited

U.S. PATENT DOCUMENTS 3,562,431 A * 2/1971 Inose et al.
3,806,663 A * 4/1974 Peek et al.
4,675,863 A * 6/1987 Paneth et al.
4,737,976 A * 4/1988 Borth et al.
4,817,089 A * 3/1989 Paneth et al.
4,912,705 A * 3/1990 Paneth et al.
4,912,756 A * 3/1990 Hop ..... 379/60
4,922,517 A * 5/1990 West, Jr. et al.
4,955,050 A * 9/1990 Yamauchi
5,003,629 A * 3/1991 Ness-Cohn et al.
5,031,204 A * 7/1991 McKernan
5,050,189 A * 9/1991 Cox et al.
5,068,916 A * 11/1991 Harrison et al.
5,105,197 A * 4/1992 Clagett
5,121,391 A * 6/1992 Paneth et al.

(List continued on next page.)

*Primary Examiner*—William D. Cumming
(74) *Attorney, Agent, or Firm*—Cooley Godward LLP

(57) ABSTRACT

A radio communication system for processing information signals received from telephone trunk lines for transmission over a plurality of RF subscriber channels is disclosed. The system includes a network interface exchange for sampling the received information signals and sequentially combining the resultant plurality of sampled information signals into one or more multiplexed transmit channel bit streams. The network interface exchange includes a processor for assigning a first of the sampled information signals from one of the trunk lines to an available repetitive slot position of a first of the transmit channel bit streams provided to a first destination node associated with the first of the sampled information signals, the first destination node being determined in accordance with subscriber unit identification information received over the trunk line. A transmitter transmits a forward interface signal to the first destination node over a network interface channel in response to the first multiplexed channel bit stream. The system includes a remote telephone exchange, in RF communication with the network interface exchange over the network interface channel, corresponding to the first destination node and located distal from the network interface exchange. The remote telephone exchange extracts the first sampled information signal from the forward interface signal, generates a first subscriber signal, transmits the first subscriber signal over the first RF subscriber channel to a first subscriber unit, and can route reverse link signals from the first subscriber unit to a second destination node independently of the network interface exchange.

12 Claims, 47 Drawing Sheets

U.S. PATENT DOCUMENTS 5,128,959 A * 7/1992 Bruckert et al.
RE34,034 E * 8/1992 O'Sullivan
5,321,542 A * 6/1994 Freitas et al.
5,321,740 A * 6/1994 Gregorek et al.
5,349,632 A * 9/1994 Nagashima
5,381,459 A * 1/1995 Lappington
5,539,388 A * 7/1996 Modgil
5,784,693 A * 7/1998 Barber et al. ..... 455/434
5,884,165 A * 3/1999 Uchida et al. ..... 455/426
5,898,927 A * 4/1999 Ishii et al. ..... 455/450

* cited by examiner

KEY:
1 THRU 5: ITS to CC or PSTN to CC
6 THRU 8: CC to OUTBOUND RTC

KEY:
1,6,7: INBOUND RTC to CC
2 THRU 5, 8: CC to OUTBOUND RTC

KEY:
1, 10 THRU 12: INBOUND RTC to CC
2 THRU 9: CC to ITS
2, 3, 8, 9: CC to PSTN

KEY:
1, THRU 3, 8, 12: CC TO OUTBOUND RTC
4 THRU 7, 9 THRU 10: INBOUND CALLING PARTY TO CC

Key:
CALL TO ITS
1, 3 THRU 5: SUCCESSFUL CALL
CALL TO PSTN:
1 THRU 4: SUCCESSFUL CALL

SUBSCRIBER RF TELEPHONE SYSTEM HAVING DISTRIBUTED CHANNEL SWITCHING CAPABILITY

Matter enclosed in heavy brackets [ ] appears in the original patent but forms no part of this reissue specification; matter printed in italics indicates the additions made by reissue.

The present invention relates generally to trunked radio telephone systems and, more particularly, to a subscriber telephone system for providing multiple information signals simultaneously over at least one radio-frequency (RF) channel.

BACKGROUND OF THE INVENTION

Many developing countries have begun to investigate the possibility of providing telephone service to a larger percentage of their respective citizenry. In many developing countries the number of telephones per person (telephone density) in rural regions is typically only one-fifth to one-tenth of the telephone densities characteristic of urban areas. For example, telephone densities in China's urban centers typically exceed 30 telephones per 1,000 population, while telephone density in China's rural areas is roughly 4 telephones per 1,000 population.

In order to improve service to rural areas may developing countries have attempted to identify telephone systems enabling cost-effective switching, transmission and distribution suitable for the low-capacity requirements of rural installation. At the same time, however, it is desired that the system by expandable to accommodate higher traffic, a larger subscriber base, and allow for advance billing and data communication functions to be supported as rural areas develop.

Radio equipment has been used, particularly in rural areas, for providing telephone service to a distributed set of users. The highly variable distribution requirements of the rural networks in developing countries has spurred efforts to develop cost-effective radio telephone systems. Radio transmission offers several advantages relative to communication facilitated by satellite or cable networks. For example, it may be impractical to bury cable in regions having uncultivable (e.g., rocky or hardpan) soil, and aerial cable has proven to be relatively costly to install and maintain. In contrast, the cost of microwave radio links is relatively insensitive to distance due to the extended coverage capability afforded to repeater stations.

Satellite telephone systems are often used to service remote rural areas, or to provide service over wide geographic regions of diffuse subscriber concentration. However, a minimum number of subscribers is required to justify the significant investment required by the provision of satellite base stations and related facilities. Low-capacity radio links can be a less expensive alternative to satellite systems when providing service to remote areas (e.g., islands) with relatively low levels of telephone traffic. Moreover, radio links can meet the transmission demands of low-density demand pockets, particularly those located off of larger-demand routes.

In trunked radio communication systems a number of radio users (subscribers) share a group of communication channels, where typically each user will require a channel for only a small percentage of the time. A base station serves as an exchange between the subscribers and a set of dedicated lines, i.e., trunks, from the public network. Subscribers may use mobile or portable two-way and fixed base communication modules, with radio repeaters generally being used to provide the communication channels over an extended range. Conventional repeaters do not perform any call switching functions, but rather merely relay information signals linearly between subscribers and the base station. It follows that when one subscriber desires to communication with another located nearby, the call must nonetheless be transmitted to the base station and rebroadcast to the intended recipient subscriber. Accordingly, a radio telephone system operative to provide localized call routing among proximately located subscribers would allow a base station of a given traffic capacity to service a larger number of subscribers.

Each repeater unit within trunked systems, typically receives communication signals from subscriber units on a first path, and rebroadcasts the signals at higher power on a second path to other subscriber units. Trunking systems generally use different assigned frequencies for these simultaneous paths. Each pair of frequencies assigned to a repeater unit constitutes one of the several communication channels of the trunked system. Channels carrying voice and other message communications are known as information channels, those carrying signal and control information are known as control channels.

In trunked systems it is often necessary that a user desiring to communicate first request permission to access the group of channels and then wait for permission and for an assignment to a particular channel. In transmission-trunking systems a user retains his channel assignment for only a single transmission, while in message-trunking systems the channel is retained until an entire message comprising multiple transmissions is completed. Because trunked systems involve sharing resources, subscribers must often wait for availability of information channels. The trunk controller responds to a request for channel with a busy signal and notifies the subscriber when a channel later becomes available. Upon notification of channel availability the subscriber may be allowed only a brief response interval to claim the assigned channel. This procedure is not only inconvenient, but also leads to subscriber access delays and to the consumption of communications resources during the response interval.

Access to the public telephone network from a trunked system requires a call origination procedure. One procedure often used is for a radio subscriber to place a request for a channel capable of providing interconnection to the public network. When such a channel becomes available, the controller grants permission to use it and generates a dial tone. The radio subscriber originates the call by transmitting tone or data signalling information, which couples to the public network. The radio subscriber hears busy tones or ringing tones and eventually becomes connected with the requested party or terminates his call attempt.

In conventional trunked systems the inbound and outbound frequencies associated with a given channel are typically assigned simultaneously and maintained for the duration of a conversation. This is so even though the radio subscriber typically cannot make use of them simultaneously. That is, while transmitting the radio subscriber does not hear, and cannot be interrupted, by a party from the public network. Such unnecessary assignment of paired frequencies removes resources from the collection of frequencies available to interconnect calls.

Many existing trunked radio telephone systems are designed to be in conformance with standards derived from recommendations made by the International Telecommunications Union (ITU). One objective of the ITU is to promote adherence to a universal set of equipment interface conventions. Widespread compliance with the body of recommendations promulgated by the ITU enables interoperability between radio and telephone equipment, particularly when crossing of international boundaries is involved. Under the ITU recommendations standard interfaces are to be provided for each manufactured equipment component. Hence, radio telephone systems are generally composed of a collection of "stand-alone" components, each disposed to communicate using a prescribed public domain protocol. Unfortunately, the need for standard interfaces to facilitate compatibility between stand-alone components tends to increase the cost of the radio telephone networks in which such components are incorporated.

OBJECTS OF THE INVENTION

Accordingly, it is an object of the present invention to provide a radio telephone system employing a channel allocation procedure which obviates the need for subscribers to wait for a particular channel assignment prior to generation of a dial tone.

It is a further object of the present invention that such a radio telephone system efficiently assign the available frequency band to requesting subscribers.

It is yet another object of the present invention to provide a radio telephone system which is compatible with accepted public domain protocol, but in which the constituent network components are not each required to be supplied with a standard interface capable of supporting such a protocol.

A still further object of the present invention is to provide a radio telephone system operative to provide localized call routing among proximately located subscribers.

SUMMARY OF THE INVENTION

In summary, the present invention comprises a radio communication system for processing information signals received from telephone trunk lines for transmission over a plurality of RF subscriber channels. The system includes a network interface exchange for sampling the received information signals and for sequentially combining the resultant plurality of sampled information signals into a multiplexed transmit channel bit stream, each of the sampled information signals occupying a repetitive slot position in the multiplexed transmit channel bit stream. The network interface exchange further includes a processor for assigning a first of the sampled information signals from one of the trunk lines to the repetitive slot position corresponding to a first of the RF subscriber channels associated with a call request signal received over the one trunk line.

A transmitter is provided for transmitting a forward interface signal over a network interface channel in response to the multiplexed channel bit stream. The system further includes a remote telephone exchange, in RF communication with the network interface exchange over the network interface channel, for extracting the first sampled information signal from the forward interface signal. The remote telephone exchange also generates a first subscriber signal on the basis of the extracted first sampled information signal, and transmits the first subscriber signal over the first RF subscriber channel to a first intelligent subscriber unit.

In a preferred embodiment the call request signal has accompanied therewith a subscriber identification signal associated with the first intelligent subscriber unit. The network interface exchange processor assigns the first sampled information signal to the repetitive slot position corresponding to the first RF subscriber channel at least partially on the basis of the subscriber identification signal.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

I. System Overview

Figure 1:
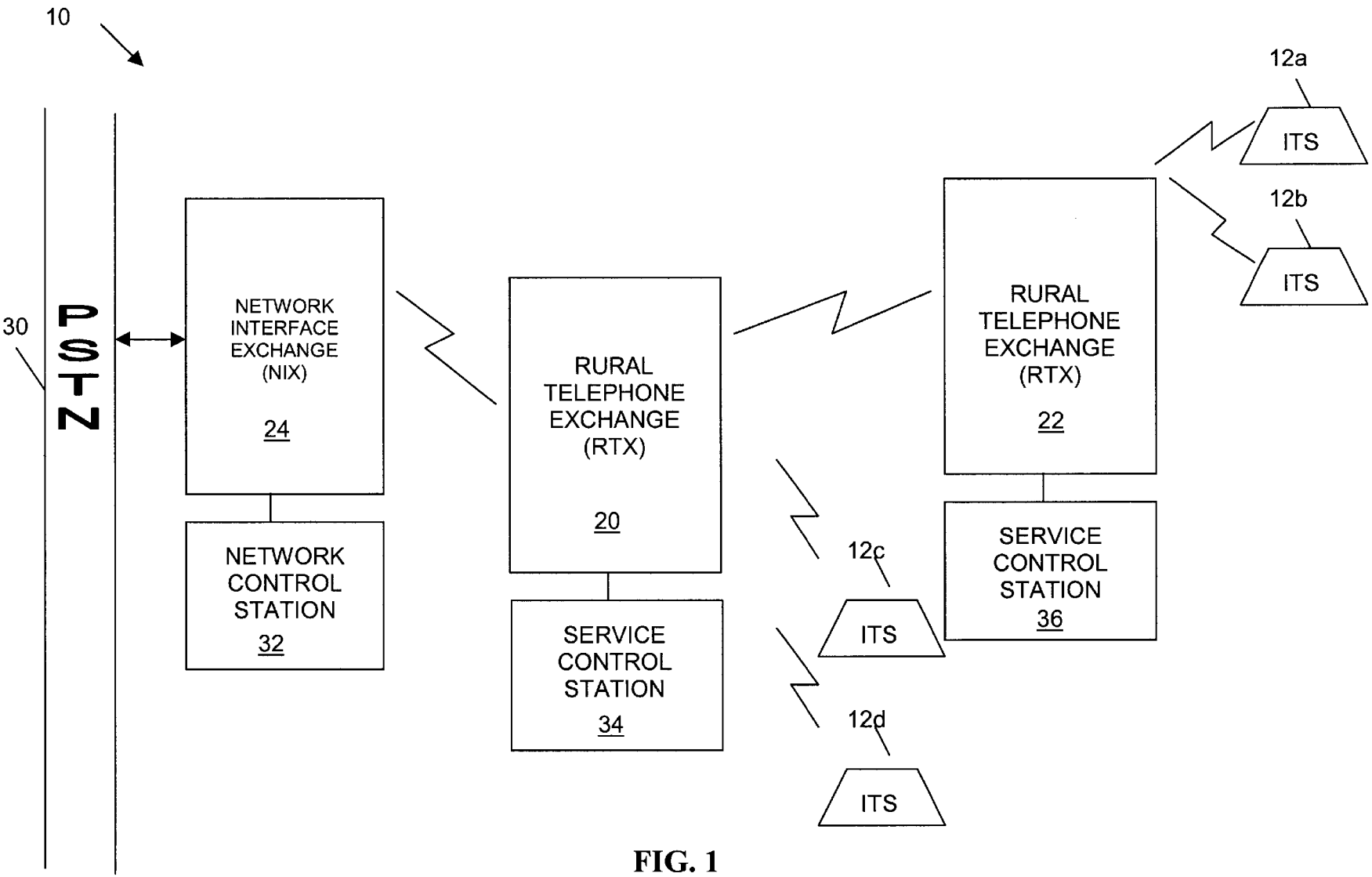
FIG. 1 is a block diagram of the system of the present invention in which telephone service is provided among subscribers associated with a plurality of intelligent telephone sets, as well as between such subscribers and users of a conventional public switched telephone network (PSTN).

Referring to FIG. 1, the system 10 of the present invention provides telephone service among subscribers associated with a plurality of intelligent telephone sets 12, as well as between such subscribers and users of a conventional public switched telephone network (PSTN). The system 10 includes at least a first "remote", or equivalently, "rural" telephone exchange (RTX) unit 20, and in a preferred embodiment includes one or more additional "remote" or "rural" telephone exchange units represented in FIG. 1 by a second telephone exchange 22. The RTX units 20 and 22 provide call connections between the intelligent telephone set (ITS) units 12, and further serve to link each ITS unit 12 with a network interface exchange (NIX) unit 24. The NIX unit 24 is connected to an external PSTN trunk line 30 in order to facilitate call connection to or from users outside of the system 10.

In an exemplary embodiment the radios of system 10 operate on common carrier frequency channels within, for example, the 1443.5 to 1459.5 MHz band or the 1492.5 to 1508.5 MHz band. Channels are transmitted over:

(i) the air interface between the NIX 24 and the RTX unit 20, (ii) over the air interfaces between RTX units, and (iii) between RTX units and each ITS 12.

Channels will typically be spaced 4 MHz apart and support a bitrate of 6.144 Mbps. Spacing between channels is nominally 4 MHz. The mode of transmission in both directions between the NIX unit 24 and the RTX unit 20 is a form of time division multiplexed (TDM) communication, as is transmission between the RTX units 20 and 22. The transmission from an ITS unit 12 to either the RTX unit 20 or to the RTX unit 22 is time division multiple access (TDMA) in one direction (incoming) and TDM (outgoing) to an ITS.

Communication over each air interface, i.e., the NIX/RTX and the RTX/ITS air interfaces, is accomplished digitally by modified offset quadrature phase shift keying (MOQPSK) modulation. That is, a "1" results in a shift in carrier phase of±90°, while a "0" results in no phase change. As is described in further detail below, inter-network communication between the PSTN trunk line 30 and the system 10 will preferably be accomplished using R2-SMFC signalling [Simplified Multifrequency Compelled]. See, for example, CCITT Recommendation Q.400.

The system 10 is a non-hierarchical in that each RTX unit is equipped with a database enabling a particular call to be transmitted to an ITS unit within the surrounding service area, or to be routed to an RTX unit at another network node. In addition, the system 10 is distance independent since the routing of calls through each network node is transparent to system users.

As shown in FIG. 1, a network control station (NCS) 32 is connected to the NIX unit 24. In an exemplary embodiment the NCS 32 is implemented using a microcomputer having a 386SX-type processor, a minimum of 8 Mb RAM memory, VGA graphics capability, approximately 200 Mb of permanent memory and a serial modem. The NCS 32 allows an operator access to, and control over, the system 10. In brief, the NCS 32 presents a graphical user interface through which:

(i) the current network configuration of the system 10 may be displayed, (ii) the current network configuration may be modified, (iii) information relating to the hardware configuration of each RTX unit may be displayed, (iv) statistical and billing information is gathered from the system 10, (v) telephone identification numbers from an equipment identification database which identify each ITS unit with a given RTX may be supplied to the system 10, and (vi) telephone numbers associating a particular user with a given ITS unit are supplied to the system 10 from a subscriber database.

For telephone numbers identifying destinations within local calling areas, the phone number will be examined to determine to which RTX node the number is assigned. A set of three phone lists are preferably maintained, and are referenced in a particular order, in order to identify the RTX node associated with the dialed phone number. The first list, termed the "Special Phone Number List", includes a predefined number (e.g., 128) of special and emergency numbers. This first list is designed to allow the destination node associated with such special and emergency numbers to vary depending upon the location of the node from which the call was placed.

The second list surveyed includes up to, for example, 1,024 mapped phone numbers, and is identified as the "Mapped Phone Number List". The third list of phone numbers includes 128 ranges of phone numbers (i.e., the "Ranged Phone Number List"), with each range being associated with a particular RTX node. If it is determined that a dialed number indicates a destination within the system, and a matching phone number is not found on any of the three lists, the phone number is considered invalid and an error tone is broadcast to the calling party.

Once the call information associated with a particular dialed number has been routed to the specified destination node the phone number is again examined to identify the intended recipient ITS unit. In an exemplary implementation each RTX unit will typically be provided with a list of approximately 16,000 associated telephone numbers. If a match is not found the dialed number is considered invalid and an error tone is played to the calling party.

Again referring to FIG. 1, the RTX unit 20 is connected to a first service control station (SCS) 34, while the RTX unit 22 is connected a second SCS 36. Each SCS will generally be implemented using a portable microcomputer having a hardware capability substantially similar to an NCS. The SCS's 34 and 36 provide portable access to the system 10, and enable external control of local RTX units as well as limited inquiries regarding the status of the entire system. Each SCS is capable of making configuration changes (e.g., a change of RTX transmit frequency) to a given RTX, or of making transaction inquiries (e.g., # of calls from a particular ITS) from the RTX.

Although in the exemplary system configuration of FIG. 1 there is shown only a single NIX unit 24 and a pair of RTX units 20 and 22, other implementations may involve installation of multiple RTX units and more than a single NIX unit. In the preferred embodiment the system 10 is capable of accommodating up to 32 "nodes", where each node consists of either an RTX unit or an NIX unit. However, as is described below the capability of each NIX unit to simultaneously handle over 1,000 telephone calls generally enables a single NIX unit to service an entire region.

Figure 2A:
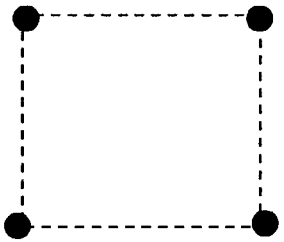
FIG. 2A illustrates an inter-code transmission link topology capable of being implemented within the inventive network.
Figure 2B:
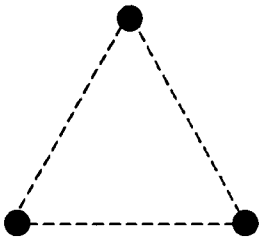
FIG. 2B depicts a three-node triangular topology resulting in a transmission loop having an impermissible odd number of transmission links.
Figure 2C:
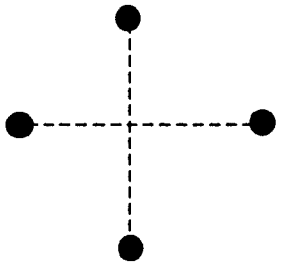
FIGS. 2C and 2D illustrate permissible nodal topologies having an even number of inter-node transmission links.
Figure 2D:
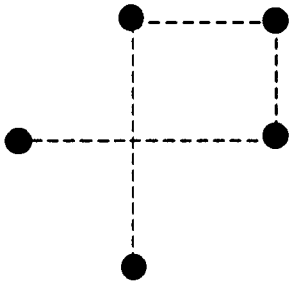

In the preferred embodiment each network node is designed to alternately transmit and receive during successive system intervals in a time division duplex mode. Accordingly, the network is designed such that there are an even number of inter-node transmission links included within each closed transmission loop. Referring to FIG. 2A, a nodal topology comprising a square with four network nodes is permitted. In contrast, the three-node triangular topology of FIG. 2B is not permitted since this would allow a closed transmission loop having an odd number of inter-node transmission links. Similarly, the nodal topologies of FIGS. 2C and 2D are permissible as having an even number of inter-node transmission links.

Figure 3A:
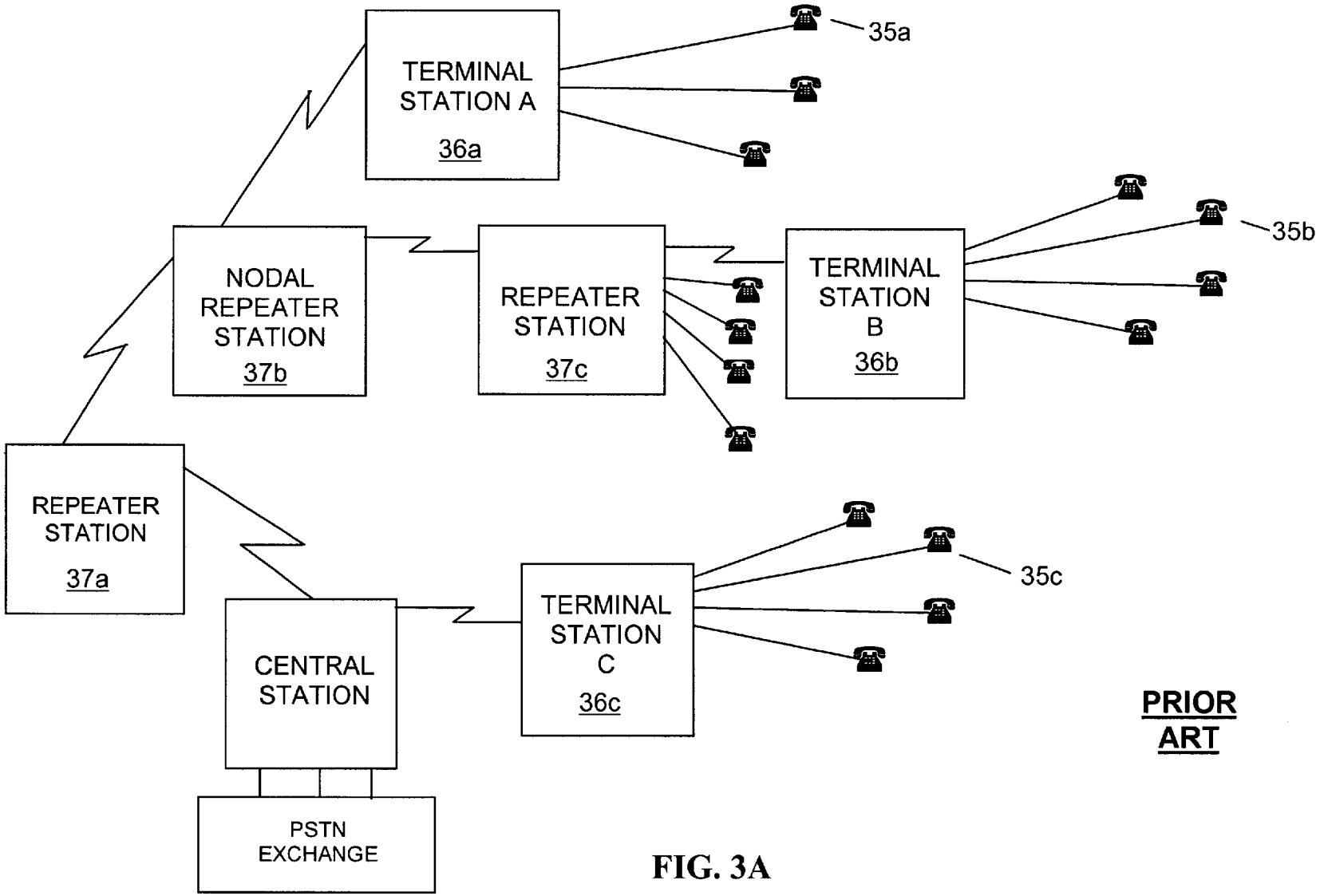
PRIOR ART FIG. 3A
FIG. 3A depicts a typical manner in which calls are routed within a conventional multiple access radio telephone system.
Figure 3B:
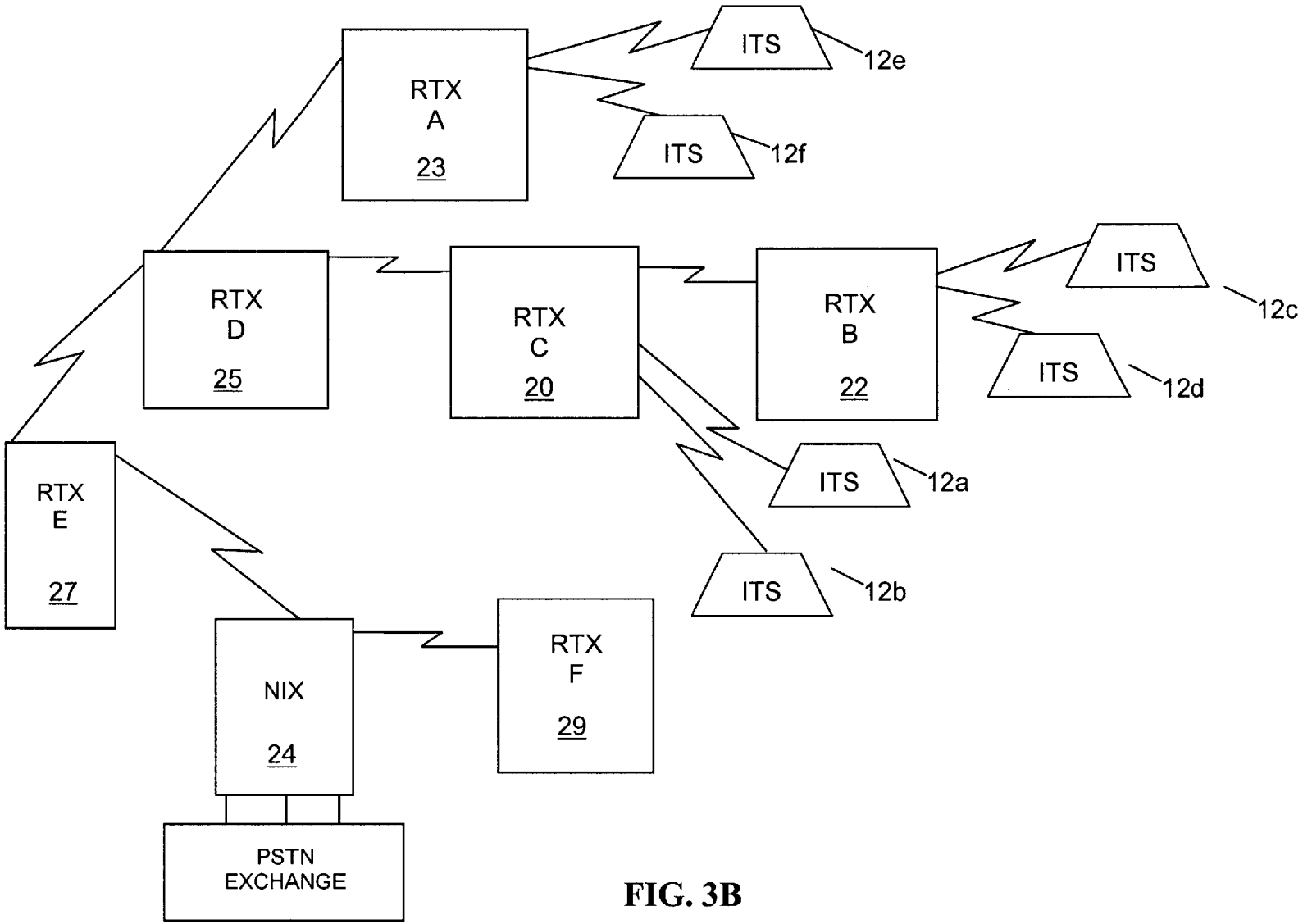
FIG. 3B illustratively represents the call routing technique contemplated by the present invention.

Various features and advantages of the distributed telephone system of the present invention may be appreciated by reference to the call routing diagrams of FIGS. 3A and 3B. In particular, FIG. 3A depicts a typical manner in which calls are routed within a conventional multiple access radio telephone system, while the call routing contemplated by the present invention is illustrated within FIG. 3B.

In the conventional system of FIG. 3A, conventional "intra-call" routing allows only a limited number of users within the same geographic area to communicate through the local terminal station. For example, users of a limited number of telephones 35a may communicate via terminal station 36a, users of a limited number of telephones 35b may communicate by way of terminal station 36b, and so forth. However, if a user of a telephone 35a desires to place a call to a telephone 35b, the call is first routed "up-stream" from terminal station 36a through repeater stations 37b and 37a to a central station 38 and into the public exchange. It is then routed back into the central station 38, and from the central station 38 the call is relayed to terminal station 36b by way of repeater stations 37a, 37b and 37c. This "up-stream/down-stream" inefficiently occupies system resources by requiring call routing through the public switched telephone exchange and central station 38 even when it is merely desired to establish a communication link between neighboring terminal stations (e.g., between terminal stations 36a and 36b). This inefficiency becomes even more apparent when it is considered that neighboring terminal stations may be separated by only a few miles, while a relatively large distance may exist between the central station and the neighboring pair of terminal stations. As is described hereinafter, the distributed telephone system of the present invention affords a more efficient use network resources by providing a distributed call switching capability.

Figure 4A:
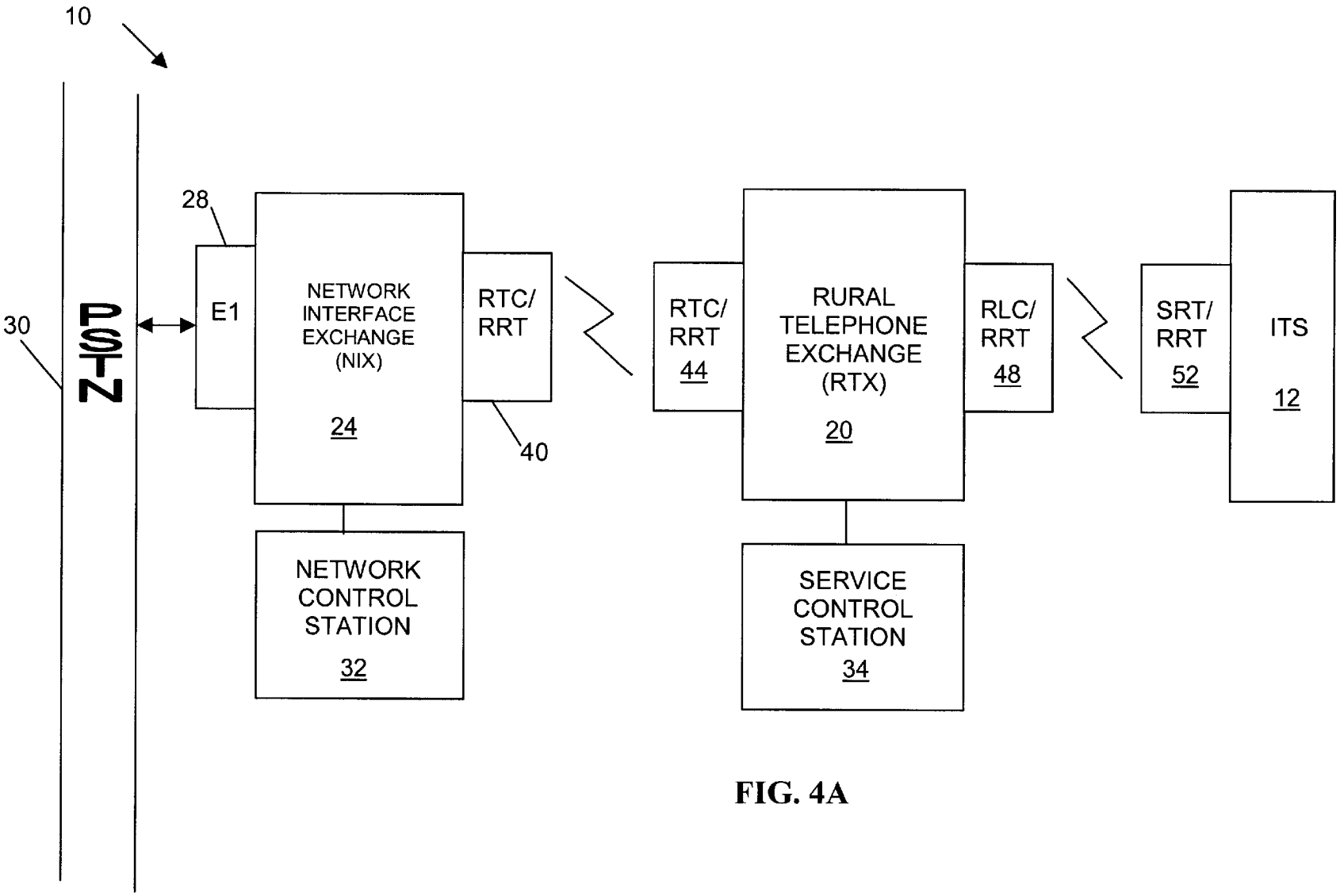
FIG. 4A shows a more detailed block diagrammatic representation of the hardware architecture of the system of the invention.

Turning now to FIG. 3B, the distributed "switching fabric" (i.e., distributed call routing capability) of the present invention enables a communication link to be locally established between neighboring RTX units without the assistance of the NIX unit 24. For example, assume that it is desired that a call be placed from the ITS unit 12e to the ITS unit 12c. In this case the call would proceed through the RTX units 23 and 25, and through the RTX unit 20 to the RTX unit 22. The call would then be relayed by the RTX unit 22 to the ITS unit 12c. In this way the call switching capability inherent within each RTX unit enables the most direct available communication link to be established between the ITS units associated with different RTX units. Accordingly, the present invention preserves trunk resources of the NIX by only routing calls therethrough when necessary to establish a direct communication II. Overview of Network Communication A. Network Architecture Referring to FIG. 4A, there is shown a more detailed block diagrammatic representation of the hardware architecture of the system 10. As is indicated by FIG. 4A, the NIX unit 24 interfaces with the RTX unit 20 through a radio trunk card (RTC) in combination with a rural radio transceiver (RRT), collectively represented as the RTC/RRT module 40. Similarly, the RTX unit 20 is connected to an RTC/RRT module 44 operative to communicate with the RTC/RRT 40 module. The RTX unit 20 is also connected to a radio line card (RLC) in combination with a rural radio transceiver (transmitter/receiver) (RRT), collectively represented as RLC/RRT 48 module, for facilitating communication with intelligent telephone set (ITS) 12. The ITS 12 is linked to a subscriber remote terminal (SRT) in combination with a rural radio transceiver (RRT). The SRT and RRT supporting intelligent telephone set 12 are collectively represented as SRT/RRT module 52.

In a preferred implementation each SRT unit operates on a single radio frequency, and hence traffic channel information is transmitted is alternately transmitted in the forward and reverse directions over each communication link. This "ping-pong" communications protocol, which results in time-sharing of the available frequency band, reduces the number of frequencies required by the coverage area of each RTX unit.

Figure 4B:
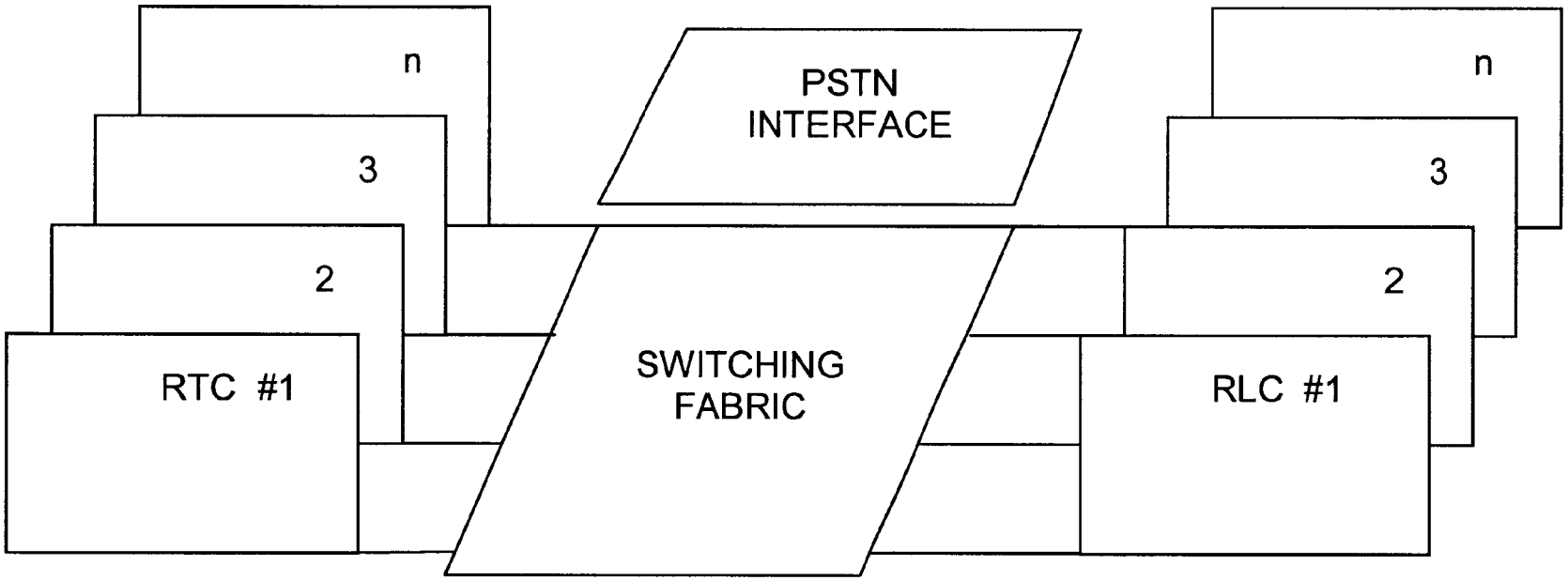
FIG. 4B provides a generalized representation of the "switching fabric" embedded within the system architecture of FIG. 4A.

Turning now to FIG. 4B, a generalized representation is provided of the "switching fabric" embedded within the system architecture of FIG. 4A. The "switching fabric" depicted in FIG. 4B provides the interconnection of the multiple network elements comprising a given network realization. The switching fabric is operative to route calls, via the RLC/RRT and RTC/RRT cards of each RTX unit, between selected system nodes as well as to an from the PSTN. As is described hereinafter, the network interconnection facilitating the efficient call routing contemplated by the invention is made possible by the novel communications hardware and switching/control software integrated within the system RTX and NIX units. A switching fabric comprised of a plurality of RTX units, and one or more NIX units, is believed to be unique in the telecommunications industry and to represent a significant advance in the state of the art.

Figure 4C:
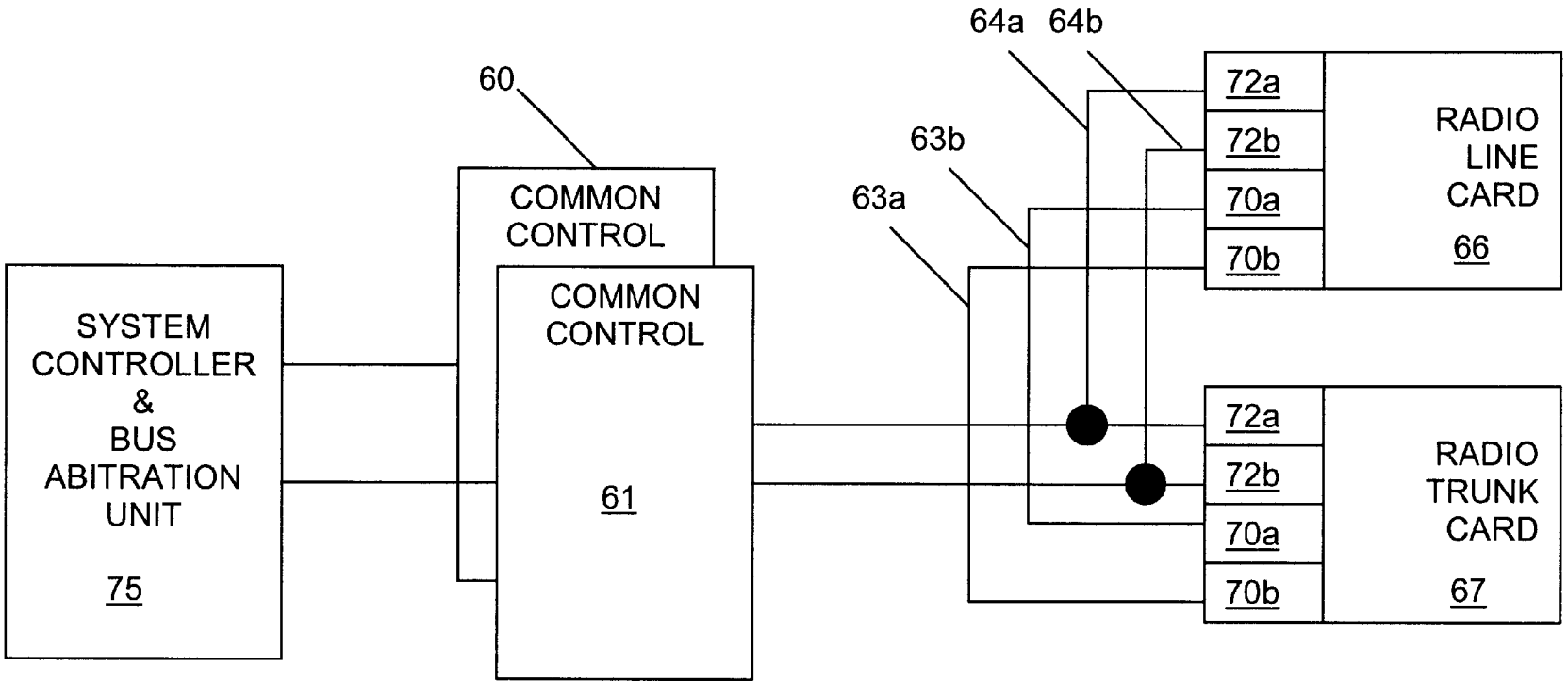
FIG. 4C illustratively represents the hardware and software elements included within each of the networked RTX units comprising the switching fabric generally represented in FIG. 4B.

FIG. 4C illustratively represents the hardware and software elements included within each of the networked RTX units comprising the switching fabric generally represented in FIG. 4B. Each RTX unit is seen to include a pair of Common Control modules 60 and 61, which are linked to various interface cards within the RTX unit by way of a set of communication and control buses. More particularly, Common Control module 60 could be assigned to a time division multiplex (TDM) communication bus 63a, and to a Parallel Common Control (PCC) bus 64a. Under these circumstances Common Control module 61 would be assigned to TDM bus 63b and to the PCC bus 64b. As is indicated by FIG. 4C, the TDM buses 63a, 63b and PCC buses 64a, 64b facilitate communication between the Common Control modules 60, 61 and a Radio Line Card (RLC) 66, and between the Common Control modules and a Radio Trunk Card (RTC) 67. The RLC and RTC interface cards are coupled to the TDM and PCC buses through TDM bus drivers 70a, 70b and PCC bus drivers 72a, 72b, respectively. The redundant (i.e., non-active) Common Control enables uninterrupted system operation in the case of failure of the active Common Control, it being understood that only a single Common Control and/or a single TDM/PCC bus may be provided in alternate embodiments.

Again, the Radio Line Card (RLC) 66 provides an interface for radio communication between a given RTX unit and the multiplicity of ITS units within the coverage area thereof. The Radio Trunk Card (RTC) 67 relays traffic channel information, in the above-described TDM format, between the RTX unit in which it is disposed and neighboring RTX/NIX units.

Of the two TDM buses 63a and 63b, only a single one is active at any one time. The active TDM bus is used exclusively for data communication (i.e., voice and/or packet data). That is, the active TDM bus is not used to carry control functions, and is not directly accessible by the Common Control modules 60 and 61. The active TDM bus is selected via a global control signal SYSSEL, which is issued by a controller and bus arbitration unit 75. Since the control signal SYSSEL is "global", all call switching between interface cards within a given RTX unit are performed solely over the active TDM bus.

As is the case with the TDM buses 63a, 63b, each interface card is capable of using either of the two PCC buses 64a, 64b within the switching fabric of an RTX/NIX unit. The active Common Control, as determined by the system controller and bus arbitration unit 75, also selects the active PCC bus via the control signal SYSSEL. The redundant Common Control is then assigned by default to the alternate PCC bus. Since the PCC buses facilitate communication between the Common Control units, both the primary and alternate PCC buses are continuously exercised. Each PCC bus may be viewed as an extension of the ISA bus (IEEE Standard P966) of the central processing unit (CPU) within the system controller 75, and appears in the address space of the CPU. The PCC Bus provides a control path between the active Common Control and all interface cards (e.g., the Radio Line Card and Radio Trunk Card).

In an exemplary embodiment the PCC bus is a moderate speed (e.g., 700 kHz) multiplexed parallel bus, consisting of 16 data lines (corresponding to CPU data lines D0 through D15) and 19 address lines. Since A0 does not appear on the bus, all PCC bus accesses are by even addressed words. The PCC bus is derived from the ISA bus with 16 multiplexed address and data lines, three dedicated address lines, and three control lines. In addition, the PCC address space maps into a predetermined amount (e.g. 16k) of Common Control address space. For Common Control addressing, the low twelve address lines of the PCC bus correspond to CPU address lines A1 through A12, and the high seven address lines of the PCC bus are set to zero.

Figure 4D:
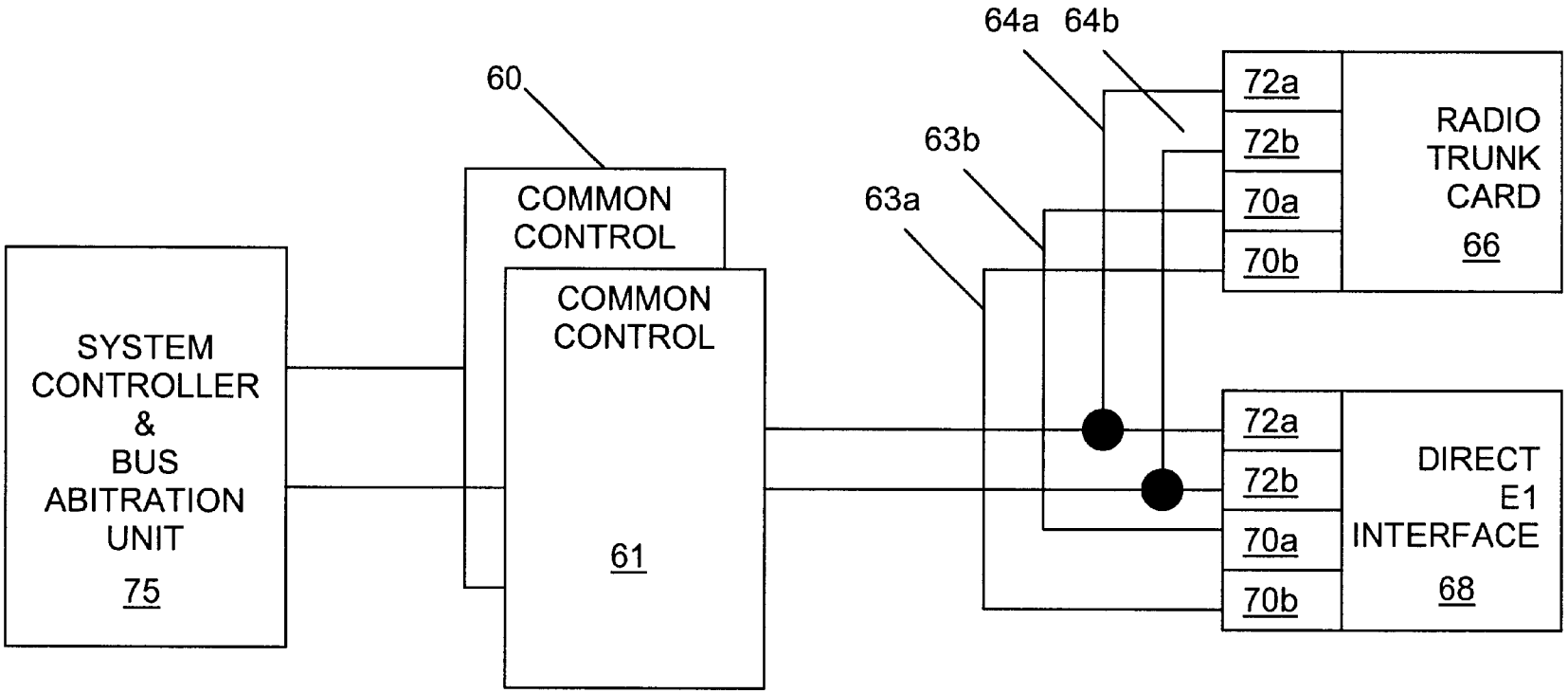
FIG. 4D illustratively represents the hardware and software elements included within each NIX unit included within the switching fabric generally represented in FIG. 4B.

FIG. 4D illustratively represents the hardware and software elements included within each NIX unit included within the switching fabric generally represented in FIG. 4B. In the representation of FIG. 4D, like reference numerals are employed to identify element substantially identical to those present within the RTX unit of FIG. 4C. Referring to FIG. 4D, in the case of NIX units the TDM and PCC buses serve to link the Common Control modules to a Direct E1 Interface Card 68, as well as to the RTC card 67. The DE1 Interface Card 68 provides an interface between the NIX unit and the Public Switched Telephone Network (PSTN). Again, the RTC card 67 relays traffic channel information between the NIX unit in which it is disposed and neighboring RTX units.

B. Network Call Handling

In what follows the term "originating node" refers to the RTX unit with which an ITS unit is in communication upon placing a call. If the intended call recipient is another ITS unit is another ITS unit, then the RTX unit servicing the recipient ITS is identified as the "terminating" or "destination" node. All other RTX units involved in relaying the call are identified as "intermediary nodes". If the party initiating or receiving the call is in the public switched telephone network (PSTN), then the NIX unit connected to the PSTN corresponds to either the terminating or originating node.

As was mentioned above, installed within each RTX is a phone number list identifying the terminating node associated with each ITS telephone number. In addition, during initial system installation an "adjacency list" of those network nodes with which a given RTX unit is capable of establishing radio communication is stored therein by way of a network control station (NCS) 32. Upon a call being placed by an ITS unit, the called phone number is relayed to the local RTX unit and the phone number list therein is surveyed to determine the destination node. Once the destination node has been ascertained, the adjacency list is examined in accordance with a Depth First Search (DFS) searching technique or the equivalent in order to determine the first intermediary node to which the call is to be routed. This searching step is of course not required for calls to ITS units serviced by the same RTX unit; that is, for calls in which the originating and terminating nodes are identical. At each intermediary node, the aforementioned Depth First Search technique is conducted using the adjacency list stored therein so as to identify the next network node to which the call should be relayed en route to the terminating node.

At each given intermediary node, a Channel Map is consulted to ascertain if a TDM communication channel exists from the given node to the next intermediary node identified by the initial Depth First Search. If so, the call is relayed to the next identified intermediary node. If not, a second Depth First Search is conducted in order to identify an alternative intermediary node. In this way the present invention effects the routing of calls through the network via the most direct available communication link, and hence conserves channel resources by not operating to route each call through a central switching station or the like. This contrasts with conventional call routing techniques, in which unintelligent repeater stations are only capable of relaying calls between predefined network locations. The novel call routing contemplated by the invention is described in further detail with reference to the call flow and state diagrams of FIGS. 5A–5P.

Figure 5A:
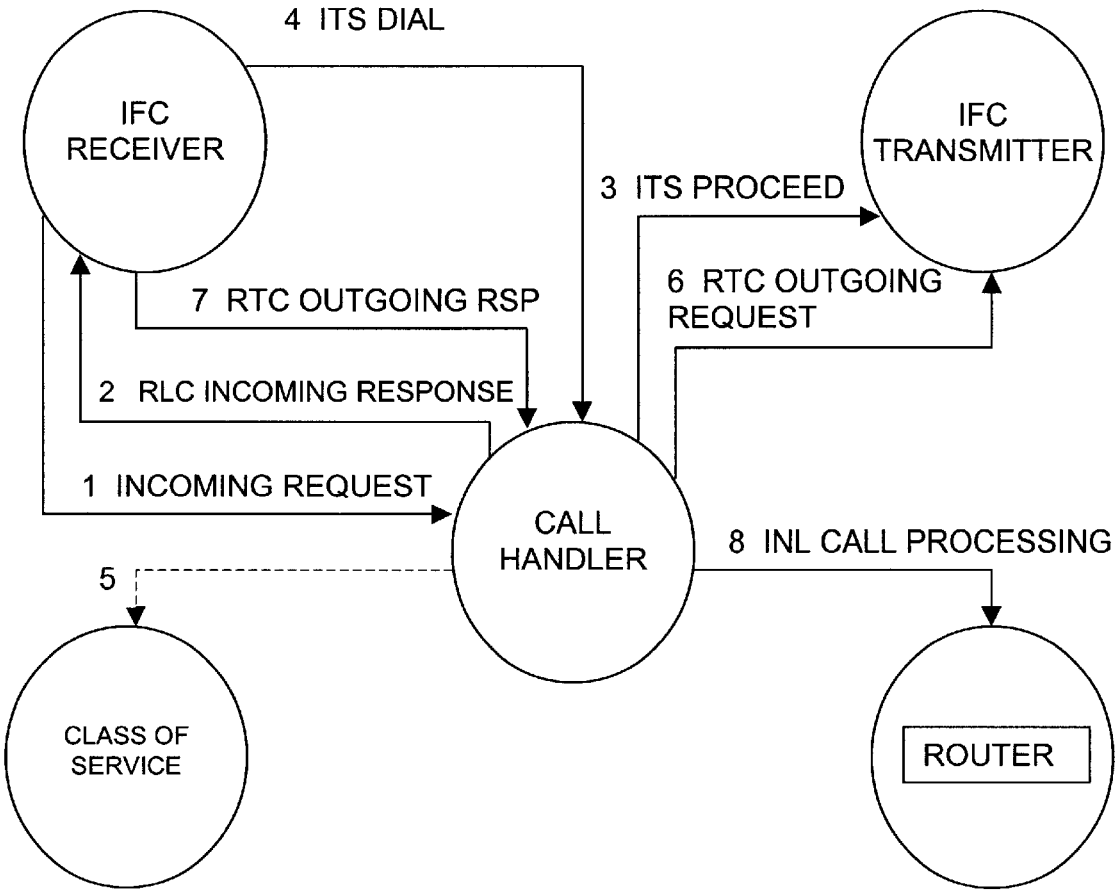
FIGS. 5A–5P are call flow and state diagrams and exemplifying the call routing contemplated by the invention.
Figure 5B:
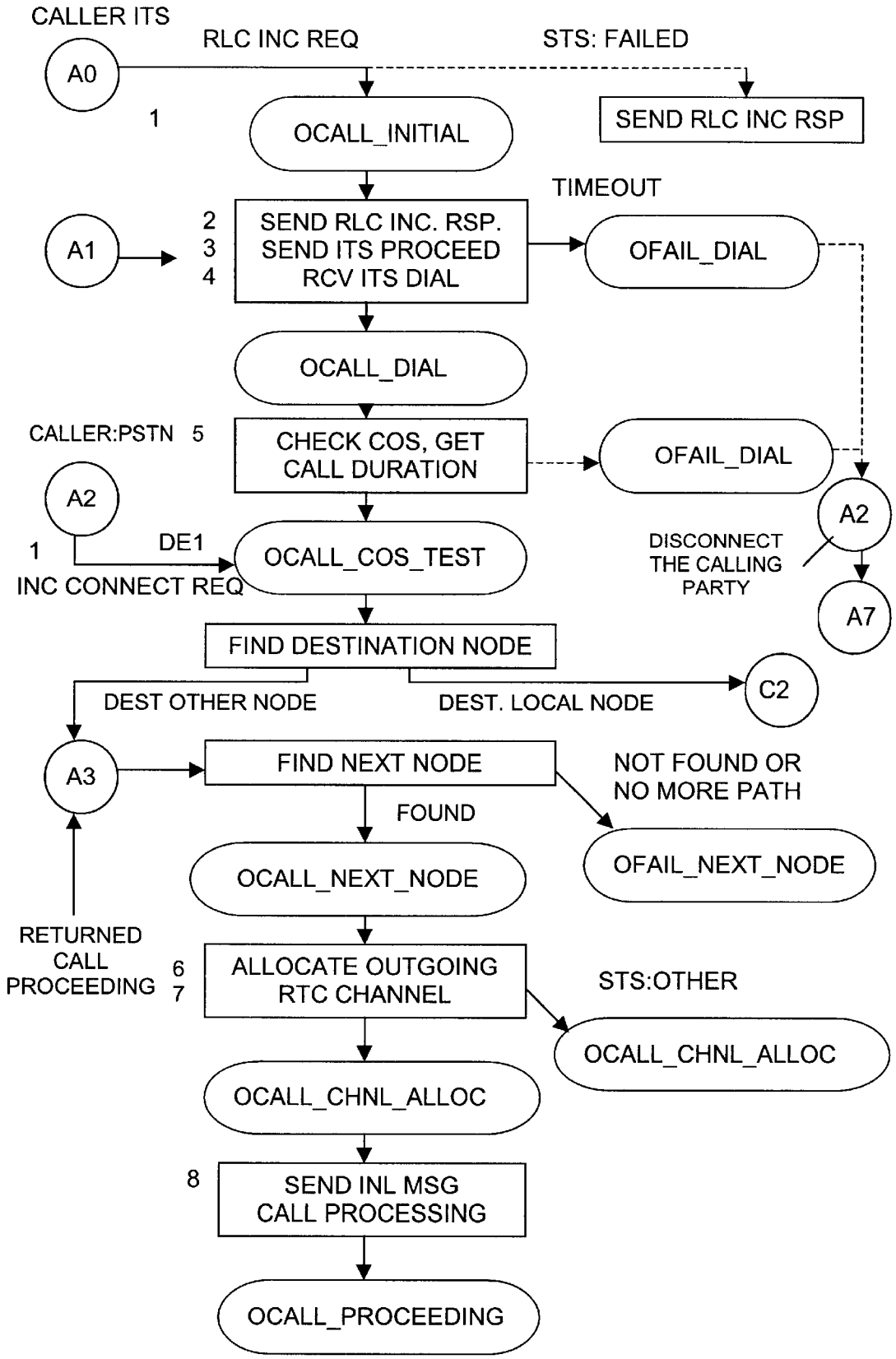
Figure 5C:
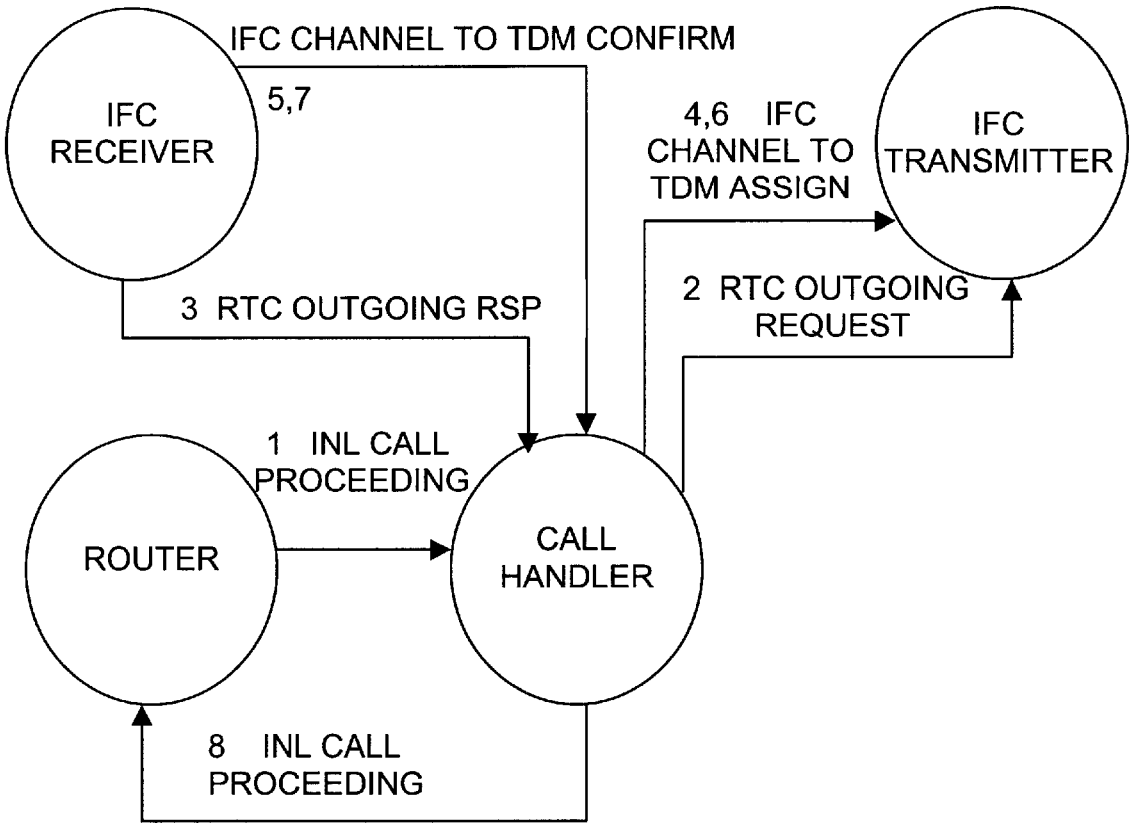
Figure 5D:
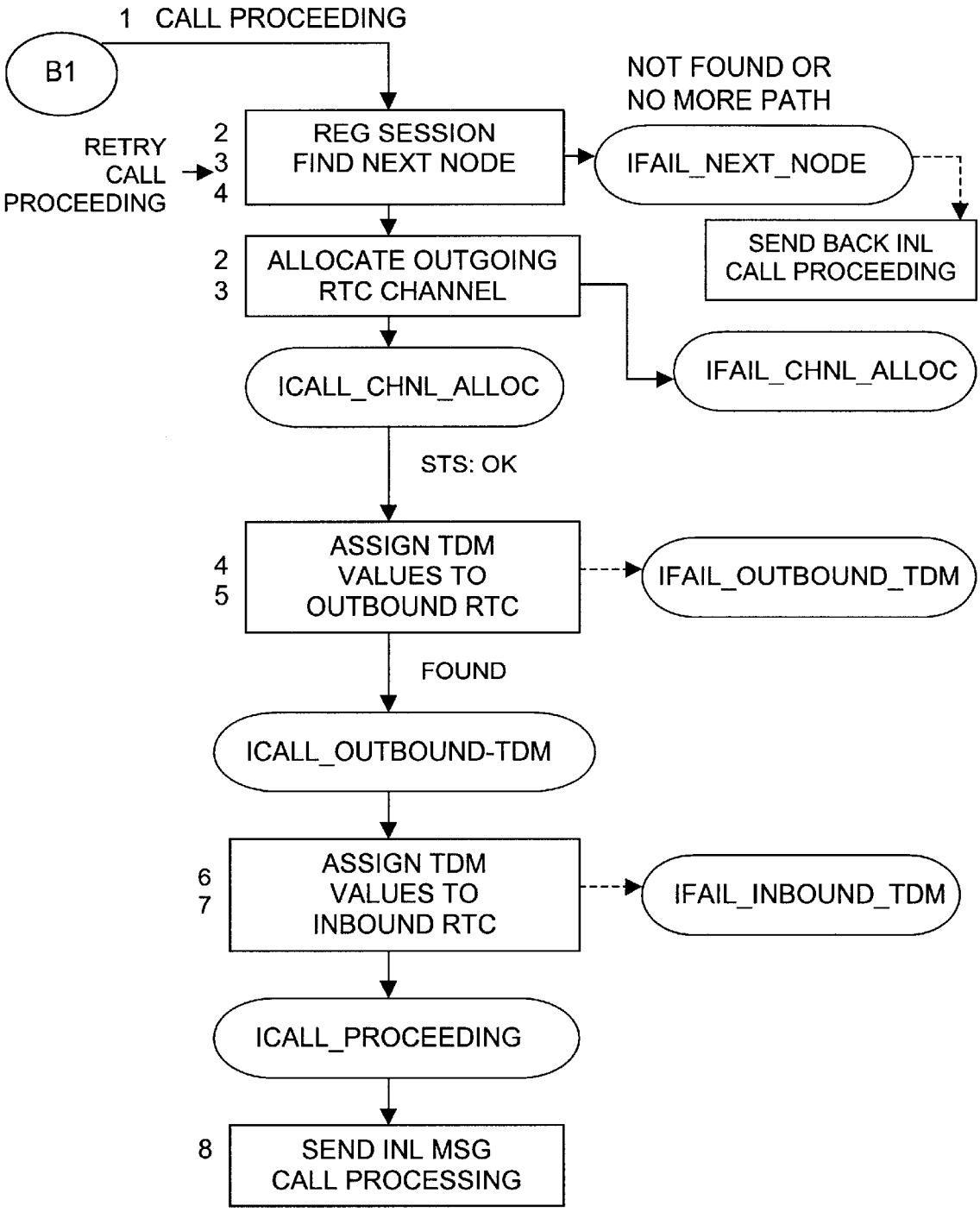
Figure 5E:
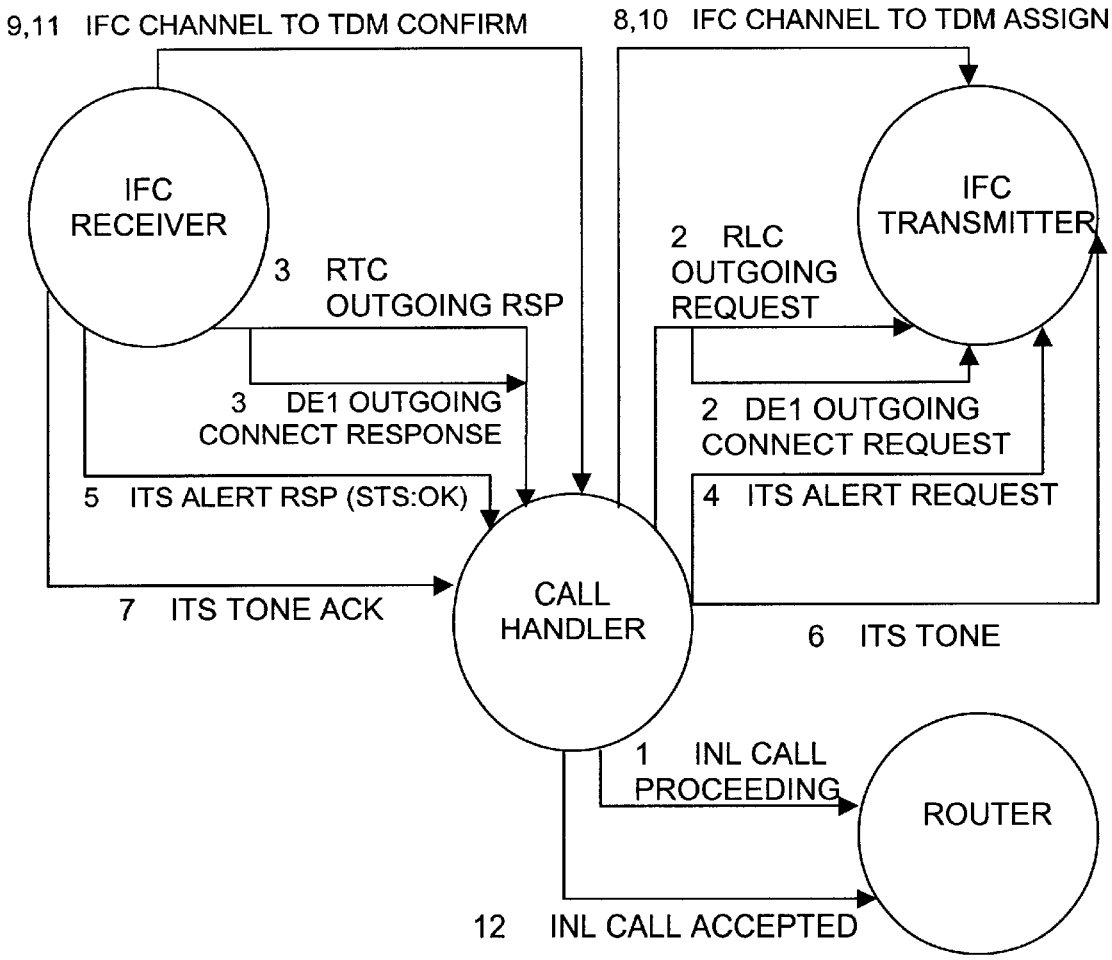
Figure 5F:
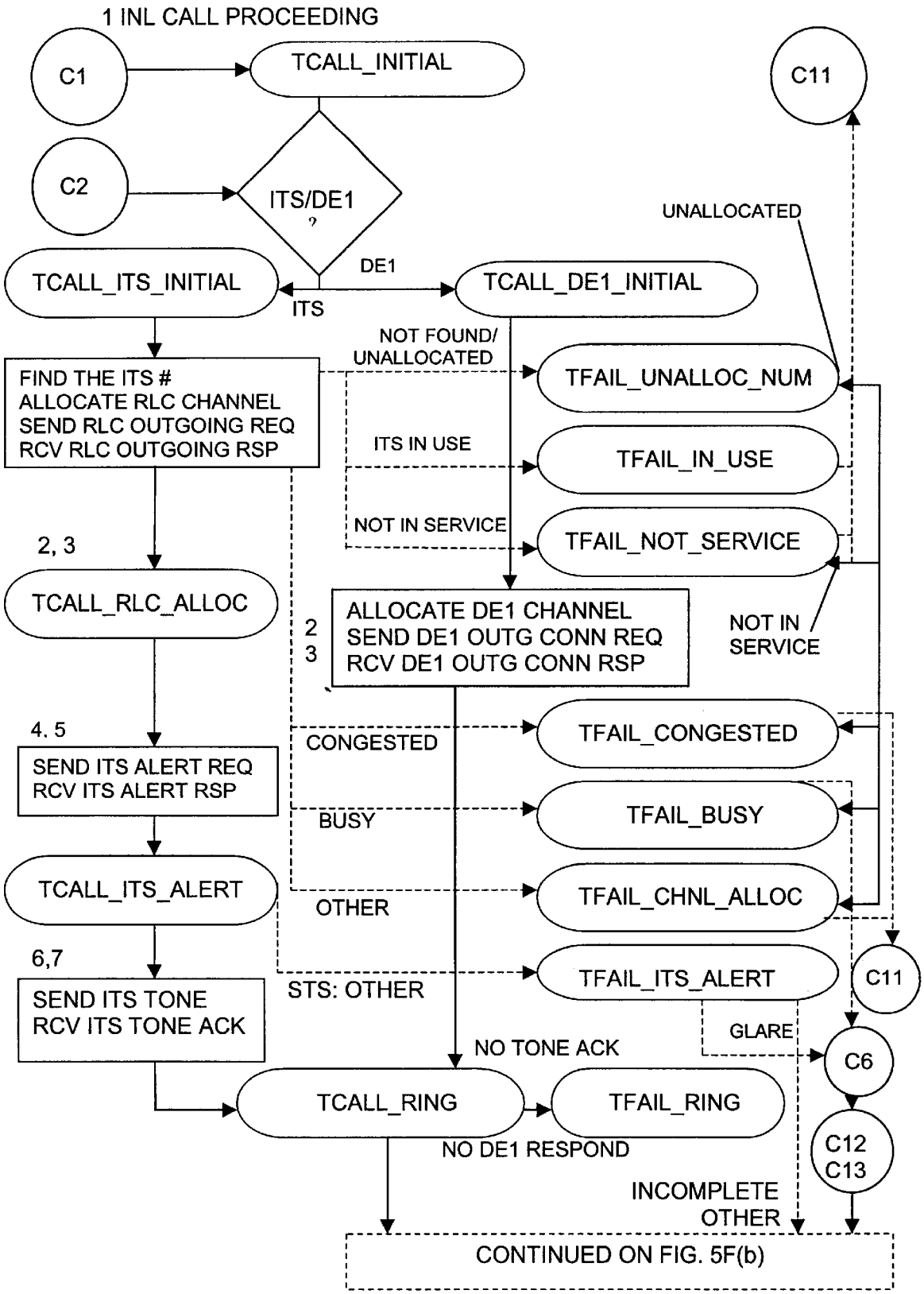
Figure 5F:
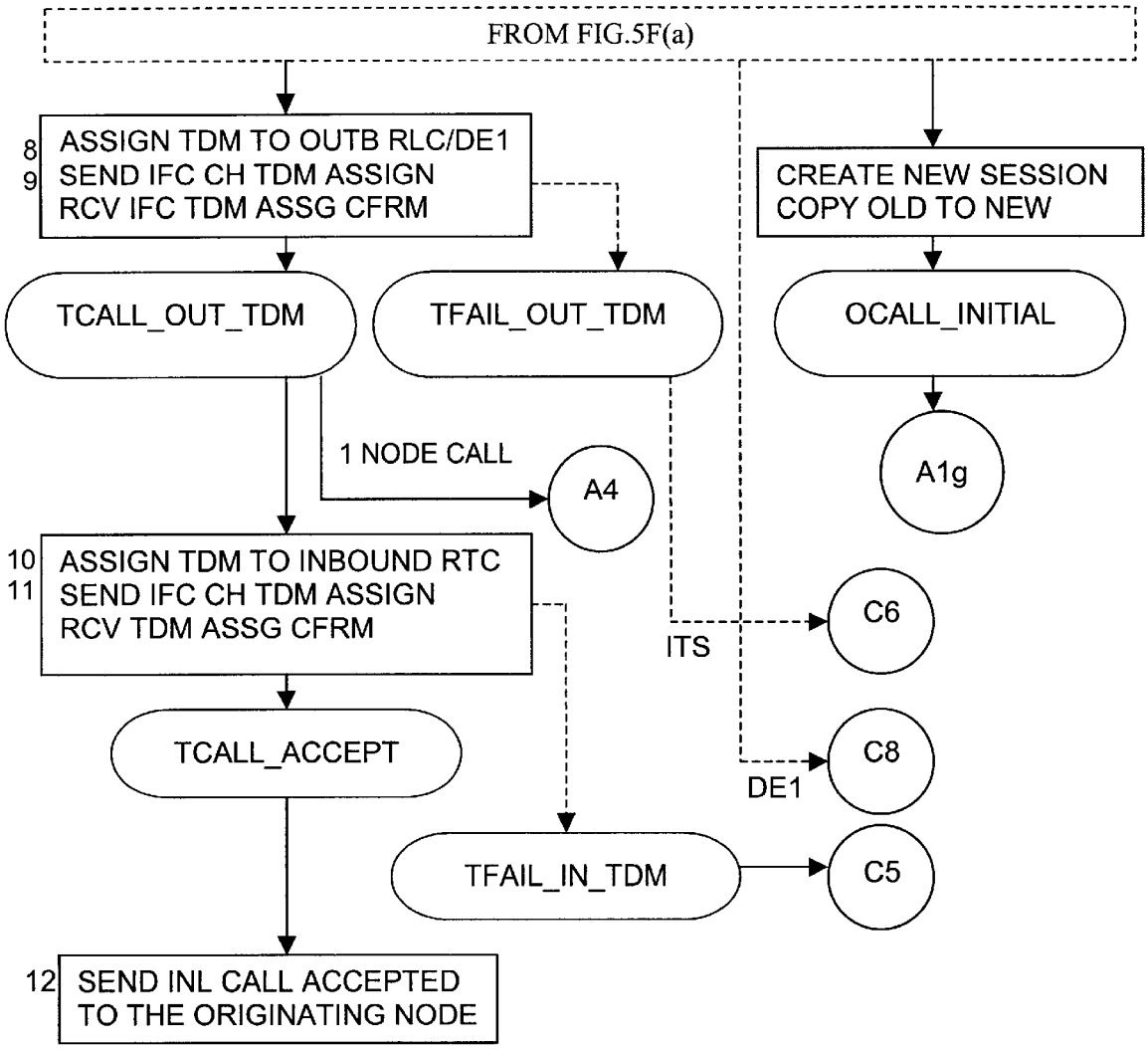
Figure 5G:
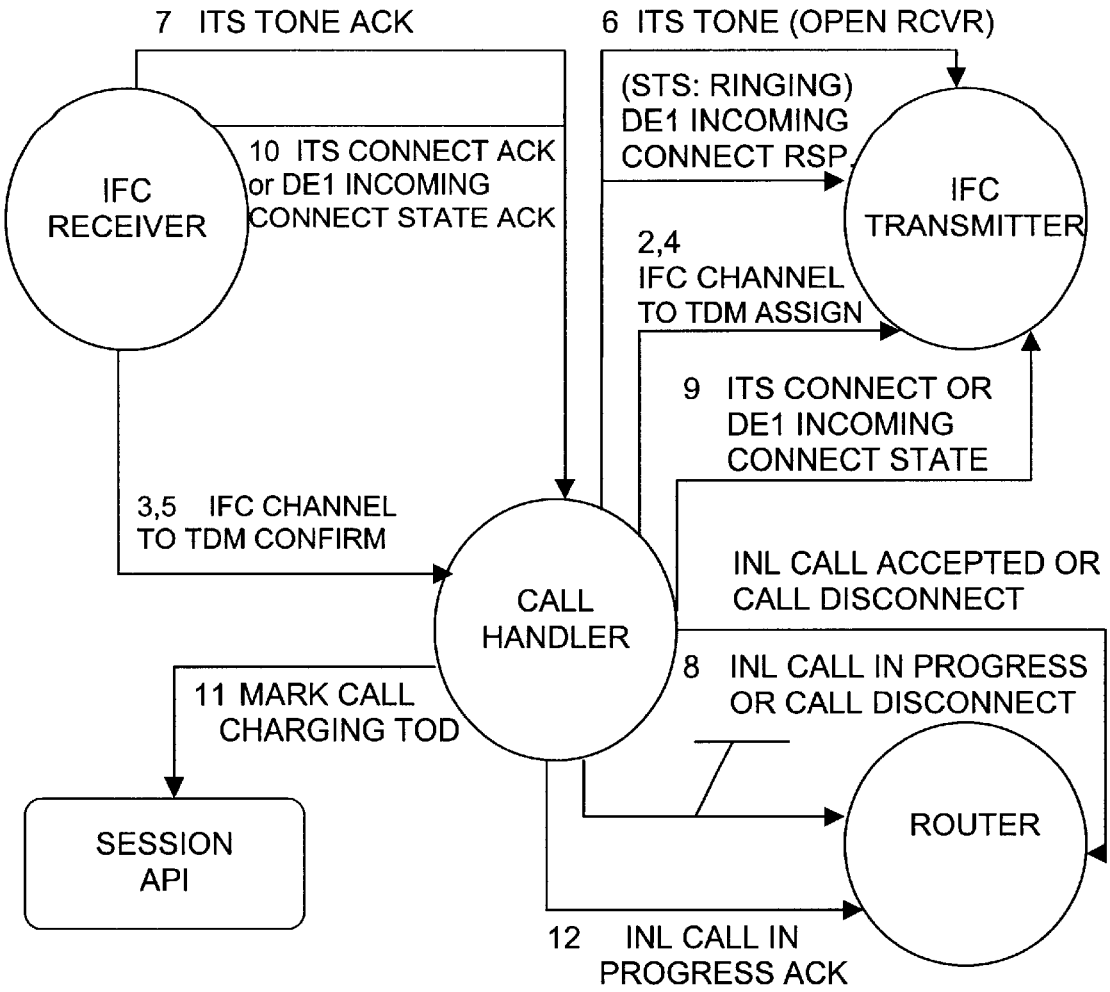
Figure 5H:
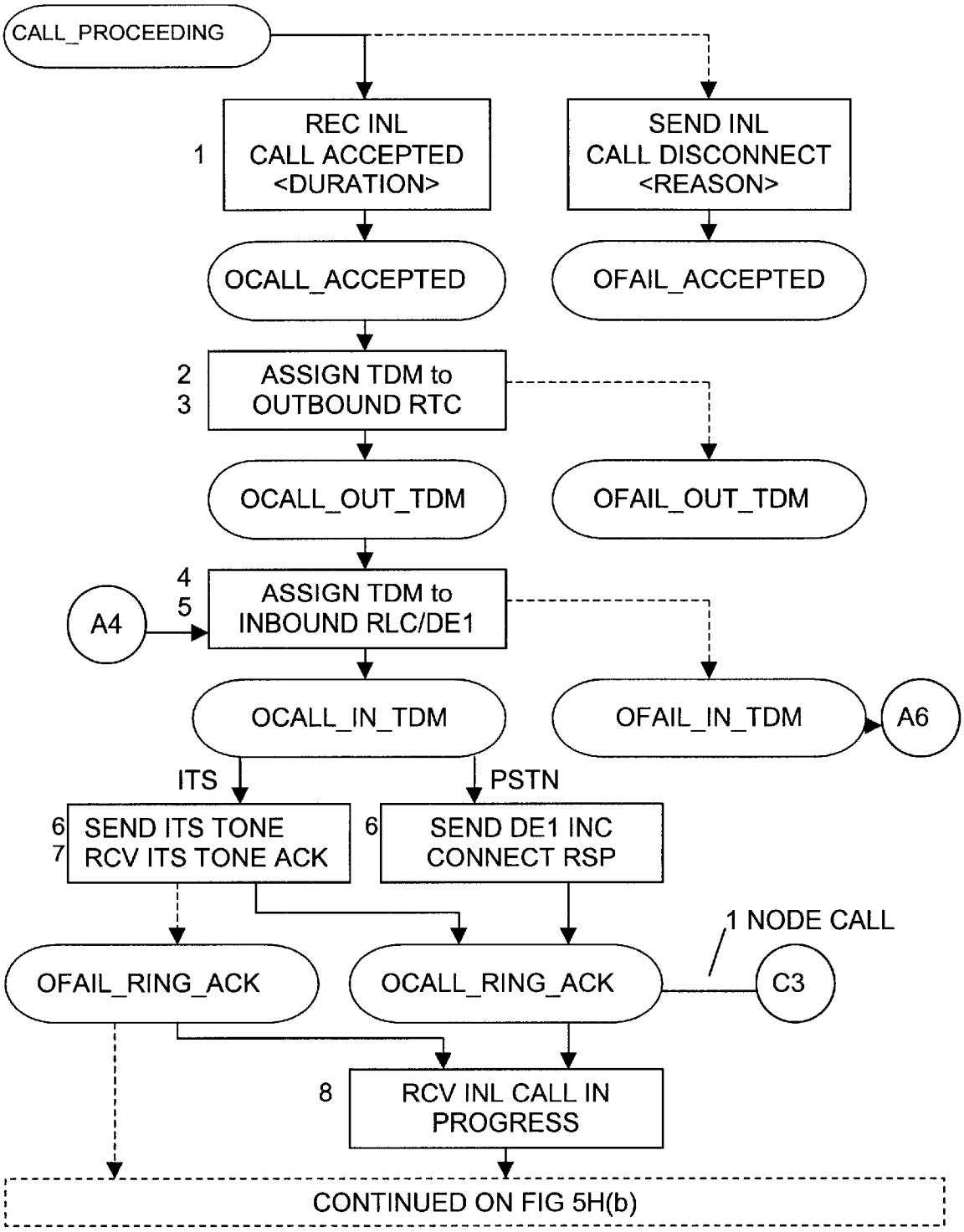
Figure 5H:
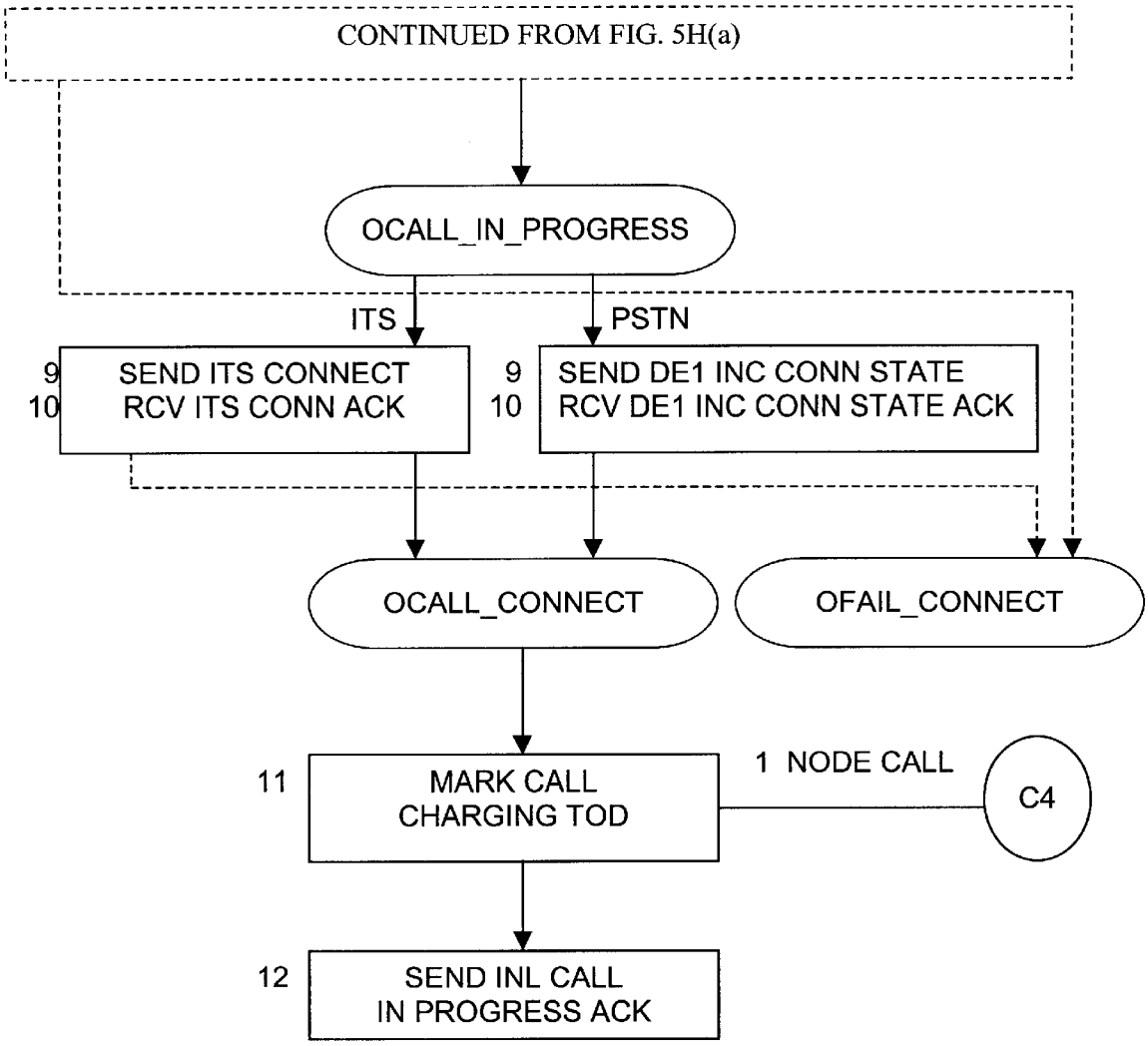
Figure 5I:
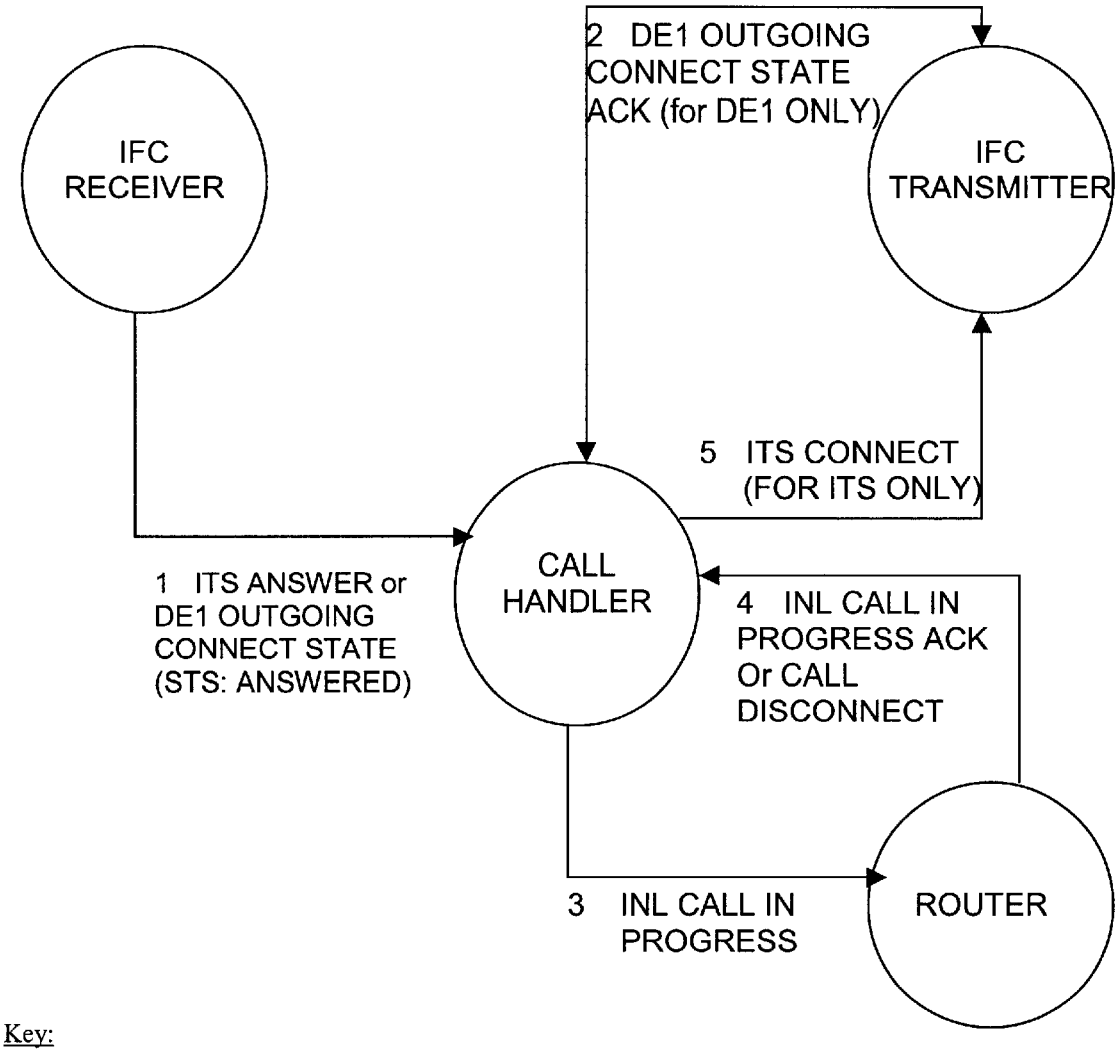
Figure 5J:
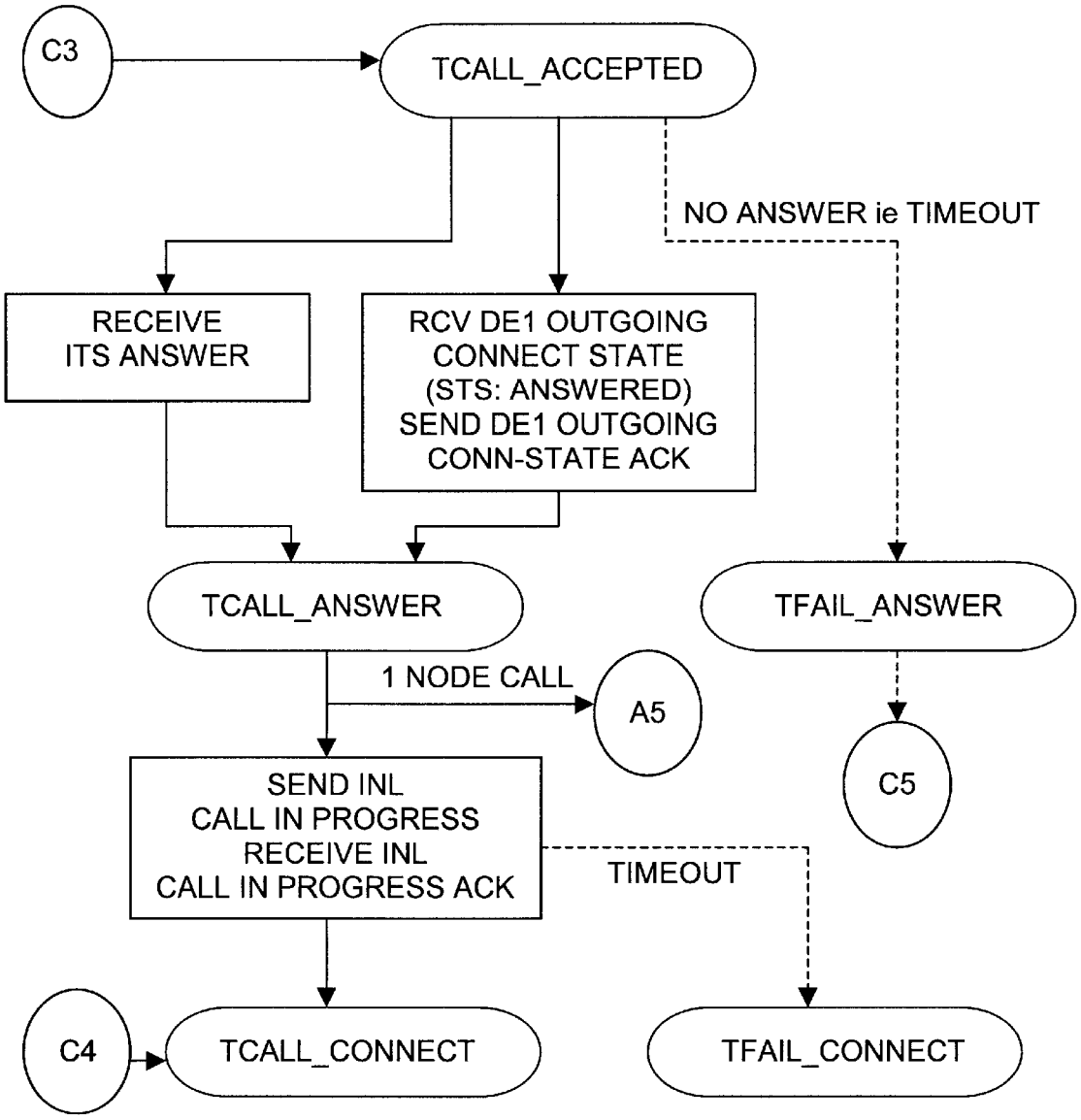
Figure 5K:
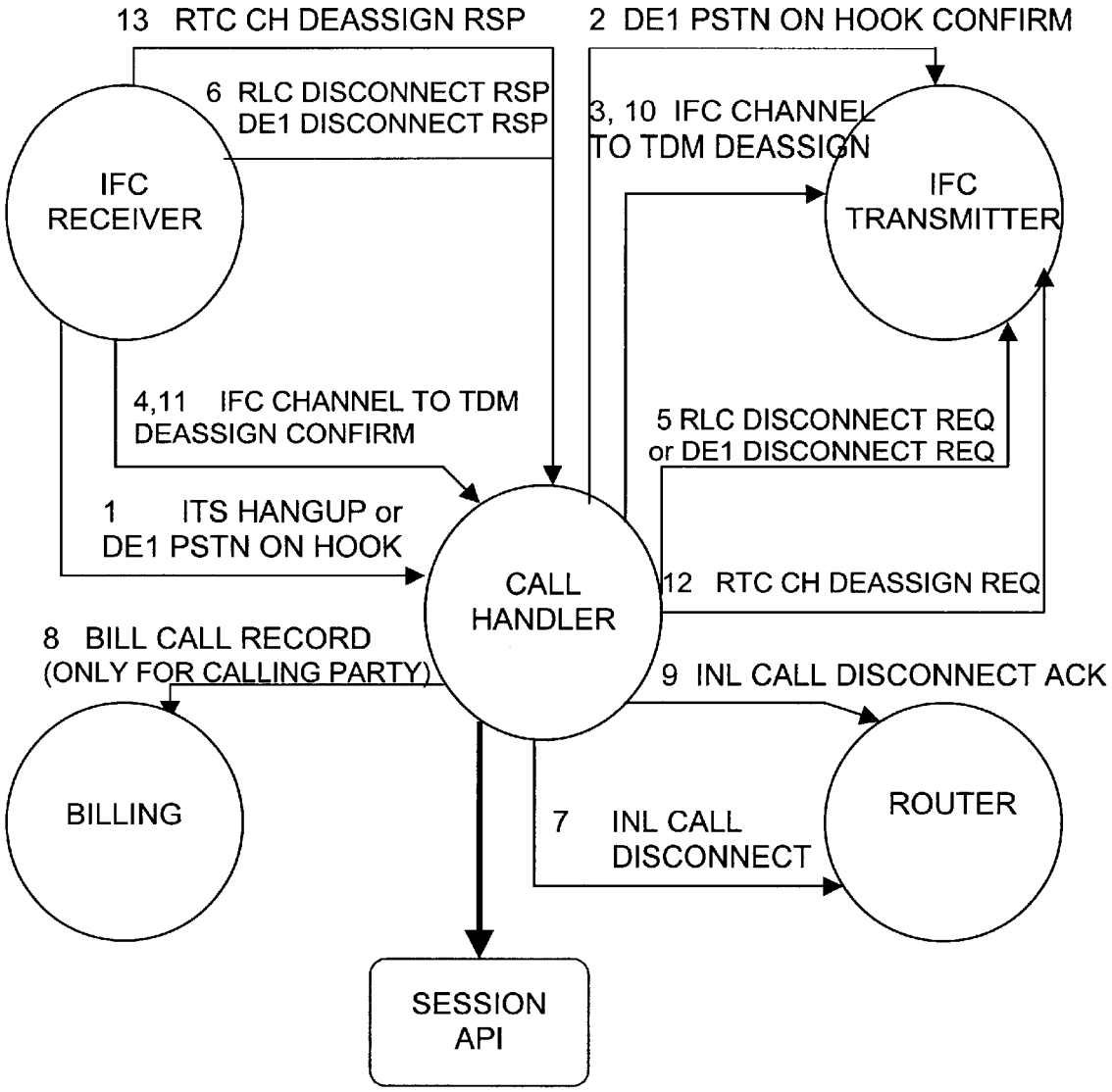
Figure 5L:
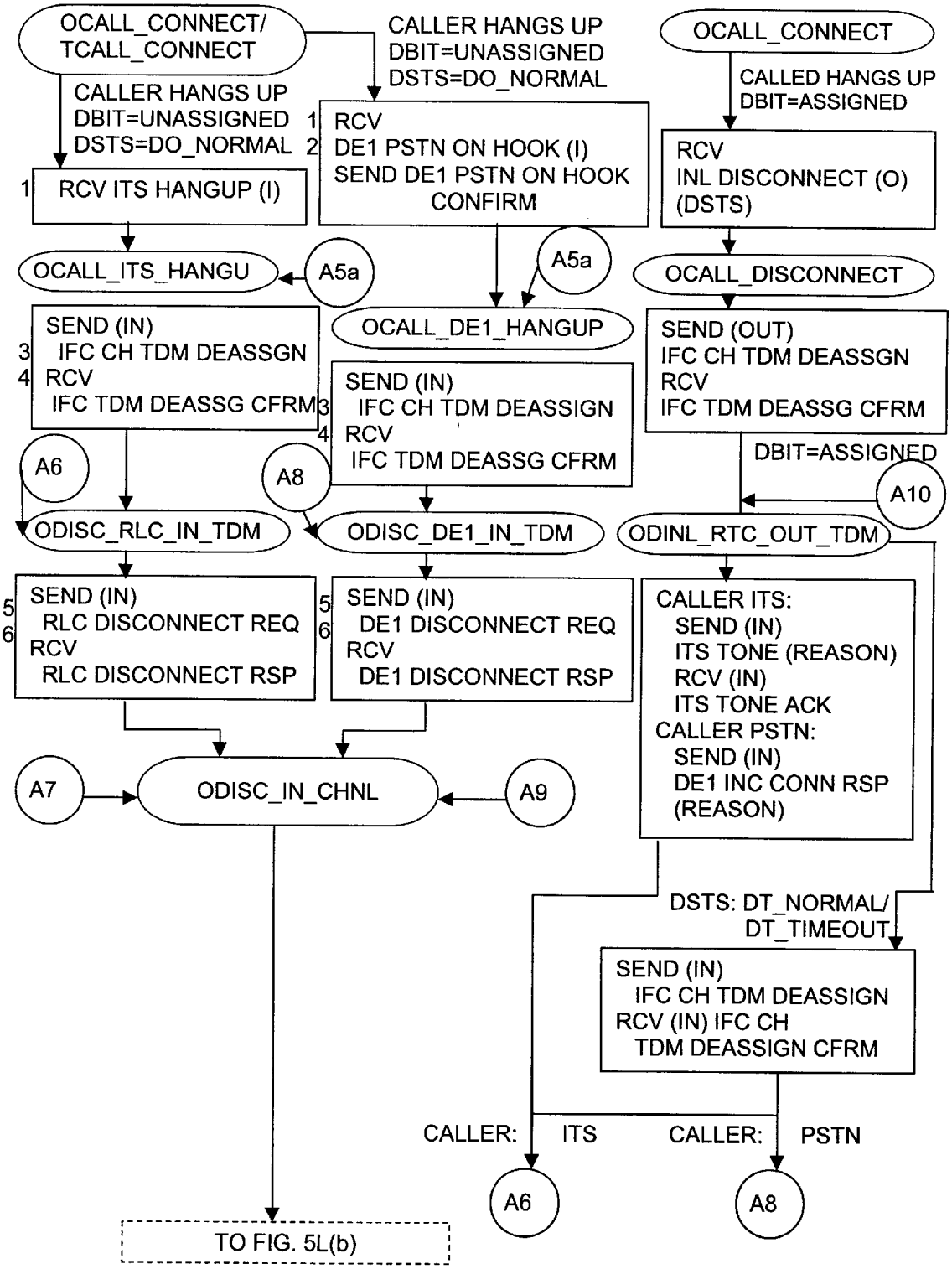
Figure 5L:
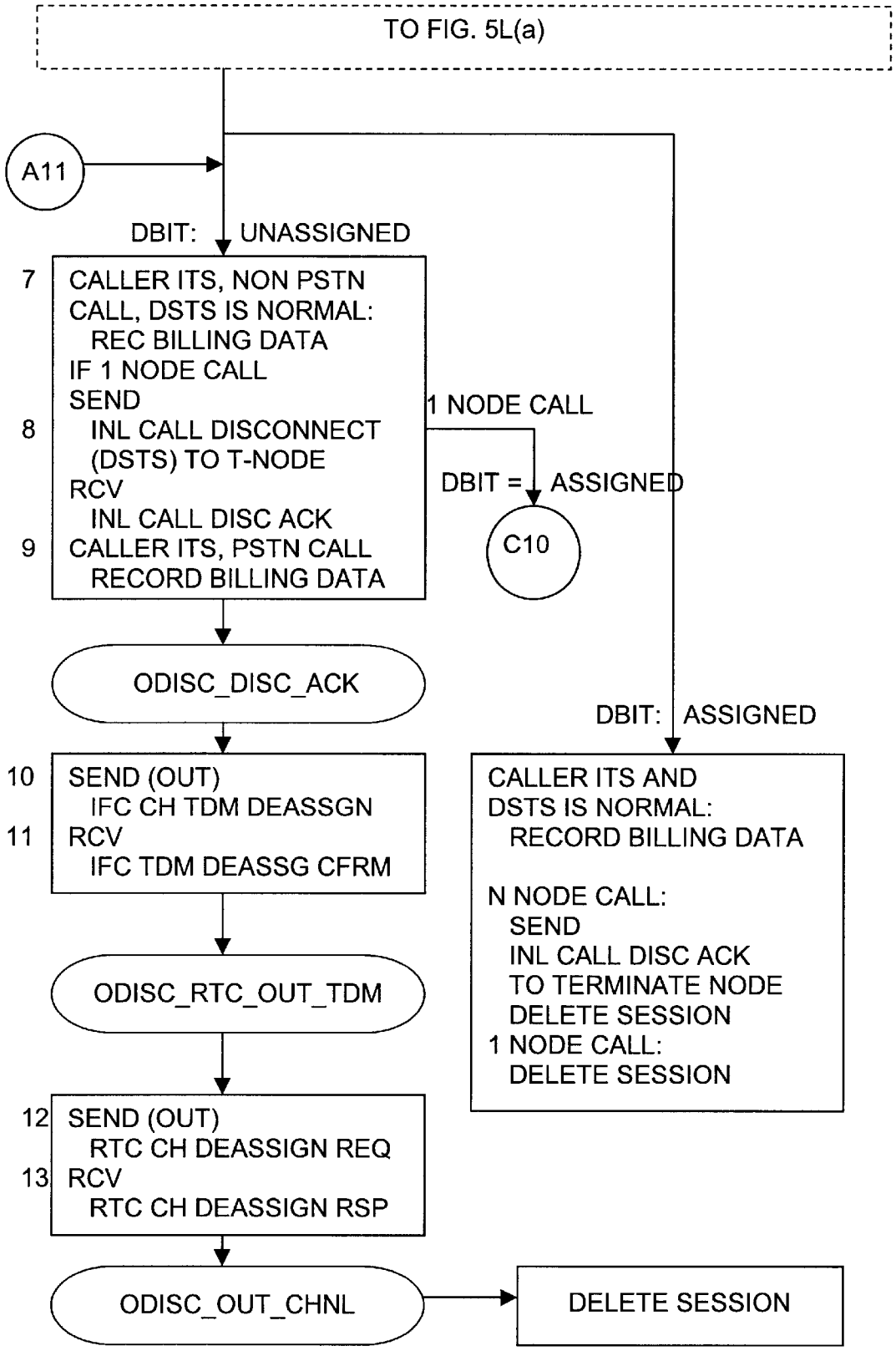
Figure 5M:
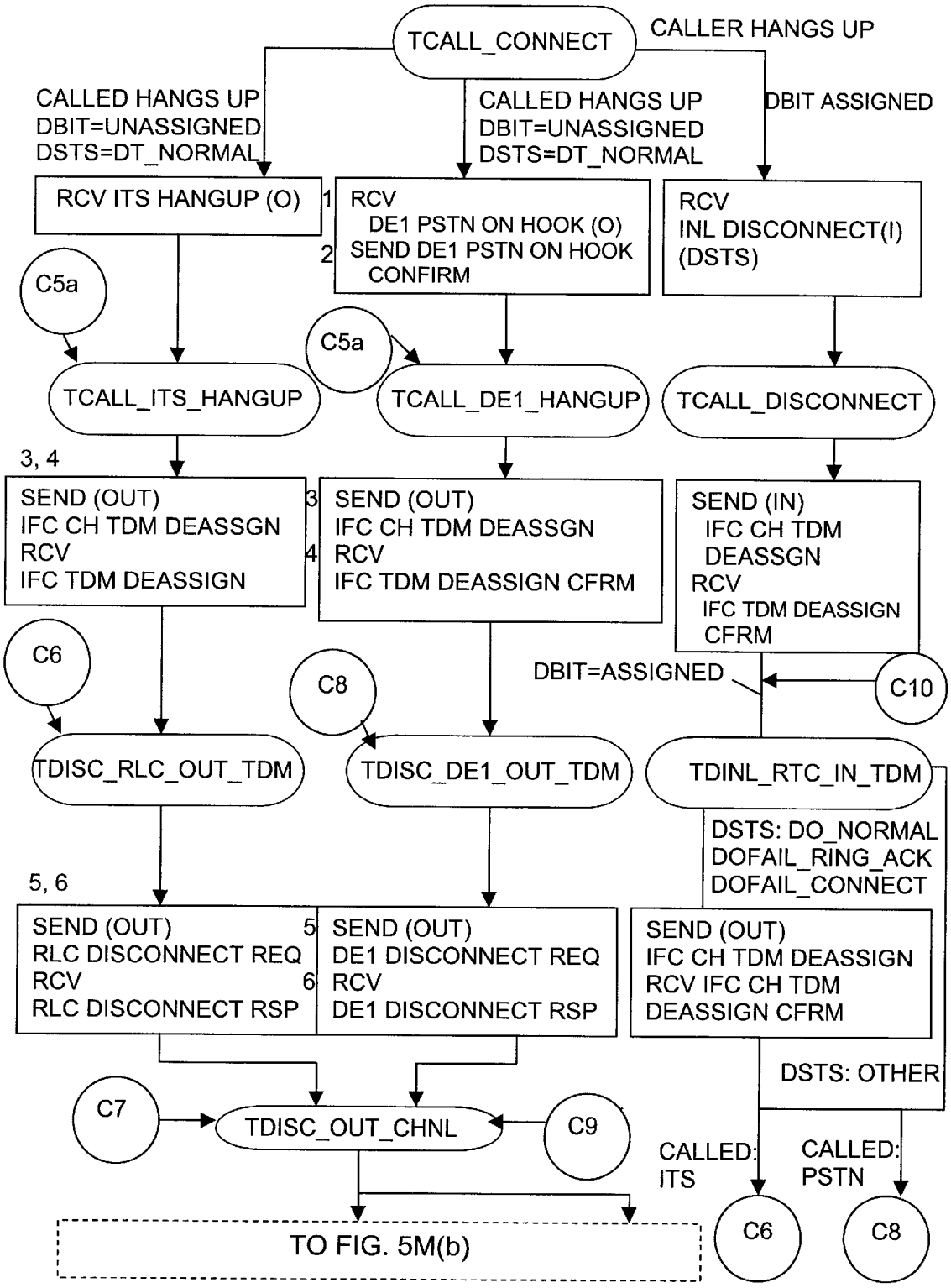
Figure 5M:
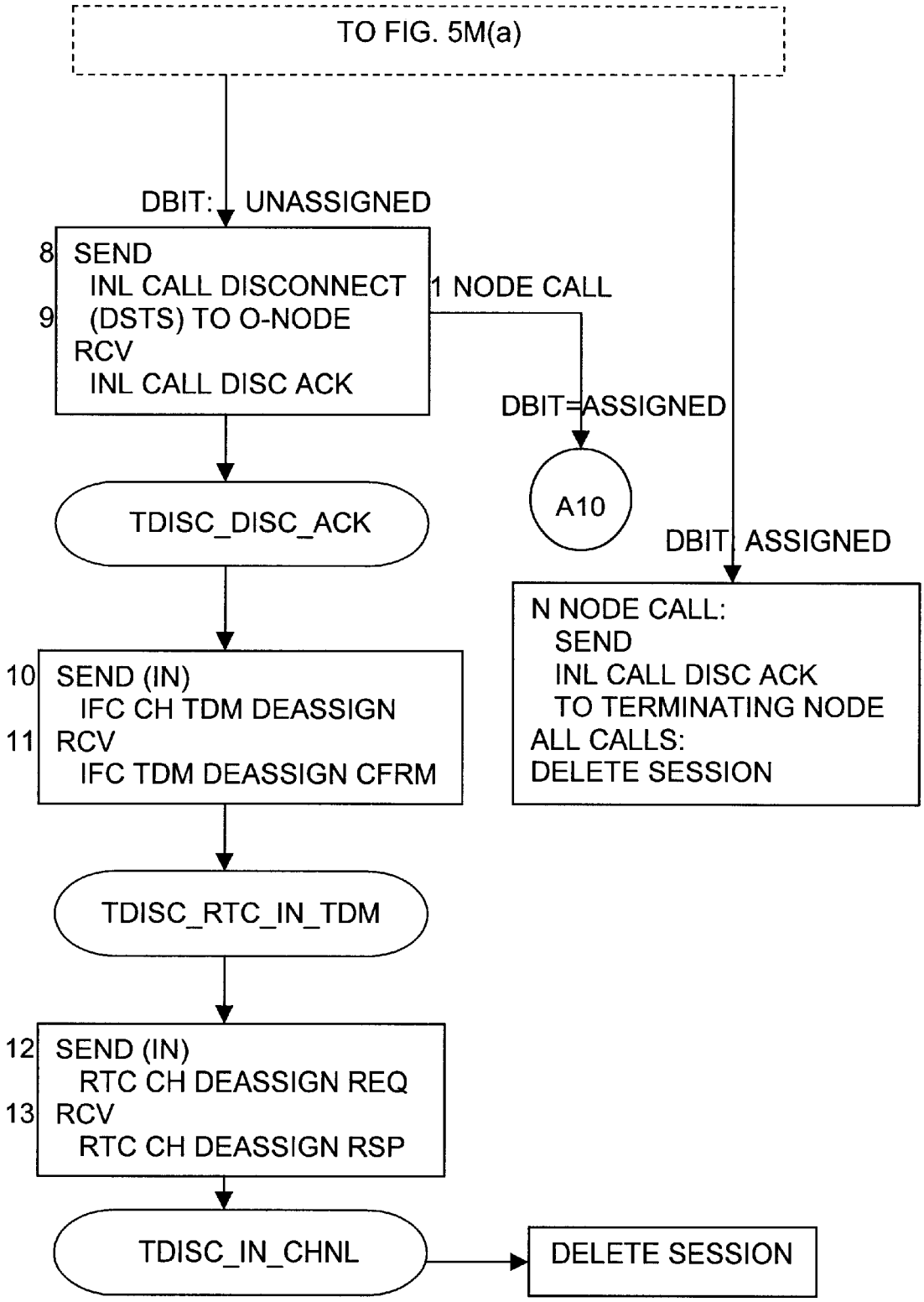
Figure 5N:
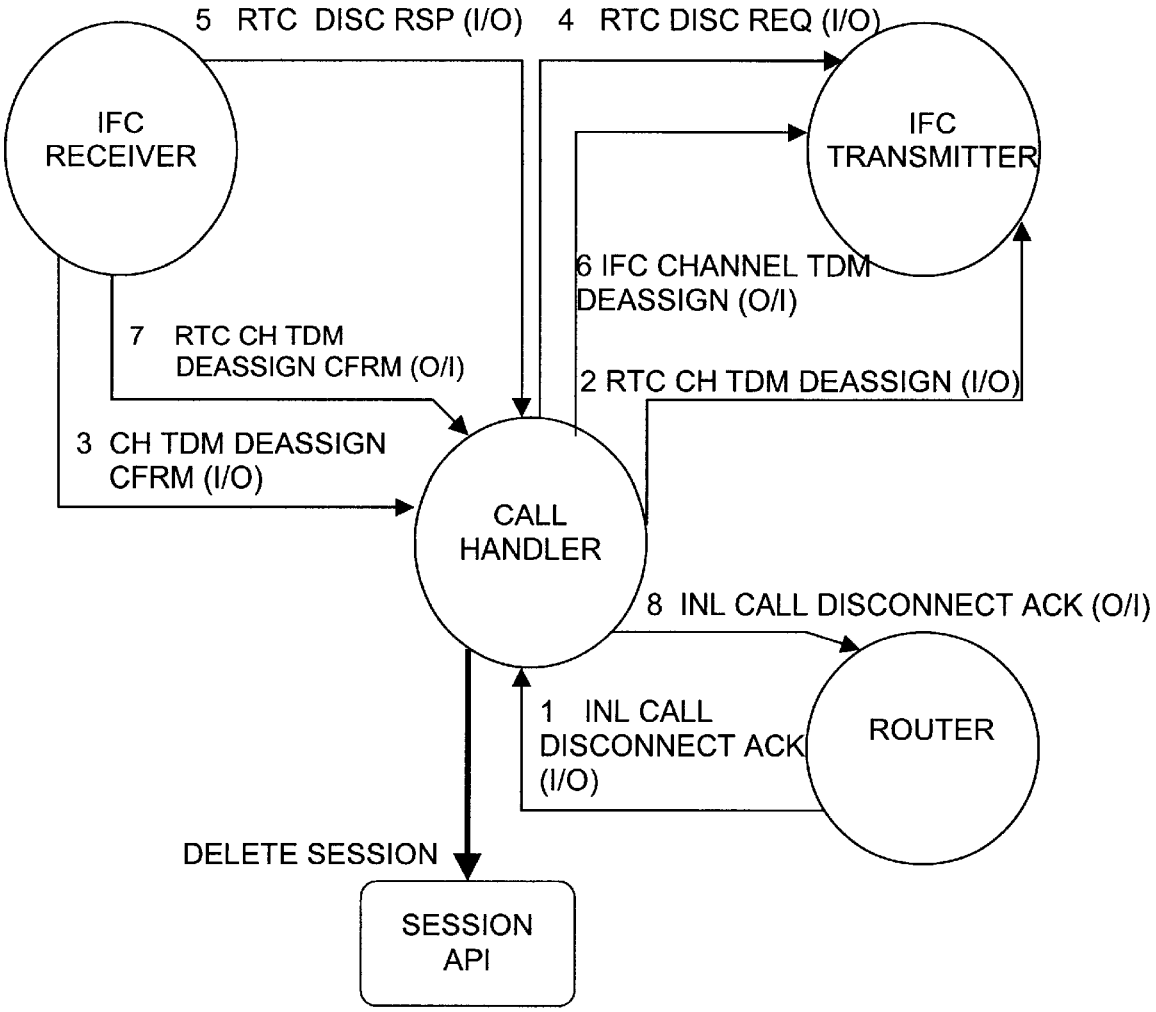
Figure 5P:
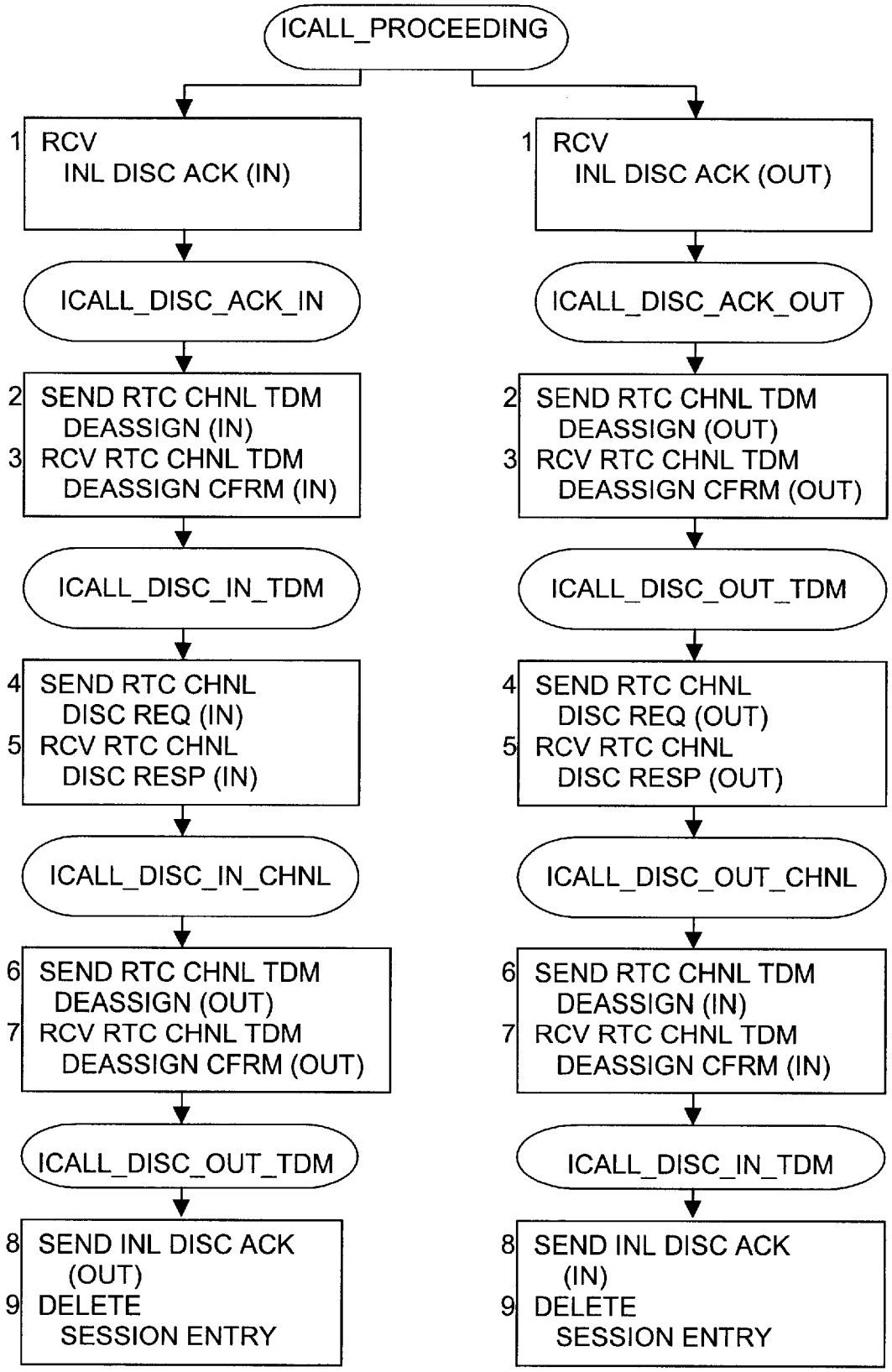

In order that the diagrams of FIGS. 5A–5P may be more readily understood, a general description is provided of selected call processing software routines included within the Common Control of each RTX/NIX unit. These call processing routines are designed to facilitate the distributed call handling and routing techniques contemplated by the present invention. Included among such routines is a Call Handler Task for performing call set up, call take down and channel connection functions. TABLE II provides a list of the subroutines included in a preferred implementation of the Call Handler Task:

TABLE II

| SUBROUTINE | FUNCTION |
|---|---|
| CALL SETUP | Setup a path from the calling to the called party |
| CALL FAILURE | No path can be setup for the call |
| CALL IN PROGRESS | Start and end of a connection |
| CALL TEAR DOWN | Ending a call |

The various types of calls processed by the Call Handler Task may be categorized based on the respective locations of the parties involved in placing and receiving a call. A "local call" refers to one in which only a single RTX unit is involved: that is, a single RTX serves as both the originating and terminating node. An "intra-system" call requires that more than a single RTX unit participate in relaying the call, but is one in which both the originating and receiving parties are each serviced by an ITS unit. Finally, an "inter-system" call refers to a call in which at least one of the parties is included within the PSTN. "Incoming" inter-system calls from the PSTN are first detected in the connecting NIX, and "outgoing" inter-system calls are routed through the connecting NIX to the PSTN. NIX units are not involved in handling local calls, and may not be included in the call path of intra-system calls.

When a call is initiated by an ITS unit, a Incoming request message is received by an RTX from the calling ITS. The RLC associated with the RTX then forwards the Incoming Request message over the PCC Bus to the RTX Common Control. The Incoming request message includes the numbers of the SRT and ITS units from which the call was received, a channel number, and the dialed number identifying the recipient party. An interface Card (IFC) Receiver Task within Common Control receives the message, removes PCC header information, copies the remaining information to an operating system envelope. The Incoming Request message as modified by the IFC Receiver Task is then provided to the Call Handler Task, which performs the following operations based upon information within the envelope header:

1. Determination of the number of the destination node ($N_{DES}$) associated with a destination RTX/NIX unit. The Call Handler Task ascertains the number of $N_{DES}$ by searching through the aforementioned Special, Mapped, and Ranged phone number lists as follows:

(a) Search the Special Phone Number List (b) If $N_{DES}$ not found (a), then search the Mapped Phone Number List, (c) If $N_{DES}$ not found in either (a) or (b), then search the Ranged Phone Number List.

If $N_{DES}$ is not found in either the Special, Mapped or Ranged Phone Number lists, then the call party is assigned to a default zone associated with the PSTN.

2. Identification of the inbound SRT to which the call is being routed. Given the inbound ITS unit to which the call is addressed, the Call Handler Task determines the inbound SRT by searching a Device Table.

3. Creation of a Session Entry which identifies, for example, the destination node number ($N_{DES}$), the inbound SRT, the inbound channel number, call type and direction, and the called phone number. The information within each Session Entry may be subsequently used for billing purposes.

4. Determination of a call time limit based the Class of Service of the calling party and on the location (i.e., zone) of the recipient party. This function is performed by a Class of Service Task, with the resultant CALL DURATION parameter being returned to the Call Handler Task. The Class of Service Task first determines whether the Class of Service of the calling party permits calls into the identified zone of the recipient party. If so permitted, the CALL DURATION parameter is returned with a value specifying the maximum allowed call duration. A value of zero is assigned to the CALL DURATION parameter by the Class of Service Task if callers of the indicated Class of Service are not eligible to place calls into the zone of the intended recipient party.

FIGS. 5A–5P may be grouped into three sets based on the type of call processing operation depicted within each diagram. Specifically, FIGS. 5–5P may be divided into sets of Call Set-up Diagrams (FIGS. 5A–5F), Call In-Progress Diagrams (FIGS. 5G–5J), and Call Tear-Down Diagrams (FIGS. 5K–5P). FIGS. 5A, 5C, 5E, 5G, 5I, 5K and 5N may be characterized as "intertask diagrams" useful for understanding operation of the various software "tasks" executed at each RTX node. The remaining diagrams within each set are "state diagrams", which illustratively represent the functions performed by each software task in greater detail. In the diagrams of FIGS. 5A–5P, solid lines are used to represent those message transmissions not requiring the interruption of further call processing while waiting for a message response. Dashed lines correspond to message transmissions resulting in the suspension of call processing until a response is received (see, e.g., the "Call Duration Request" message of FIG. 5A).

Turning now to FIG. 5A, there are shown the call setup steps initiated in response to a Caller requesting service. The request is received by an RTC of the RTX, is passed through the interface card (IFC) Receiver of the RTX Common Control, and is provided to the software module Call Handler Task included therein (Step 1). The Call Handler Task, working in conjunction with the Router Task, are primarily responsible for the routing of calls between network nodes. After messages are exchanged between the Call Handler Task and the RTC by way of the IFC Transmitter and Receiver (steps 2–5), a decision is made to route the call to another intermediary node (step 6). Additional details of the call processing operations performed by the Common Control software at the originating node are shown in the state diagram of FIG. 5B.

Referring now to FIG. 5C, an intertask diagram is provided which shows the process by which an incoming call at an intermediary node is forwarded to the next intermediary or destination node. The INL messages (steps 1 & 8) are sent to the Router Task, which results in inter-node messages being sent to the destination node via an intermediary node. Processing at each intermediary node is initiated by the RTC passing a message "INL Call Processing" over the bus to the IFC Rcvr. Again, the Call Handler Task functions in conjunction with the Router Task to determine the next node to which the call will be routed. In addition, a Channel Allocation Task inherent within the Call Handler Task tracks TDM channel availability at the RTX and allocates an available TDM channel when so requested. Further details of the call set-up processing performed at each intermediary node are set forth in the state diagram of FIG. 5D.

FIG. 5E provides an intertask diagram representative of the call set-up processing performed at a terminating node. Those incoming calls (step 1) terminating at an NIX node seek a connection to the PSTN through the DE1 Outgoing Connect Req (step 2). Similarly, those incoming calls terminating at an RTX unit seek a channel to the receiving SRT device by way of RLC Outgoing Request (step 2). The calling node is notified that the call has been accepted, by a user within the PSTN or at the destination SRT/ITS unit, via an INL Call Accepted message (step 12). More details of the call processing operations executed at the terminating node are depicted in the state diagram of FIG. 5F.

FIGS. 5G–5J are representative of the "in-progress" call processing performed which results in the generation of various call-state status messages. Referring now to FIG. 5G, an intertask diagram is provided which traces the operations performed at the terminating node in successfully establishing communication with an ITS (steps 1–6). Similarly, the processing and message flow leading to the establishment of a connection with the PSTN is also shown (steps 4–6). In both instances a status message is sent back to the originating node indicating that the call has been accepted, and that the call is in progress. The in-progress call processing occurring at the terminating node is shown in further detail in the state diagram of FIG. 5H.

Referring to FIG. 5I, an intertask diagram is provided which shows the in-progress call processing performed at the originating node upon receipt of a call acceptance status message from the terminating node. This message is received by the Common Control in the originating node via the IFC Receiver, and results in the initiation of a Billing Task which serves to record call duration and billing information. Additional details of the in-progress call processing carried out at the originating node are shown in the state diagram of FIG. 5J.

FIG. 5K illustratively represents the "tear-down" call processing performed at the originating and destination nodes subsequent to termination of a call by either party involved. For example, in the case of a call between an ITS unit and the PSTN the "tear-down" procedure is initiated when the user "hangs-up", or when the DE1 interface at the PSTN registers an On-Hook condition (step 1). Call tear-down proceeds as indicated (steps 2–13), and results in the discontinuation of call billing upon call termination. Further aspects of the call processing activity involved in the tear-down procedures performed at the originating and terminating nodes are respectively set forth in the state diagrams of FIGS. 5L and 5M.

FIG. 5N is an intertask diagram representative of the call tear-down process at an intermediary node, which is initiated by an incoming "INL Call Disconnect Ack" message (step 1). The message to tear down the call is then passed on to the next node by relaying the "INL Call Disconnect Ack" message (step 8). Additional details relating to the call tear-down procedure at an intermediary node are shown in the state diagram of FIG. 5P.

III. Frame Format and Signalling Structure

Figure 6A:
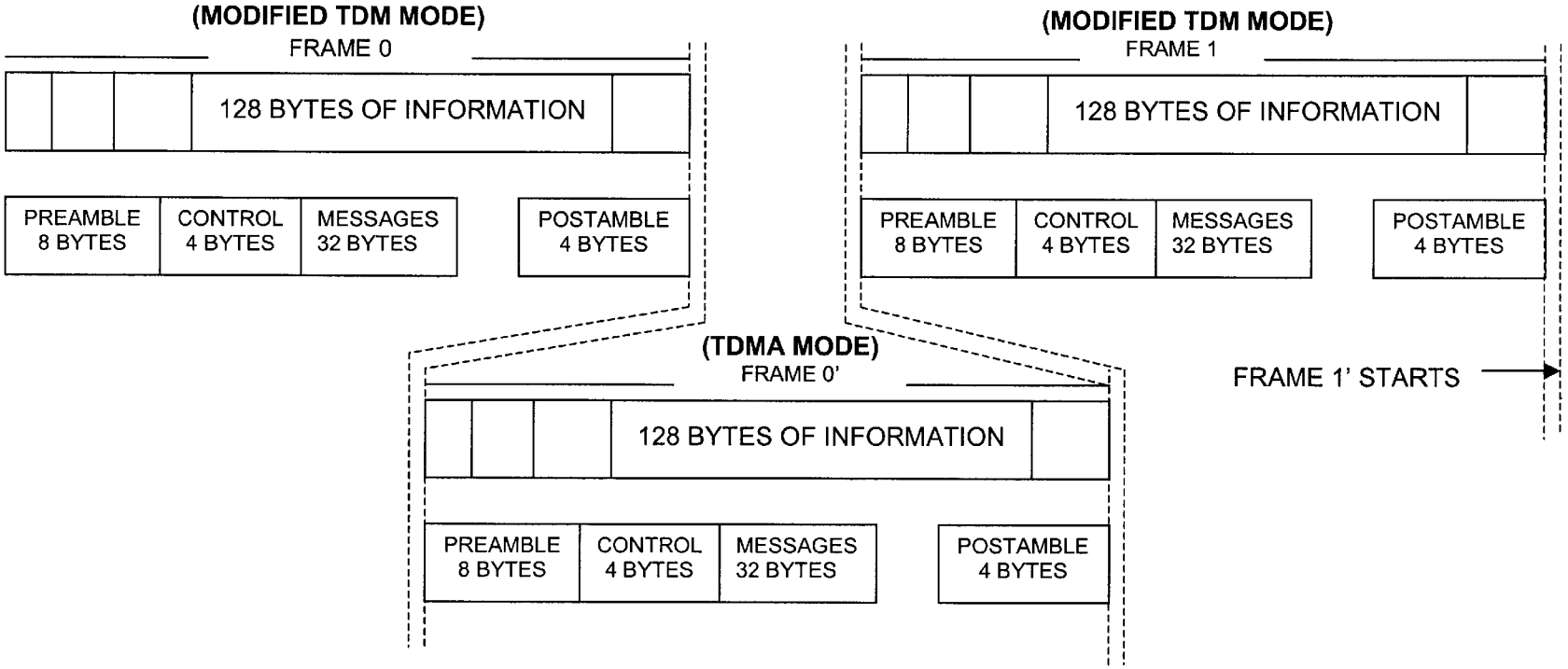
FIG. 6A is a diagrammatic representation of the frame format and signaling structure utilized in communications between remote telephone exchange (RTX) and intelligent telephone set (ITS) units.

FIG. 6A is a diagrammatic representation of the frame format and signaling structure utilized in communications between RTX and ITS units. As is indicated by FIG. 6A, in communications in a forward direction from an RTX unit to an ITS unit (i.e., Frame 0, Frame 1) the transmission format is time-division multiplexed (TDM), in which the channel information included within each frame is transmitted to a different ITS. That is, in the forward RTX/ITS link each frame position in the overall El-like frame of FIG. 6A is supplied with traffic channel information. In "reverse-link" communications from an ITS to an RTX, i.e., Frames 0', 1', the format is time-division multiple access (TDMA) in that each frame is devoted to communication between a particular ITS and an RTX. Each frame includes 32 channel time slots (TS0–TS31) of 4 bits each, for a total of 128 bits per frame. In the preferred embodiment each pair of frames, e.g., Frames 0 and 0', is transmitted in approximately 125 microseconds.

Within each frame transmitted by an RTX unit the first is a preamble of 8 bytes used in signal acquisition and clock synchronization between the transmitting RTX unit and the receiving ITS unit. Then a 4 byte control signal is sent followed by a 32 byte message field. The next is a 128 byte voice channel information field over each forward transmission link between the RTX unit and an ITS unit. The message field is used as an interface signaling channel over which messages are transmitted between all the network elements.

Transmission over each reverse link between an ITS unit and the RTX unit is in a TDMA mode, with each frame (e.g., Frame 0', Frame 1') being transmitted by a single ITS unit. Accordingly, each operative ITS unit transmits voice information only once every 30th frame. In the preferred embodiment there exists a brief guard time between transmission in a TDMA frame (e.g., Frame 0'), and an adjacent TDM frame (e.g., Frame 1). The reverse link TDMA format allows any ITS unit to be assigned to any available TDMA frame slot.

Figure 6B:
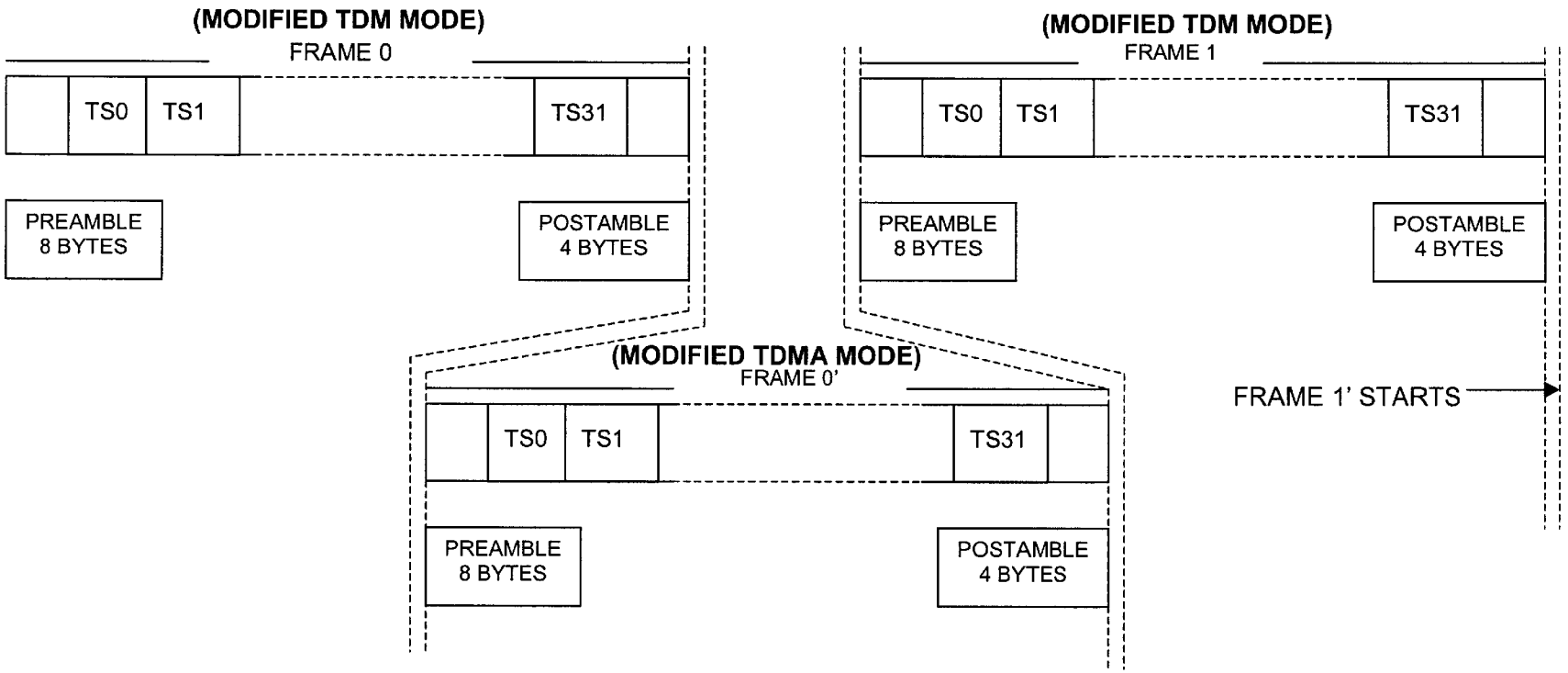
FIG. 6B is a diagrammatic representation of the frame format and signaling structure utilized in communications between system nodes, i.e., between a pair of RTX units or between a network interface exchange (NIX) unit and an RTX unit.

FIG. 6B is a diagrammatic representation of the frame format and signaling structure utilized in communications between system nodes, i.e., between a pair of RTX units or between an NIX unit and an RTX unit, over a set of 32 time-division multiplexed (TDM) trunk channels. The communications protocol between RTX and ITS units outlined in FIG. 6A is substantially similar to that depicted in FIG. 6B, with the exception that in FIG. 6B a TDM mode is used in both transmission directions. That is, a TDMA mode is not supported between pairs of RTX units, or between NIX and RTX units. In the preferred embodiment time assignment is made for the 32 time-division multiplexed (TDM) trunk channels of the TDM bus by way of the common channel interface signaling (CCIS).

In a preferred embodiment each of the 32 TDM channels of the TDM bus a 32 bit word, which results in there being the equivalent of 1024 simplex channels per TDM frame. Each of the interface cards (i.e., the RLC, RTC and DE1 interface cards) is capable of 32 active duplex channels. As is described below, each interface card accessing the TDM bus will include two registers per channel (i.e., 64 registers). Accordingly, an interface card assigned to handle the maximum number (i.e. 32) of duplex calls will require access to all 32 transmit time slots and all 32 receive time slots. Increased sectorization of the coverage area associated with a given RTX unit is achieved by implementing the unit with a plurality of hardware "shelves". In an exemplary realization the RTX unit may contain 4 shelves, with each shelf including up to 8 interface cards and a pair of Common Control module cards. The TDM and PCC buses of each shelf will typically be printed on the backplane thereof. The TDM and PCC buses of adjacent shelves are interconnected by way of shelf interface units (not shown), which provide buffering between the TDM and PCC buses of each shelf.

IV. System Communication Hardware

A. Rural Radio Transceiver (RRT)

Referring again to FIG. 4A, the NIX unit 24, the RTX unit 20, and the ITS unit 12 each require connection to a rural radio transceiver (RRT) in order to communicate with other system elements. In particular, each RRT functions to provide a radio interface for telecommunication traffic carried over both node-to-node (trunk) and node-to-subscriber (local loop) paths. The RRT units operate in pairs (e.g., RLC/RRT 48 and SRT/RRT 52) in a two-way burst i.e., "ping-pong", mode of digital radio transmission. This allows for full duplex communication between each RRT pair using only a single radio frequency. For example, RLC/RRT 48 transmits while SRT/RRT 52 receives, and vice versa.

In a preferred implementation each RRT within the system 10 operates using a 2.048 Mbps digital transmission format (e.g., the E1 standard transmission mode specified by CCITT recommendation G921-E1 specification) to communicate with a comparison RRT utilizing a radio link.

As is indicated by FIG. 4A, each RRT is associated with one of three "host" interface cards. That is, each RRT operates in conjunction with either a Radio Trunk Card (RTC), a Radio Line Card (RLC) or a Subscriber Remote Terminal (SRT). Each RRT will be configured either as a MASTER RRT or a SLAVE RRT depending on the direction of network clock propagation relative to the host card with which the RRT is paired. If network clock propagation is into the RRT from its host card, the RRT is configured as a MASTER. If clock propagation is from the RRT to the host card, the RRT is configured as a SLAVE. Hence, each SLAVE RRT must recover the network clock from the received data stream.

In the preferred embodiment each RRT is programmed to transmit at one of eight center frequencies by the Network Control Station 32 (FIG. 1). Four of the eight center frequencies are included in a first frequency band for links between ITS and RTX units (local distribution links), while the remaining center frequencies are included within a second frequency band reserved for communication between a pair of RTX units or between an RTX and an NIX unit (transfer links).

The RRT center frequency is programmed by downloading a serial data stream through the RRT interface connector. RRTs may be set to any of either center frequencies; two bands, each with four center frequencies. One band is used for SRT-RLC radio links, while the other band is used for RTC-RTC radio links. In addition, the precise implementation of each RRT will be dependent upon its potential for proximity to other RRT's operative to transmit on an identical frequency. More specifically, RTC/RRT's and RLC/RRT's are assumed to be proximate other RTC/RRT's and/or other RLC/RRT's.

SRT/RRT's can operate in one of three distinct modes: (i) Transmit Mode, (ii) Receive Mode, or (iii) Sleep Mode, RTC/RRT's and RLC/RRT's operate only in Transmit and Receive Modes. In an SRT/RRT, sleep mode is controlled through a signal provided by the host SRT card through a sleep enable (SLEEP_E) line. When in Sleep Mode all circuits within the RRT are turned off, but memory within the Control and Status Circuits retains the RRT center frequency setting. In all RRT's the Transmit and Receive Modes are governed by the host SRT, RLC or RTC card through the interface lines.

Figure 7:
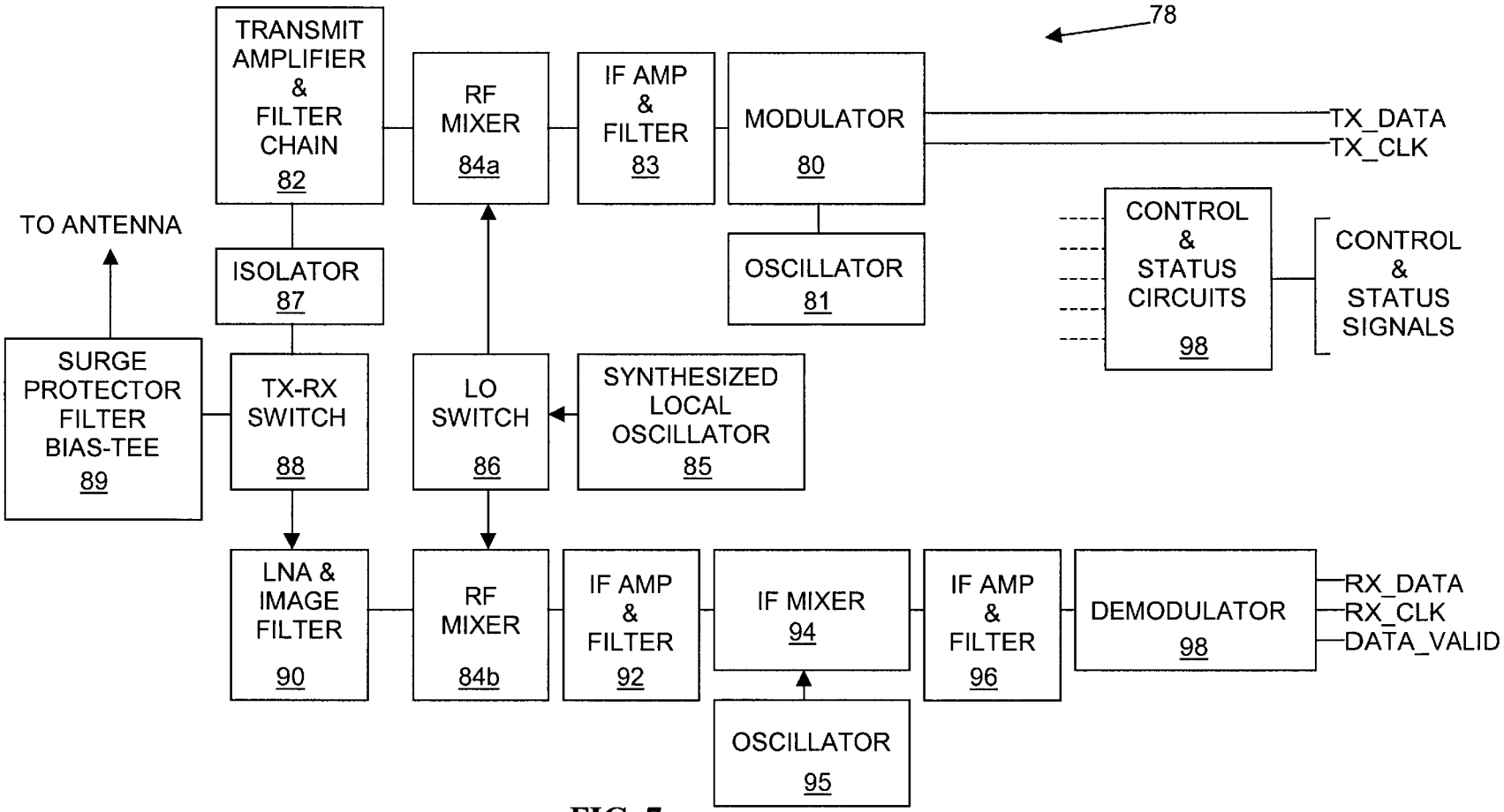
FIG. 7 is a block diagram of an exemplary implementation of a rural radio transceiver (RRT).

FIG. 7 is a block diagram of an exemplary implementation of a rural radio transceiver (RRT) 78. Referring to FIG. 7, in Transmit Mode the host card supplies transmit clock and data signals to the modulator 80 over the TX_Clk and TX_Data lines, respectively. The TX_Clk is utilized to govern the latching of the data signal TX_Data within the modulator 80. The modulator 80 scrambles the data signal with a predefined pseudorandom (PN) sequence, and uses the resultant scrambled data signal to produce an intermediate frequency (IF) signal by modulating the phase of an RF carrier provided by the oscillator 81. In the preferred embodiment the modulator 80 includes scrambler, data encoder, and pulse shaper circuit elements capable of being conventionally realized using, for example, discrete digital logic in conjunction with read-only memory (ROM) look-up table. The modulation is preferably performed using a modified offset quadrature phase shift keying (MOQPSK) technique in which a data value of "0" causes no change in carrier phase, while a data value of "1" results in a phase shift of either ±90 degrees. This technique minimizes occupied bandwidth while maintaining a constant RF envelope, thus allowing the RF transmit amplifier 82 to be realized using a power-efficient Class C amplifier.

Referring again to FIG. 7, a transmitter IF amplifier and filter 83 amplifies the IF signal from modulator 80 to a specified magnitude, and also filters harmonics and other spurious signals created during modulation and IF amplification. RF mixer 84 operates to translates the IF frequency signal to an RF output frequency by mixing the IF signal with the signal from a synthesized local oscillator 85, which may be set in accordance with the desired transmit and receive frequencies of the RRT. During transmit mode operation an LO switch 86 relays the LO signal from synthesized local oscillator 85 to the RF mixer 84a, while during receive mode operation the LO switch is commanded by an RRT controller (not shown) to couple to the LO signal to an RF mixer 84b in the receive path. Within the transmit path, the RF transmit amplifier and filter chain 82 augments the signal power produced by RF mixer 84a to an appropriate level, and further filters harmonics and other spurious signals from the RF output signal. A ferromagnetic isolator 87 ensures the output impedance of the RF transmit amplifier 82 is maintained at constant value by preventing RF signal energy reflected from the RRT antenna from reaching transmit amplifier 82.

As is indicated by FIG. 7, the output of isolator 87 is provided to Tx-Rx switch 88, which is preferably realized as a single-pole, double-throw RF switch operative to connect the antenna port to either the transmit or receive path. The switch 88 is set to the appropriate position in accordance with transmit/receive mode timing information provided by the RRT controller. The Tx-Rx switch 88 is coupled to the RRT antenna through a multi-purpose RF interface module 89 disposed to perform surge protection, filtering and antenna bias functions. The RF interface module 89 protects the receive and transmit path circuitry high-energy pulses received by the RRT antenna, and prevents transmission of frequency harmonics by RF amplifier 82. In an alternate implementation the RF interface 89 injects a bias current into the RRT antenna cable for use by optional remote amplifiers coupled thereto. The RRT antenna then radiates the transmit signal for reception by one or more companion RRTs tuned to the same RF frequency. In response, each companion RRT transmits a return signal for reception by the RRT of FIG. 7.

Each return signal received by the RRT antenna is passed by RF interface module 89 and Tx-Rx switch 88 to a low-noise amplifier (LAN) & image filter 90. The LNA and image filter 90 amplifies the low-level received signal, and suppresses RF energy at the image frequency of the RF mixer 84b. After being translated to the receiver intermediate frequency (IF), the resultant received IF signal is amplified and filtered by a first IF amplifier and filter network 92. The filtered IF signal is further frequency downconverted within IF mixer 94 using a reference signal from oscillator 95. Next, the output signal produced by IF mixer 94 is again amplified and filtered within a second IF amplifier and filter network 96, which sets the noise bandwidth seen by demodulator 96. In a preferred embodiment the demodulator 98 detects a predefined data sequence, or preamble, used to frame each received data packet. This effectively synchronizes the demodulator 98 to the received data stream, and thereby allows identification of phase transitions in the received data as well as recovery of the embedded clock signal. The recovered data and clock signals are then decoded, and the resultant Rx_Data and Rx_Clk bit streams provided to the interface card associated with the RRT for further processing. The demodulator 98 also produces a Data_Valid signal, which marks the initial bit of each received data burst.

The RRT controller (not shown) interfaces with the RRT components depicted in FIG. 7 through RRT control and status circuits 98. For example, control data such as a frequency set point for the synthesized local oscillator 85, transmit/receive sleep mode control, and output power level control are forwarded by the control and status circuits 98 from the RRT controller. In addition, the control and status circuits 98 convey to the RRT controller status information such as transmit/receive signal power level, and a lock status indication provided by the synthesized local oscillator 85.

Figure 8:
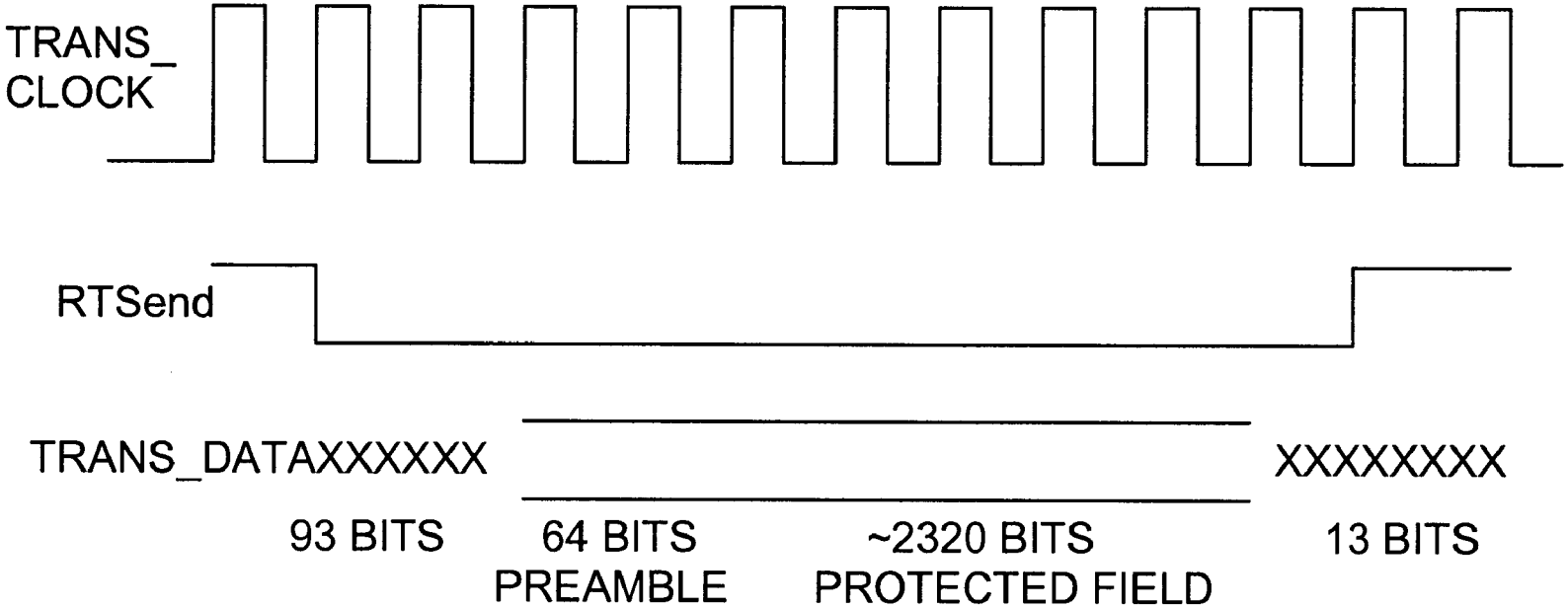
FIG. 8 is a timing diagram showing the Trans_Clock, RTSend, and Trans_Data waveforms provided to an RRT during Transmit Mode operation.

FIG. 8 is a timing diagram showing the TX_Clk, RTSend, and TX_data waveforms provided to the RRT 78 (FIG. 7) during Transmit Mode operation. As is indicated by FIG. 7, the transmitted data burst includes a 64-bit preamble followed by approximately 2320 bits of "protected field", in which is included the data to be transmitted. In the preferred embodiment the data within the predetermined field is transmitted in 300 $\mu$s bursts, with each burst being separated by approximately 1 ms.

Different preambles are employed for those transmitting RRT's configured as a MASTER and for those configured as a SLAVE. Each preamble is utilized to:

(i) facilitate the clock recovery process, (ii) identify the transmitted data as originating from either a MASTER or a SLAVE RRT, and (iii) enable the RRT receiving the transmitted data to detect the beginning of the "protected field".

B. SRT/RRT Module

Figure 9:
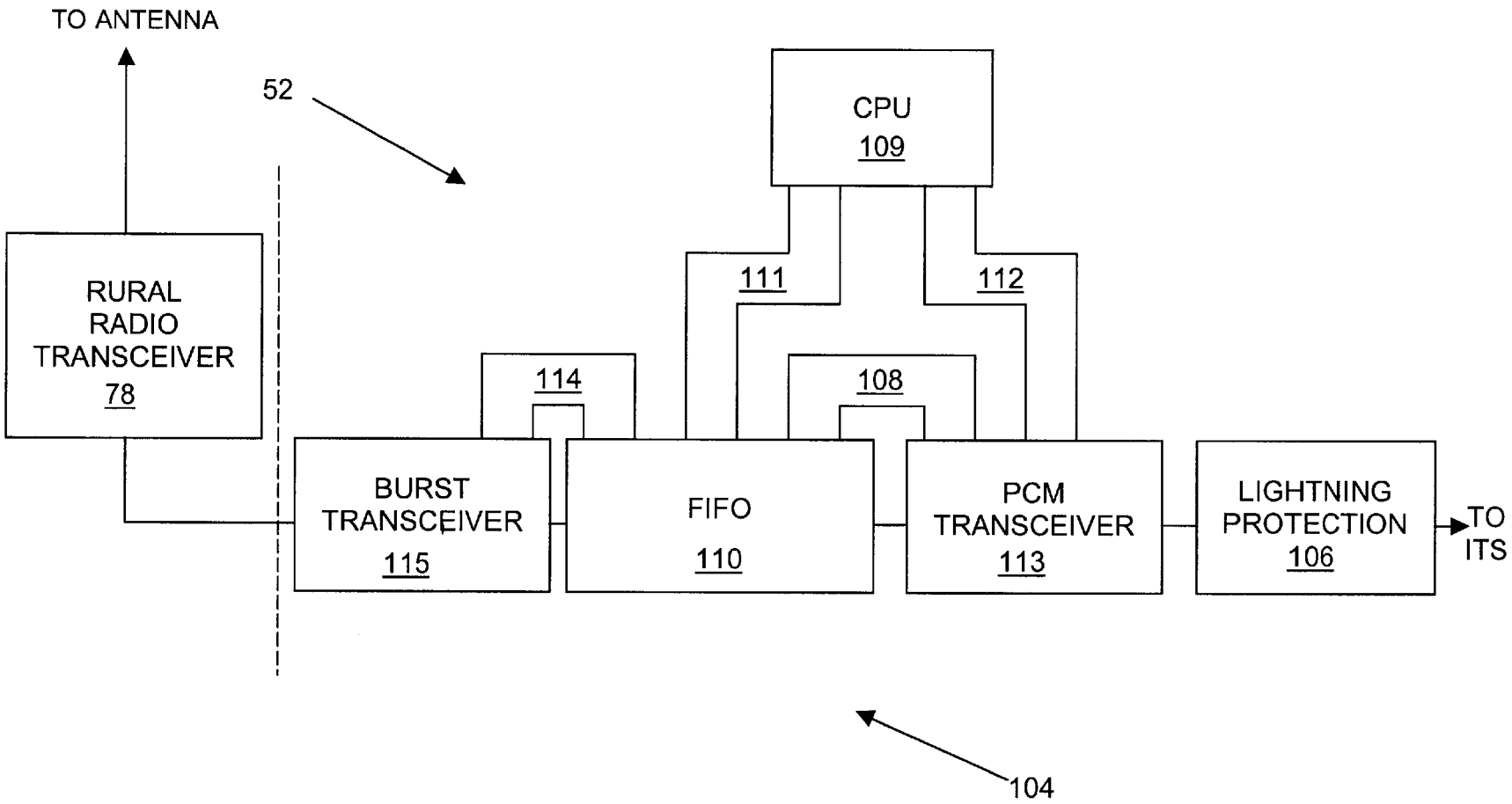
FIG. 9 shows a block diagram representation of a subscriber remote terminal/rural radio transceiver (SRT/RRT) module.

Referring to FIG. 9, there is shown a block diagram representation to the Subscriber Remote Terminal (SRT) 104 included within the SRT/RRT module 52 (FIG. 4A). A multiplicity of SRT units will typically be deployed about each RTX unit, with each SRT unit providing service to an ITS unit. As was described above with reference to FIG. 7, the RRT 78 of the SRT/RRT module 52 is operative to transmit and receive RF signal energy through an antenna (not shown), thereby establishing communication with the local RTX. Control information is provided to the Control and Status Circuits 98 (FIG. 7) of the RRT by a series of control leads connected to a number of circuits throughout the SRT.

The SRT 104 must provide for reliable radio communication between the one or more local ITS units associated therewith and the RTX unit responsible for covering the area in which the SRT is situated. An SRT is typically linked via twisted pair cable to each ITS for which it provides service. The SRT/ITS link, generally of a length of less than approximately 1 km, may comprise either a standard two-wire analog interface or an all digital interface. In the preferred embodiment the ITS is equipped with a CODEC (i.e., coder-decoder) for converting digital transmissions from the SRT into analog form. In addition, the ITS is designed to perform call initialization functions such as set ringing, tone decoding, echo cancellation, and the like. In systems including such digital ITS units, each companion SRT is designed to provide:

(i) battery level monitoring and "low-battery" alarm capability, (ii) signal strength measurement and "low-signal" alarm capability, and (iii) transmit power control.

In alternate implementations the SRT is designed to include the following for support of standard telephone sets:

(i) a generator for producing "battery" and ringing voltages, (ii) a CODEC for converting digital transmissions from the RTX into an analog form suitable for processing by a standard telephone, (iii) provision for generation of audible signalling tones (e.g., by way of the CODEC), and (iv) control of the CODEC, tone generator, and telephone ringer unit.

The SRT may also optionally be configured to perform the following on a per channel basis:

(i) tone decoding for signal acquisition, and (ii) switchable echo cancellation.

Referring again to FIG. 9, the voice signal from an ITS unit is coupled to the SRT 104 through lightning protection circuit 106. In a preferred implementation the SRT/RRT module is positioned on a mast or tower to facilitate radio communication, and hence relies upon the lightning protection circuit 106 to dissipate high-energy transients such as lightning and the like. The received voice signal is provided to a pulse code modulation (PCM) transceiver 113, which is preferably realized as a standard Universal Digital-Loop Transceiver such as a Motorola MC145422/26 Universal Digital-Loop Transceiver (UDLT). The radio transceivers will preferably be capable of providing full duplex synchronous 64 kbps voice channel communication, as well as providing a pair of 8 kbps signalling channels. One of the signalling channels is reserved for serial messaging between the ITS and the RTX (via the SRT), and the other for handshaking between the ITS and SRT.

The resultant pulse code modulated digital signal is transferred from the PCM transceiver 113 over a PCM bus 108 into FIFO buffer 110. Message advance, call control and RRT control information are provided by a microcontroller (CPU) 109 (e.g., a Motorola 68 HC11) over a first 111 and a second 112 internal SRT bus. A third internal SRT bus 114 serves to digitized voice data and messages between FIFO 110 and a burst transceiver 115. In a preferred implementation the burst transceiver 115 packetizes the information provided by bus 114 into a form suitable for burst transmission by the RRT 78. As will be appreciated by those skilled in the art, the SRT 104 operates in a complementary manner to process packetized data/message information received from the RRT 78.

C. RLC/RRT Module

Figure 10A:
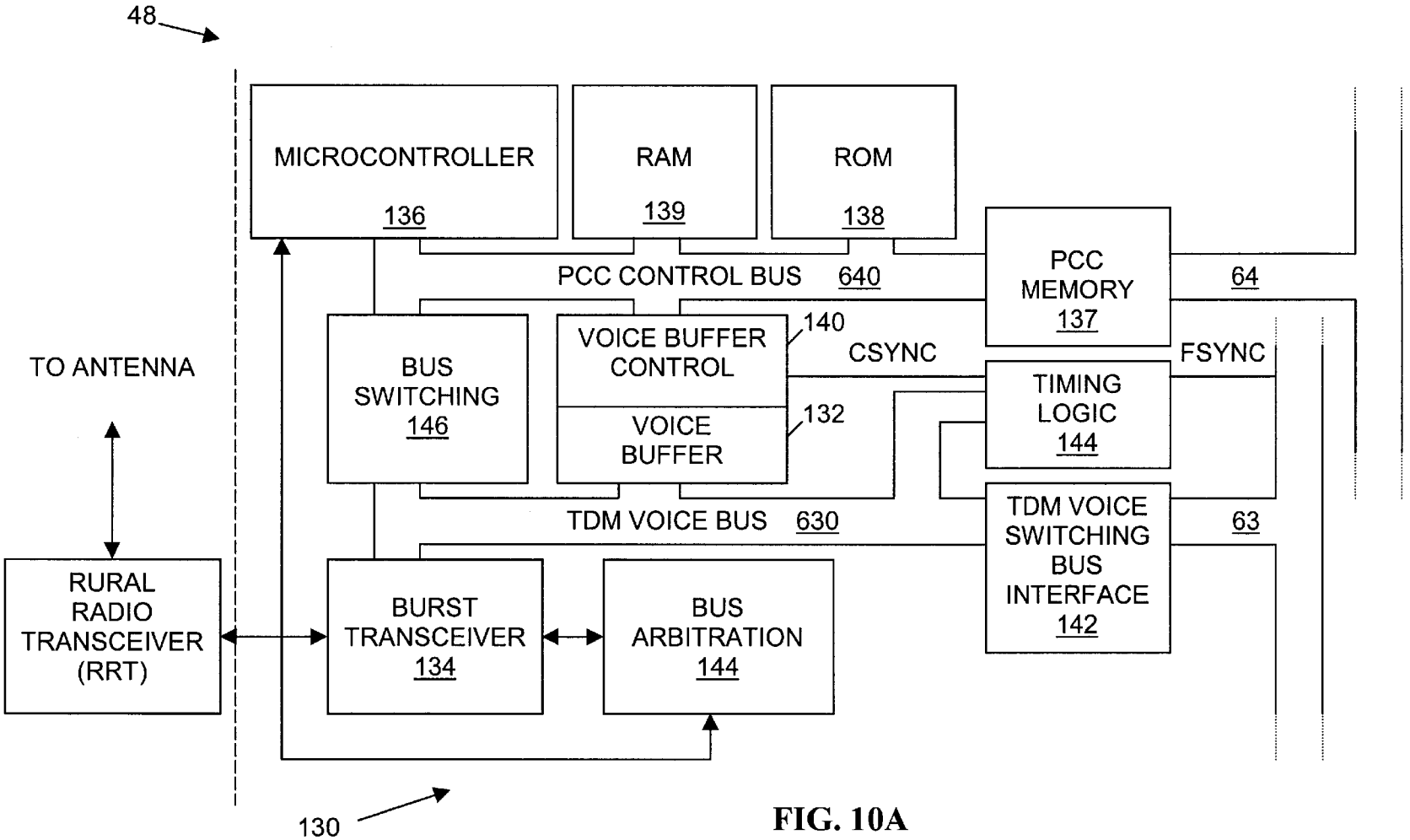
FIG. 10A shows a block diagram representation of a radio line card/rural radio transceiver (RLC/RRT) module.

Referring to FIG. 10A, there is shown a block diagram representation of the Radio Line Card (RLC) 130 included within the RLC/RRT module 48 (FIG. 4A). The RLC serves as an interface between an RTX and an associated RRT with respect to inter-node "trunked" communications. Inter-node communications correspond to those time division multiplexed (TDM) communications between NIX and RTX units, as well to TDM communication between a pair of RTX units. In an exemplary embodiment the internode TDM bus includes 32 channels, of which 31 are typically used to support voice communication and one (e.g., channel #16) is utilized for internode message communication.

As is indicated by FIG. 10A, the RLC 130 includes a voice buffer 132 for storing voice data sent to, and received from, each ITS unit with which the RTX unit 20 (FIG. 4A) is in communication. In an exemplary implementation the voice buffer 132 is capable of storing a predetermined amount (e.g., 32 ms) of voice data, and includes 32 transmit mode and 32 receive mode entries. Each entry within the voice buffer is reserved for an ITS unit to which the RTX unit has assigned a communication channel (i.e., a TDMA time slot), and contains 32 bytes of information and 10 bytes of register data. Data is transferred, over the TDM bus 63 and through a burst transceiver 134, at an exemplary 8 kbps rate. The burst transceiver 134 may be implemented using, for example, a Motorola Dual channel Data Link Controller MC145488 or equivalent, and performs rate adaptation between the burst rate (e.g., 6.144 Mbps) of the RRT and the TDM bus.

The RLC 130 is seen to include a micro-controller 136, such as an 80C186 microprocessor or the like, operative to govern message relay between the RRT and the Common Control of the associated RTX unit. A PCC memory 137 is provided for exchanging message information between the Common Control PCC bus and an internal PCC control bus 640. An Interrupt Handler Routine stored within read-only memory (ROM) 138, and executed by microcontroller 136, is responsible for conducting this message exchange. The Interrupt Handler also directs:

(i) the loading and unloading of the voice buffer 132.

(ii) the provision of messages on a section by section basis to burst transceiver 134 for relay to the RRT, where the burst transceiver 134 uses Direct Memory Access (DMA) to transfer data to and from random access memory (RAM) 139, and (iii) assembly of messages received from the RRT, and stored within PCC memory 137, for relay to the Common Control of the RTX. Additional routines stored within ROM 138, and executed by micro-controller 136, also set the frequency and power level of the RRT, and poll each of the ITS units in communication with the RLC 130.

Referring again to FIG. 10A, the RLC 130 further includes a TDM voice switching bus interface 142 operative to connect the voice channels on the internal TDM voice bus 630 to the time slots of the TDM bus 63 of the Common Control. The bus interface 142 is preferably implemented as a crosspoint switch, and operates to write the data stored within the 32 entries of voice buffer 132 into the corresponding 1024 time slots of TDM bus 63. A bus arbitration unit 144 is provided for arbitrating among any competing requests, for access to the TDM voice bus 630, made by the TDM bus interface 142, the burst transceiver 134 and the microcontroller 136.

Figure 10B:
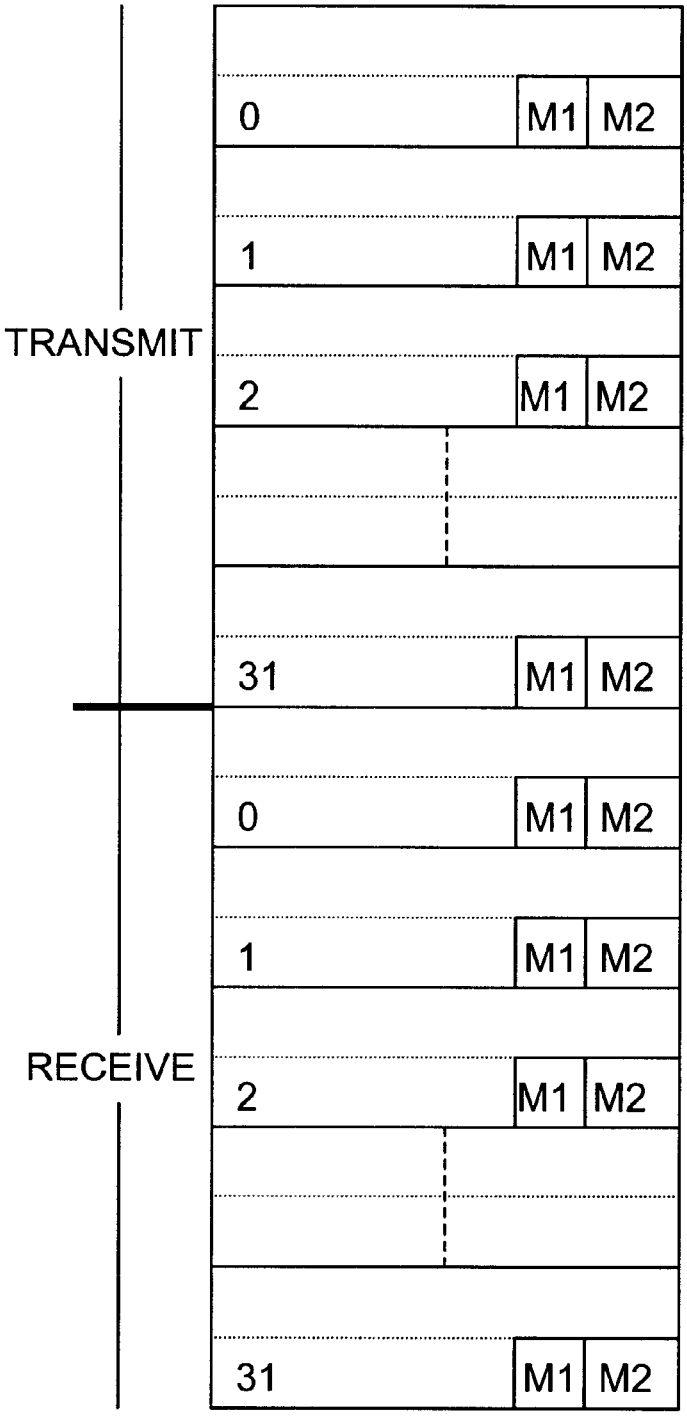
FIG. 10B provides an illustrative representation of the organization of a voice buffer included within the RLC of FIG. 10A.

Turning now to FIG. 10B, an illustrative representation is provided of the organization of the voice buffer 132. As is indicated by FIG. 10B, the voice buffer stores the contents of the 32 transmits and 32 receive channels of the RLC carried by the TDM bus. Each of the transmit and receive channels is mapped to a specific slot within the TDM bus by the microcontroller 136, under the direction of messages from the RTX Common Control conveyed over the PCC bus 64. The TDM time slot to which each transmit and receive channel is mapped is identified by a 16-bit word included within the last two bytes (M1 and M2) of each entry within the voice buffer 132. For example, the word stored within bytes M1 and M2 of Transmit Channel 0 indicates to which of the 32 TDM channels the data stored within this entry in the transmit portion of the voice buffer 132 will be written. A separate bit in each voice buffer entry is set if the entry is "in use". An entry is in use if it is currently accepting data from, or supplying data to, the TDM bus 63.

Referring again to FIG. 10A, voice buffer control 140 operates to govern transfer of information between the voice buffer 132 and the TDM bus 630. Voice buffer control 140 is synchronized to the TDM bus 630 via a signal timing control logic 144, which is keyed to 4 kHz Frame Sync (FSYNC) signal provided by Common Control. In response to receipt of the FSYNC signal, the timing control logic 144 begins counting TDM time slots (beginning from slot 0) and provides the current TDM slot value to voice buffer control 140 by way of a Channel Sync (CSYNC) signal. The current slot number, as defined by CSYNC, serves as an index for the voice buffer control 140 into the voice buffer 132. Specifically, the CSYNC signal results in the voice buffer control 140 marking as "in use" the corresponding entry within the voice buffer 132. When an entry in the voice buffer is marked as "in use", data is transferred between the entry and the corresponding time slot of the TDM bus 63.

The RLC 130 is operative in either a "polling" mode or an "assignment" mode. In the polling mode, the RLC sends interrogatory messages to the SRT/ITS units in the coverage area of the RTX. A given ITS will respond only if it is in an "active mode", and looking for an available channel. As is discussed below, each ITS is capable of functioning in either a "sleep" mode (i.e., a low-power standby mode), or in an "active" mode. Active mode operation is triggered in response to, for example, detection of a burst transmission from the RTX or a handset "off-hook" condition.

During both polling and assignment modes the microcontroller 136 fetches, from microcontroller memory 138, an SRT number from a map of those SRT's disposed within the RTX coverage area. The fetched SRT number is then written into the "in use" address within the transmit portion of the voice buffer 132, and other control bits are written to the "in use" address specifying either polling or assignment mode operation. Any reply received from the polled SRT is then written into the address of the same number within the receive portion of the voice buffer 132.

D. RTC/RRT Module

Figure 11:
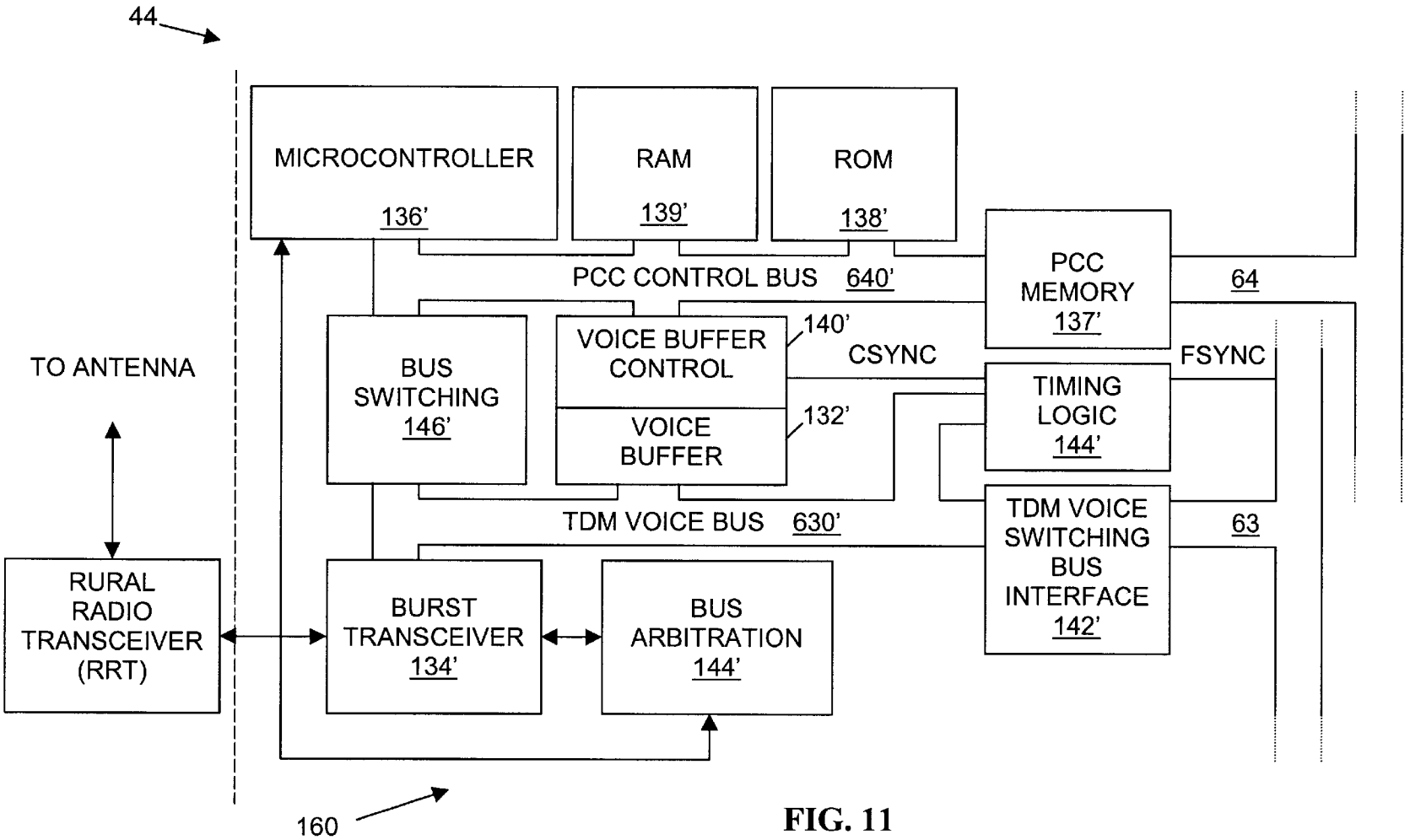
FIG. 11 shows a block diagram representation of a radio trunk card/rural transceiver (RTC/RRT) module.

Referring to FIG. 11, there is shown a block diagram representation of the Radio Trunk Card (RTC) 160 included within the RTC/RRT module 44 (FIG. 4A). As is evident from a comparison of FIGS. 10A and 11, the RTC 160 is implemented in a substantially manner as the RLC 130. Accordingly, primed reference numerals are used to identify network elements in FIG. 11 corresponding to those in FIG. 10A. The Interrupt Handler and other software routines governing operation of the RLC 130 and RTC 160 differ to the extent required to support the TDMA and TDM frame structures described with reference to FIGS. 3 and 4. In a preferred implementation the voice buffer 132' of the RTC need only be capable of storing approximately 1 ms of data, hence requiring approximately only 2 kb of memory space.

The RTC 160 facilitates communication between adjacent RTX units, or between an NIX and an RTX unit, by way of 31 digital voice channels and one Common Control signalling channel. Channel zero serves as a dedicated high speed serial control channel for maintaining synchrony between the data buses of receiving and transmitting RTX and NIX units. Call routing, data transfer, program updating, alarm transfer, diagnostic procedures and other signalling information is transferred over channel zero.

The 32 channels are transmitted over RTX/RTX or RTX/NIX links at an overall rate of 64 kbps, and are buffered in the voice buffer 132 of the RTC 160. The RTC burst transceiver 134 transmits/receives data in 256 byte packets, at a rate of 31.25 packets per second (i.e., 6.144 Mbits/sec). An additional register (not shown) on the RTC 160 is used to select one of several clocking modes.

RTC/RLC Mute Mode

During certain conditions the RTC and RLC cards may be blocked from writing to either the TDM or PCC buses. This blocked-write mode, referred to as mute mode, is set automatically during system Power-on Or Reset (POR). During mute mode operation the local microcontroller will perform the requisite diagnostic and initialization functions. Once the interface card has been initialized, the microcontroller will again enable the TDM and PCC bus drivers for write access.

Mute mode may also be set by the microcontroller if an operational fault is detected, or if it so directed by the Common Control. In the latter case, the microcontroller can continues to receive PCC messages and hence remains vigilant with respect to issuance of a reactivation message from the Common Control.

V. Detailed Description of Network Elements

A. Rural Telephone Exchange (RTX)

As was described with reference to FIG. 4A, the RTX unit 20 is connected to an RTC/RRT module 44 operative to communicate with the RTC/RRT 40 module. The RTX unit 20 is also connected to a radio line card (RLC), in combination with a rural radio transceiver (transmitter/receiver) (RRT), which collectively facilitate communication with the intelligent telephone set (ITS) 12.

Figure 12:
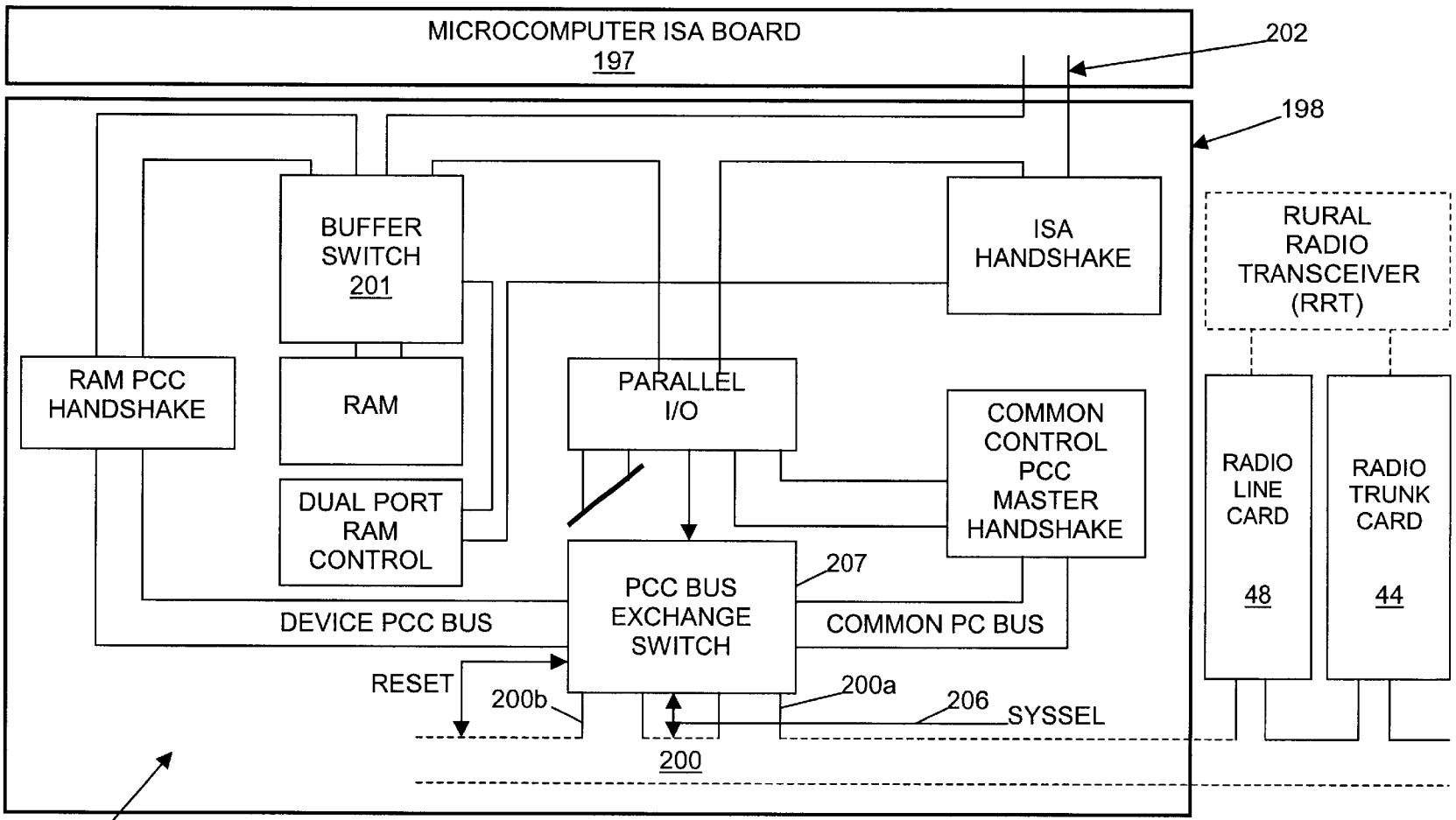
FIG. 12 provides a more detailed block diagram representation of a preferred implementation of an RTX Common Control unit.

FIG. 12 provides a more detailed block diagram representation of a preferred implementation of an RTX Common Control unit suitable for inclusion in the RTX unit 20. The RTX Common Control unit includes a Common Control interface board 196 for facilitating communication between Common Control microcomputer 197 and the RLC/RRT 42 and RTC/RRT 44. In an exemplary embodiment the microcomputer 197 is realized using the motherboard of an IBM PC/AT compatible microprocessor or similar computer microprocessor. The microcomputer 197 controls the operation (e.g., switching, call billing, etc.) of the RTX unit 20 via a selected one of dual Parallel Common Control (PCC) buses 200a and 200b. The PCC buses 200a and 200b communicate with the RLC/RRT and RTC/RRT units 42 and 44 by way of a PCC backplane bus 200. The backplane bus 200 contains the PCC and TDM buses into which all modules interface, and hence is shown in phantom in FIG. 12.

In a preferred embodiment a redundant Common Control unit, having a separate microcomputer (not shown), may be provided for the purpose of ensuring the system continues to function in the event that microcomputer 197 becomes inoperative. The redundant microcomputer will typically monitor system status should it be required to assume system control. Redundant PCC buses 200a and 200b are provided for establishing communication between the pair of Common Control microcomputers and the RLC/RRT and RTC/RRT units 48 and 44, respectively.

The interface board 196 translates standard ISA signals received from the microcomputer ISA bus 202 into a predefined format supported by the PCC buses 200, 200a and 200b. In a preferred embodiment the PCC buses includes a single 1024 kbyte address space from which 16 bits (i.e., two 8-bit bytes) are accessible at any one time. The interface board 196 also provides a common RAM 204 for dual Common Control board communications, as well as reset, alarm, interfacing and Common Control switchover operations.

Each PCC bus 200a, 200b may be characterized as an unlocked, asynchronous data bus operative to transfer a complete data word (16 bits) between RTX Common Control unit and a single PCC device (e.g., the RLC 48 or RTC 44). The two PCC buses 200a and 200b are either controlled by a pair of redundant RTX Common Control units, or are controlled one at a time by a single Common Control unit. In a dual Common Control system, one Common Control unit is actively controlling the system through an "active" one of the PCC buses 200a, 200b, while the other waits in a standby mode and monitors system status via the "inactive" PCC bus should it be required to assume system control.

A SYSSEL line 206 activates a first pair of PCC and TDM buses, which are used by the active Common Control. A state change of the SYSSEL line 206 causes PCC bus exchange switch 207 to activate the second PCC/TDM bus, but in an RTX having dual Common Control this state change does not automatically result in switching between the active/inactive Common Control units. Should the SYSSEL line 206 change state independent of a change in Common Control, the Common Control units would need to swap connections to the PCC buses 200a and 200b. The SYSSEL line 206 is also supplied to the system PCC devices (e.g. the RLC 48 and RTC 44), and hence provides each interface card an indication of the appropriate PCC and TDM buses to be used. In an RTX having a single Common Control, either of the PCC buses 200a, 200b may be designated as active by the SYSSEL line 206.

Data is transferred between RTX Common Control during either a read cycle, a write cycle, or a read/write cycle. In a write cycle data is transferred from the RTX Common Control unit to a PCC device, in a read cycle data is transferred from a PCC device to the RTX Common Control unit, and in a read/write cycle data is transferred in both directions. In all cases the PCC device involved drives a READY line upon completion of the requisite action. Upon system initialization or reset an address cycle is performed in which the Common Control memory address to be involved in the first data transfer cycle is latched into each PCC device. Upon completion of the first data transfer operation (e.g. a read, write, or read/write), the address within each PCC device is incremented. This allows block data transfers to be performed without requiring address information to accompany each transferred data byte transferred, since in the following address cycle the RTX Common Control latches the next memory address into each PCC device.

B. Network Interface Exchange (NIX)

Figure 13:
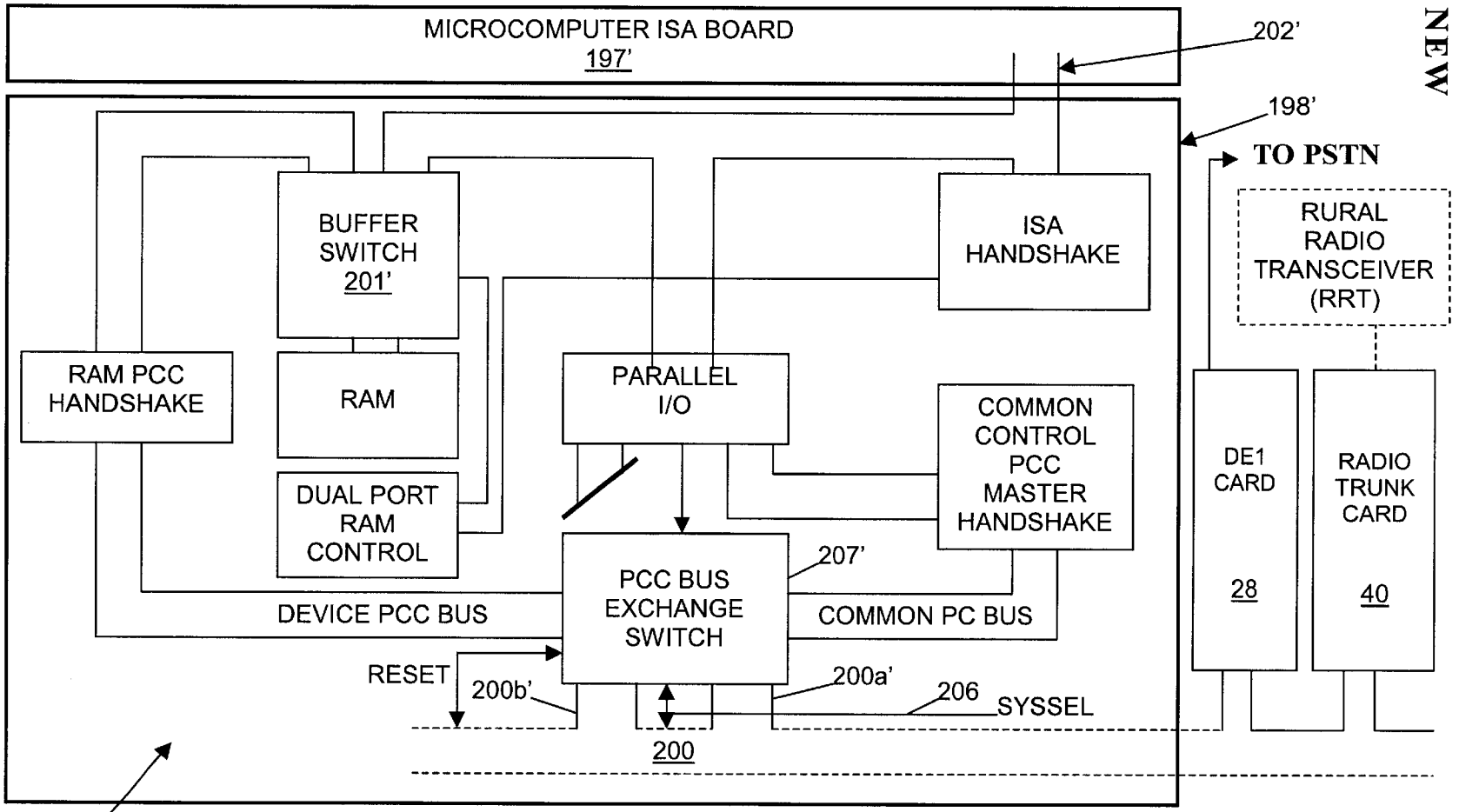
FIG. 13 provides a functional block diagram of a preferred implementation of an NIX Common Control unit.

Referring to FIG. 13, a functional block diagram is provided of a preferred implementation of an NIX Common Control unit. The NIX Common Control unit is seen to be substantially similar to the RTX Common Control unit, and hence like reference numerals are employed to identify like circuit elements. The NIX Common Control unit interfaces with the radio trunk card (RTC) 40, in combination with a rural radio transceiver (RRT), which collectively facilitate trunked radio communication with an RTX unit. The NIX is also operatively connected to the PSTN through the DE1 interface card 28.

The NIX Common Control unit includes a Common Control interface board 196' for facilitating communication between Common Control microcomputer 197' and the DE1 card 28, and between microcomputer 197' and RTC/RRT 40. In an exemplary embodiment the microcomputer 197' is realized using the motherboard of an IBM PC/AT compatible microprocessor or similar computer microprocessor.

The remaining elements of the NIX Common Control unit function in a manner substantially similar to that described above with reference to the corresponding elements of the RTX Common Control unit.

C. DE1 Interface Unit

Figure 13A:
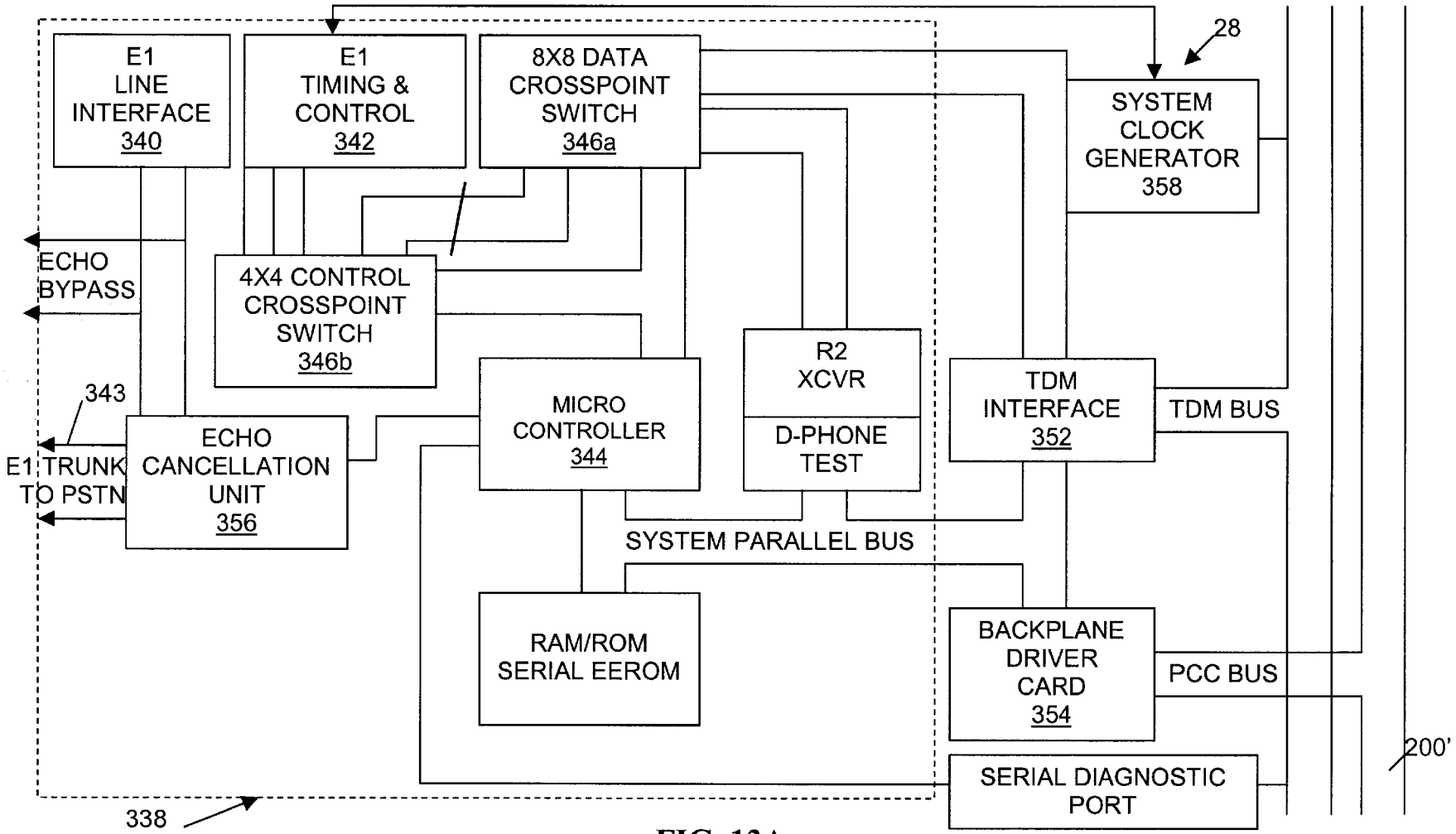
FIG. 13A shows a block diagram representation of a DEI interface trunk unit.

Turning now to FIG. 13A, there is shown a block diagram representation of the DE1 interface trunk unit 28. The DE1 unit 28 serves as an interface for the trunk line connecting an NIX unit with the Public Switched Telephone Network (PSTN). The framing format, from the PSTN into the NIX, consists of a set 31 channels at rate of 32 kbps. Thirty of the channel time slots carry voice information, one channel (e.g., Channel 16) of each trunk is dedicated to carrying trunk signaling information, and one channel serves to communicate lower level protocols. From the NIX towards the PSTN, the CCITT standard E1 framing is employed (see, e.g., CCITT Recommendation G921-E1 Specification), with channels 16 and 32 used for conveying signalling information.

Referring to FIG. 13A, an E1 interface 338 realized in compliance with CCITT Recommendation G921-E1 is seen to include the following functional areas:

a) E1 Line interface 340
b) E1 Timing and Control 342
c) DE1 Microcontroller 344
d) Non-blocking crosspoint switch 346a and 346b
e) CAS signalling and extraction 348
f) CCS signalling and extraction 350
g) Serial to Parallel TDM conversion 352
h) PCC interface 354
i) Echo cancellation unit 356

Referring to FIG. 13A, the DE1 microcontroller 344 manages and controls all functions performed within the DE1 interface module 28. A PCM data crosspoint switch 346a and control crosspoint switch 346b, in conjunction with a crosspoint switch (not shown) internal to the TDM interface 352, collectively perform the various channel switching functions executed by the DE1 interface 28.

The TDM interface 352 receives and stores channel assignments in a conventional Field Programmable Gate Array (FPGA). The TDM interface 352 receives channel switching instructions from the microcontroller 344 and the data crosspoint switch 346a, in addition, the TDM interface 352 also performs PCM voice formatting of signals communicated between system RTX units and the PSTN.

The Backplane Driver Card 354 354 serves as a shared memory interface between the E1 interface 338 and the system Common Control. In addition, the system clock generator 358 operates to extract system timing from the PSTN in order to generate timing for the TDM backplane when the DE1 is operative in a Master Mode.

D. Intelligent Telephone Set (ITS)

Figure 14:
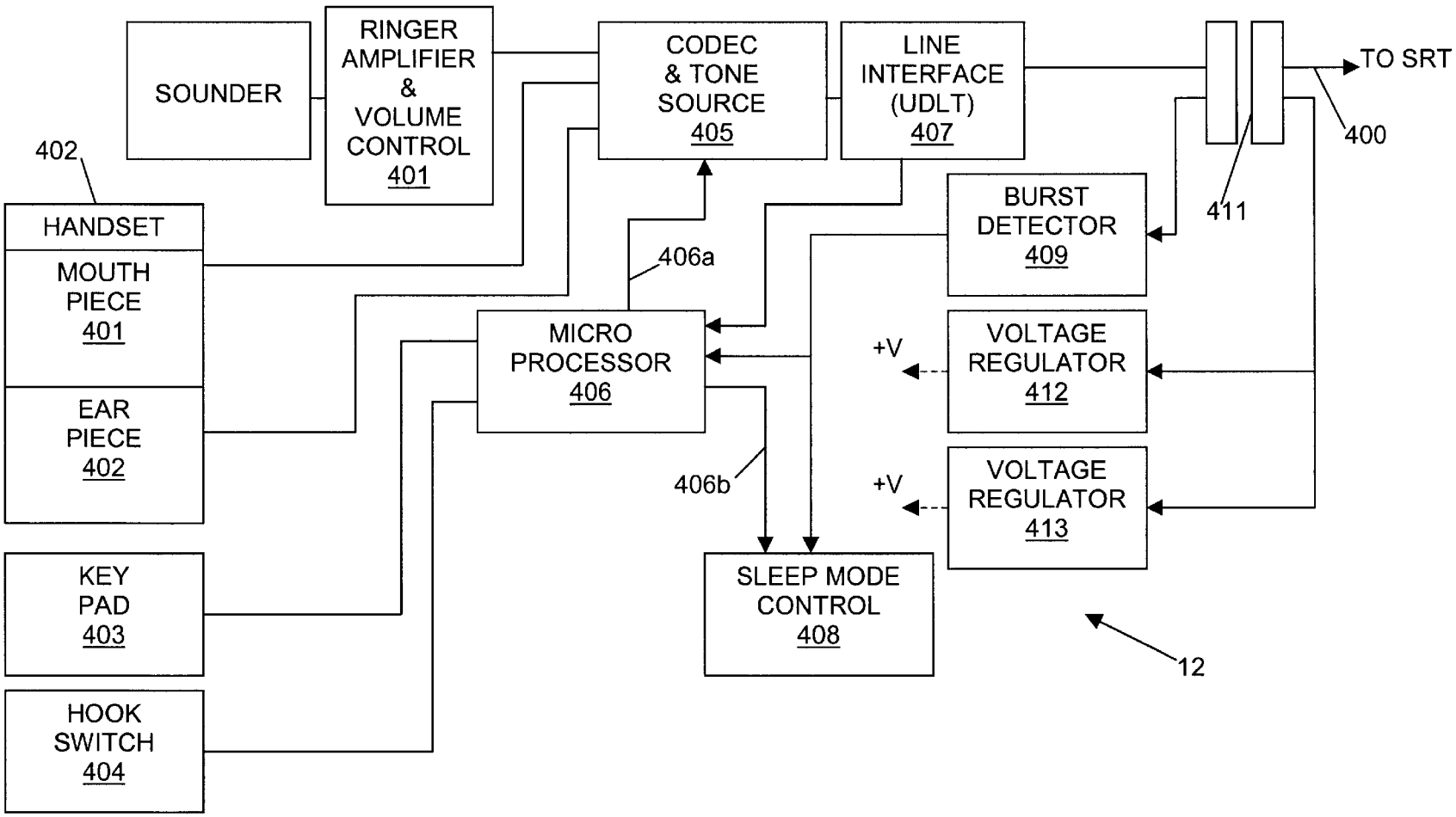
FIG. 14 provides a block diagrammatic representation of an intelligent telephone set (ITS) unit.

Turning now to FIG. 14, there is shown a functional block diagram of a preferred implementation of an intelligent telephone set (ITS) unit 12. The ITS unit 12 is used in place of an ordinary telephone, and serves as the means by which a given subscriber communicates with the user of another ITS or with a PSTN user. Each ITS unit converts the analog voice signal from a subscriber to a digitized PCM format, and arranges the signaling and processing of the telephone call for transmission, via the SRT/RRT 52 (FIG. 4A), to the local RTX unit. In addition, the ITS unit 12 advantageously internally generates a ringing voltage, supplies a dial-tone, and is capable of storing dialed digits, thereby obviating the need for the SRT to provide these functions. As is described below, the ability of each ITS to provide local dial-tone generation and storage of dialed digits preserves network resources by delaying channel allocation until after a call is dialed and transmission of information is required. This contrasts with conventional systems, in which channel resources are consumed from a much earlier time (e.g., upon the telephone handset being taken "off-hook"). In addition, the ITS conserves power by being operative in a quiescent state, or Sleep Mode, until service is requested either from the local RTX unit or from the ITS user.

Referring now to FIG. 14, the ITS communicates directly with an SRT unit (FIG. 9) via 26 AWG twisted pair cable 400. The ITS interfaces with a user through a microphone mouth piece 401 and an car piece 402 of a handset 402. Mouth piece 401 couples the user's voice signal to a codec unit 405 (e.g., a Motorola MC145540 codec chip) disposed to perform analog to digital encoding using one of numerous conventional speech coding technologies. The resulting digital bit stream is fed to a line interface 407, which includes a transceiver (e.g., Motorola MC 145422/26 Universal Digital-Loop Transceiver, or UDLT) for communicating directly with a master transceiver (UDLT) within the SRT. The pair of UDLTs provide a full-duplex synchronous 64 kbps voice channel, as well as two 8 kbps signaling channels, thereby allowing the ITS to communicate with an SRT up to an exemplary range of approximately two kilometers. The codec 405 and line interface unit 407 are disposed within a main ITS housing unit (not shown).

The ITS 12 further includes a key pad 403 and hook switch 404, both of which are preferably located on top of the main ITS housing unit. Key pad 403 contains a conventional arrangement of pushbuttons corresponding to digits 8–9, and corresponding to the symbols # and *. When a button is pressed, a keypad signal is sent to an 8-bit microprocessor 406, which analyzes the keypad signal using conventional keypad scanning algorithms. The result of the analysis is then provided to a dual-tone multi-frequency (DTMF) generator within the codec 405. In addition to controlling tone generation within the codec 405, the 8-Bit microprocessor 406 also processes messages from the RTX.

Hook Switch 404 determines the presence or absence of handset 402 at a predefined hook location upon the ITS main housing, and respectively provides logical off-hook and on-hook signals in response thereto. A logical state change of the off-hook signal initializes a call by awakening Sleep Mode Control 408, which in turn alerts the microprocessor 406 to send dial tone signals 406a to the tone generator in the codec 405. As each key is pressed on the keypad, the corresponding DTMF and the "dialed" digit is stored in a RAM buffer (not shown). After all phone number digits have been entered, a SEND key is pressed and the dialed digits in the RAM buffer are sent via the SRT for recognition and processing within the Common Control of the local RTX.

The ITS is also awakened from Sleep Mode if an incoming burst is detected by burst detector 409, which remains powered-up at all times. Upon being awakened by burst detector 409, the microprocessor 406 will decode the message sent from die RTX via the Radio Line Card and radio signal. If it is a ringing command, the locally generated ringing generator will ring the ITS Similarly, the logical state of the on-hook signal is constantly monitored by the Sleep Mode Control 408 and the microcontroller 406. If on-hook indicates that the handset 402 is in place, microprocessor 406 awakens (406b) sleep mode control 408 upon Burst Detector 409 detecting an incoming call or valid data coupled through line transformer 411, in a preferred embodiment the Line transformer 411 is realized as a full-wave bridge rectifier and transformer with built-in polarity protection. The presence of valid communication or decipherable messages upon burst line 409a is determined by the microprocessor 406.

The ITS unit 12 also includes a pair of voltage regulators 412 and 413 coupled to line transformer 411. Voltage regulator 412 provides a voltage +V (e.g., 5 Volts DC) to all ITS components requiting power only after the ITS is awakened. Voltage regulator 413 provides a continuous source of voltage (+V) to those ITS components which remain functional even during Sleep Mode standby operation.

IV. Operational Overview

Operation of the system of the invention may be conveniently described with reference to the common channel interface signaling (CCIS) diagrams of FIGS. 15A–19. The messages depicted in FIGS. 15A–19 are transmitted between system nodes over the 16th channel, i.e., the CCTS channel, of the 32 time-division multiplexed (TDM) trunk channels utilized in communication between system nodes. As noted above, the CCIS channel is not available to carry voice data.

Figure 15A:
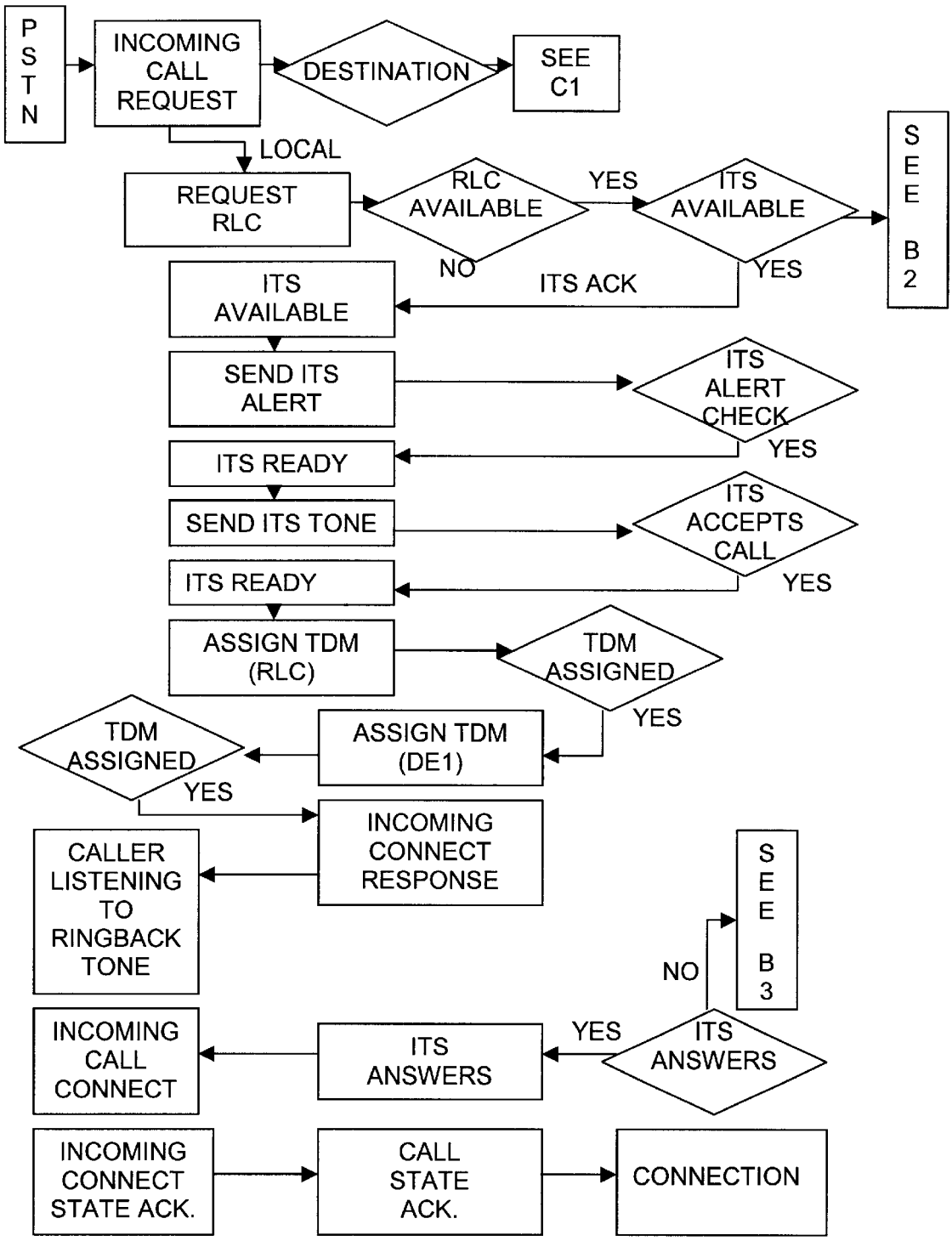
FIG. 15A depicts the network message flow arising in connection with receipt of a call from the PSTN.
Figure 15B:
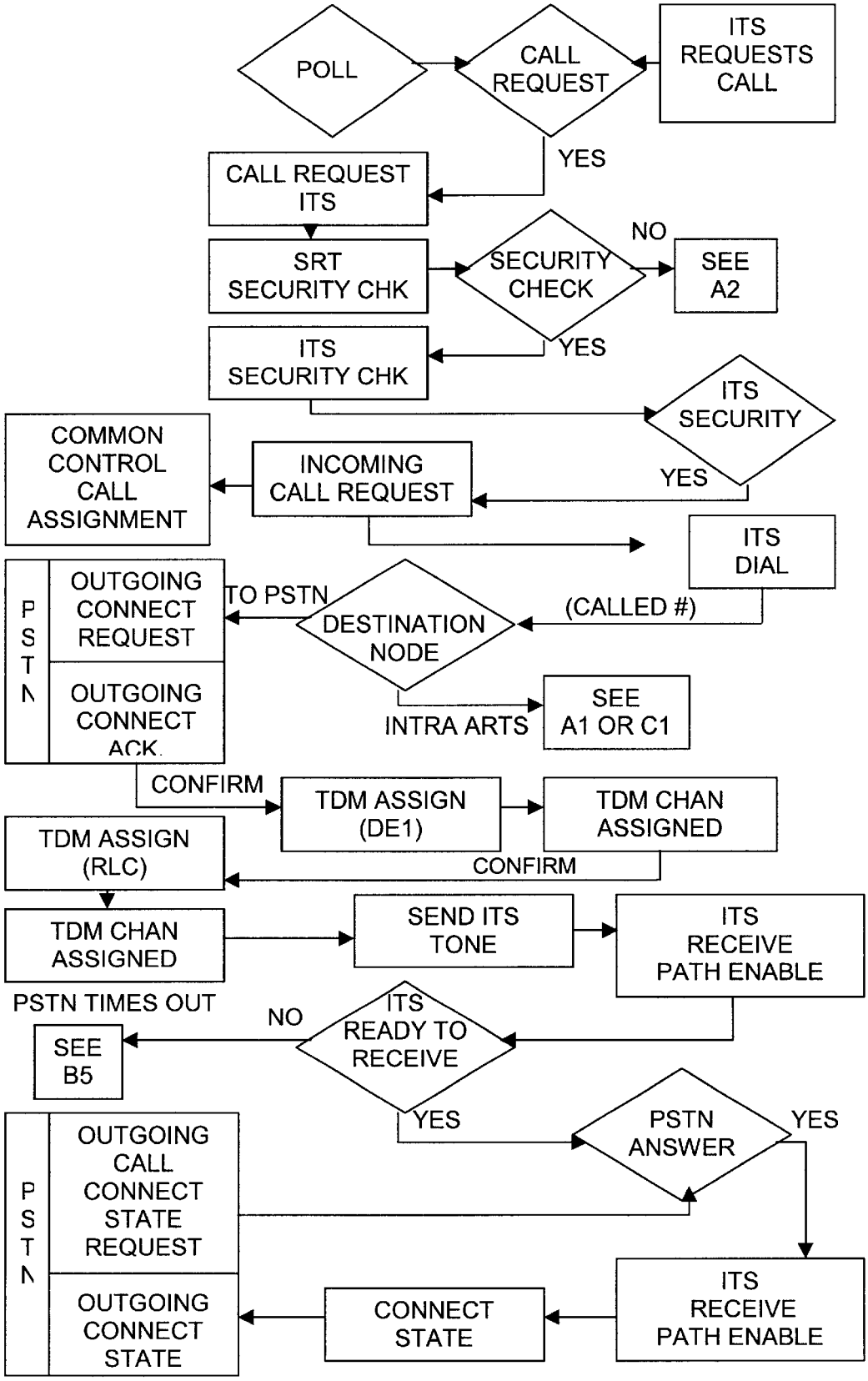
FIG. 15B shows an exemplary message sequence occurring upon initiation of a call by an ITS within the system of the invention.
Figure 16:
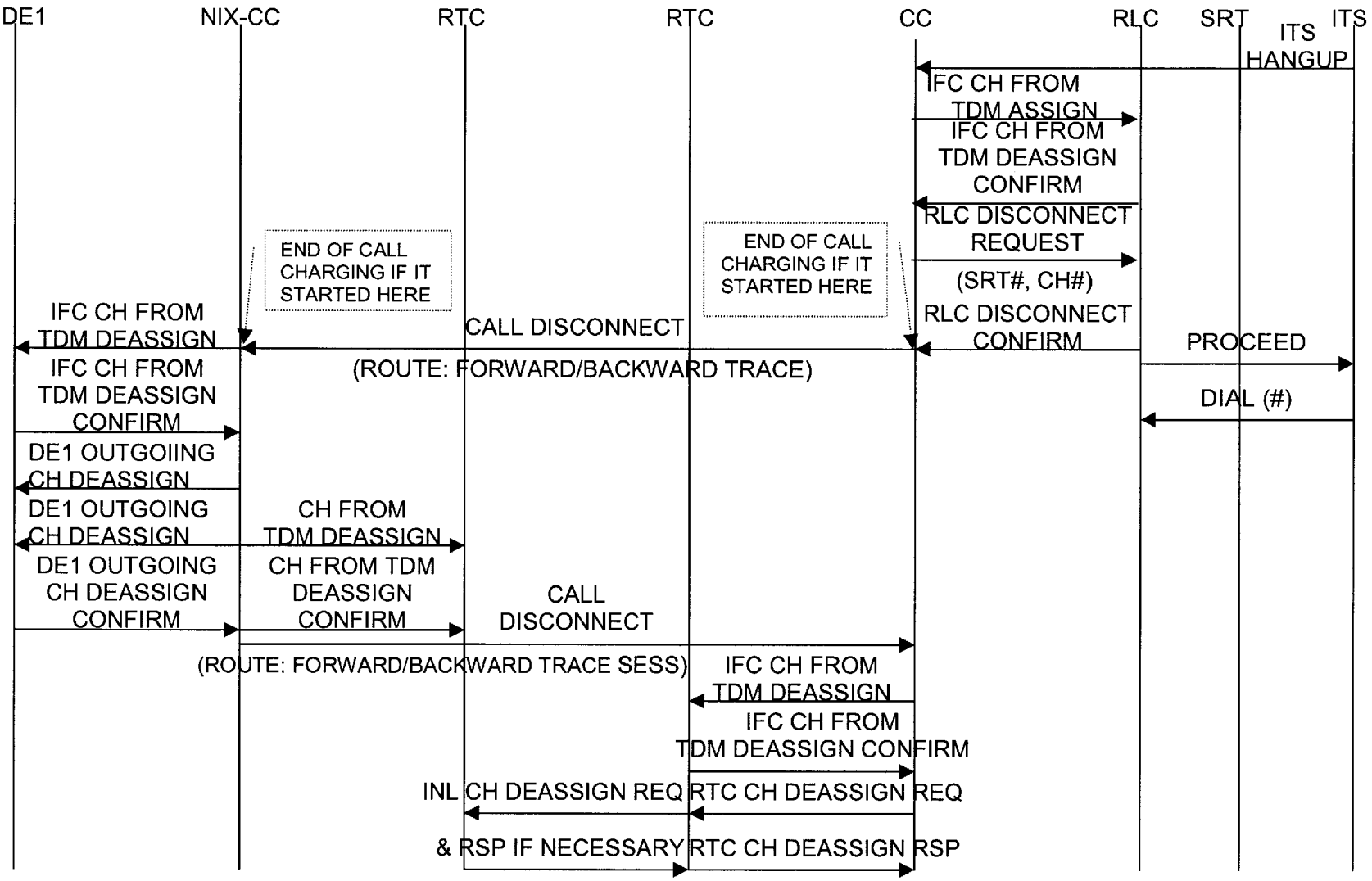
FIG. 16 shows an exemplary message sequence occurring subsequent to call termination by placement of the ITS handset in an on-hook position.
Figure 17:
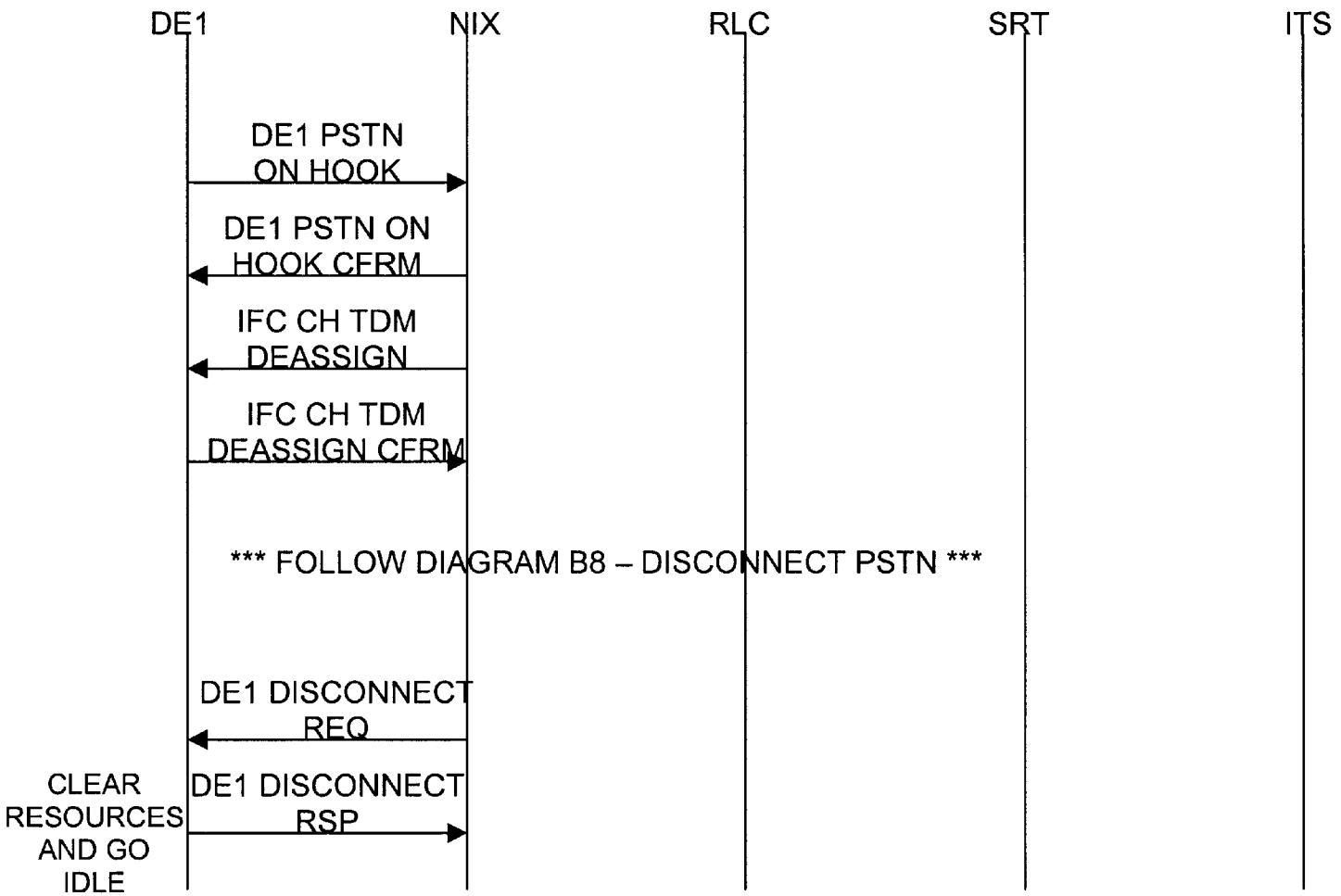
FIG. 17 shows an exemplary message interchange occurring subsequent to a request for call termination being received from the PSTN.
Figure 18A:
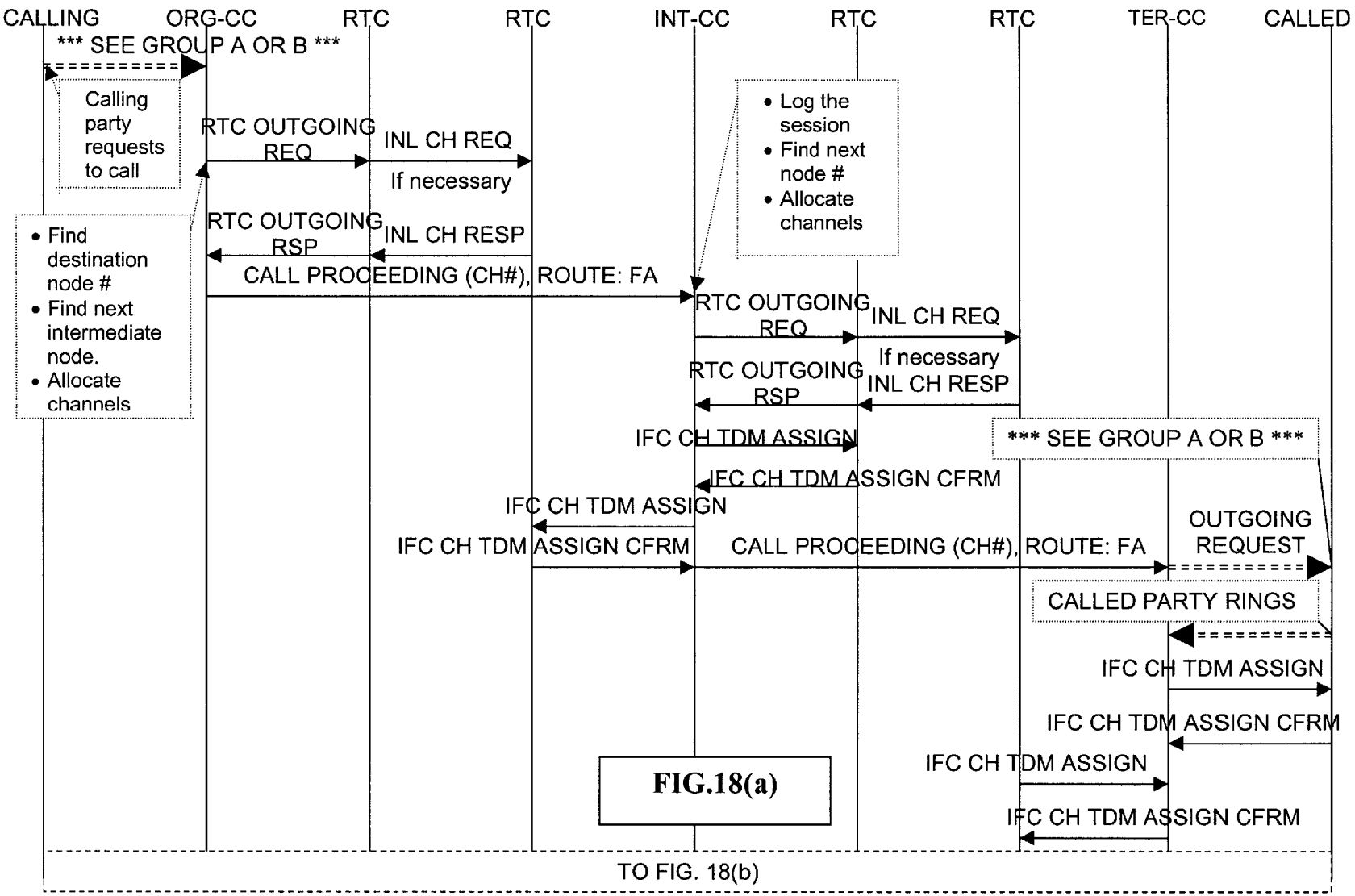
FIG. 18 depicts the message flow occurring upon placement of a call by an ITS unit to another ITS unit included within the network.
Figure 18B:
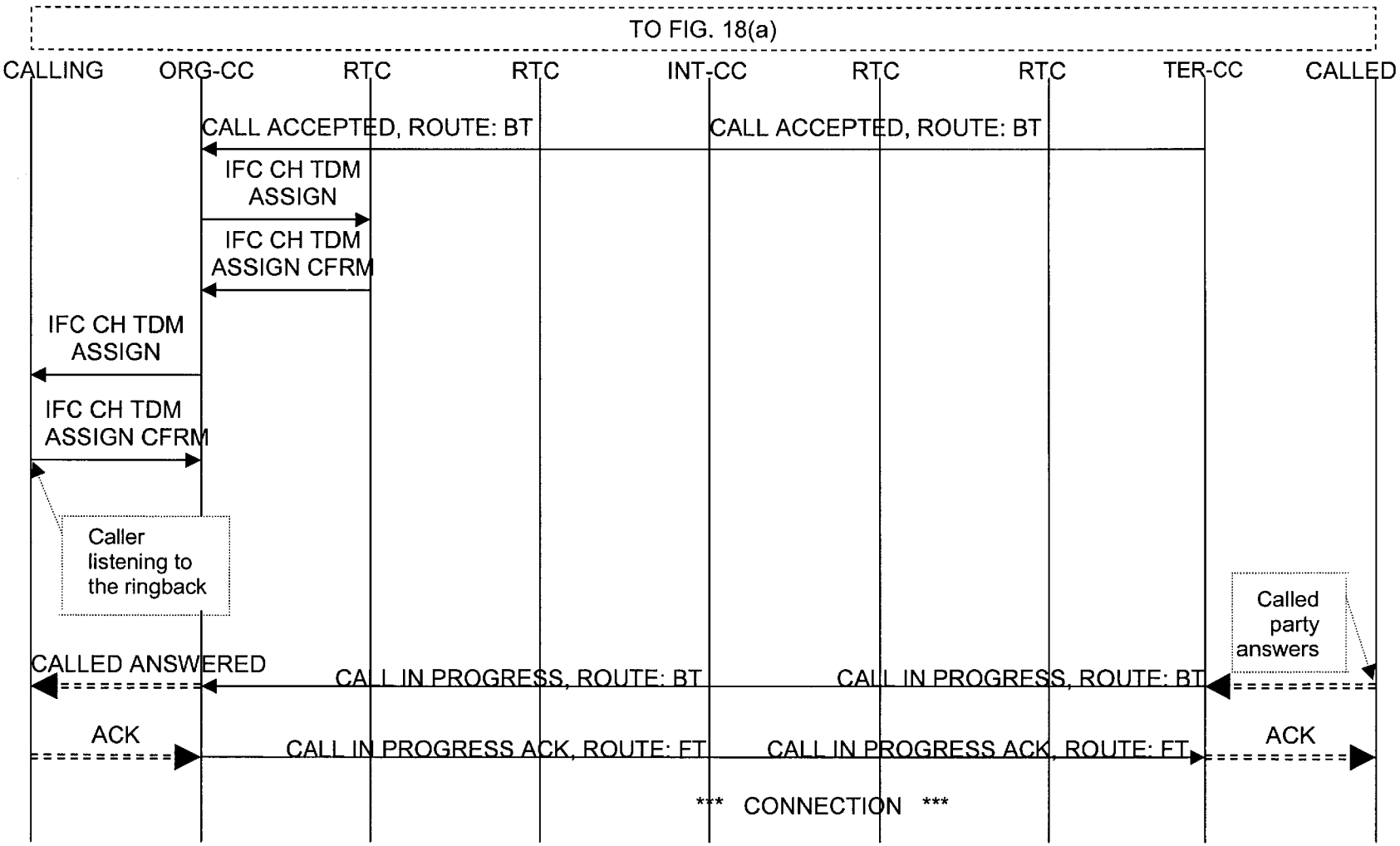
Figure 19:
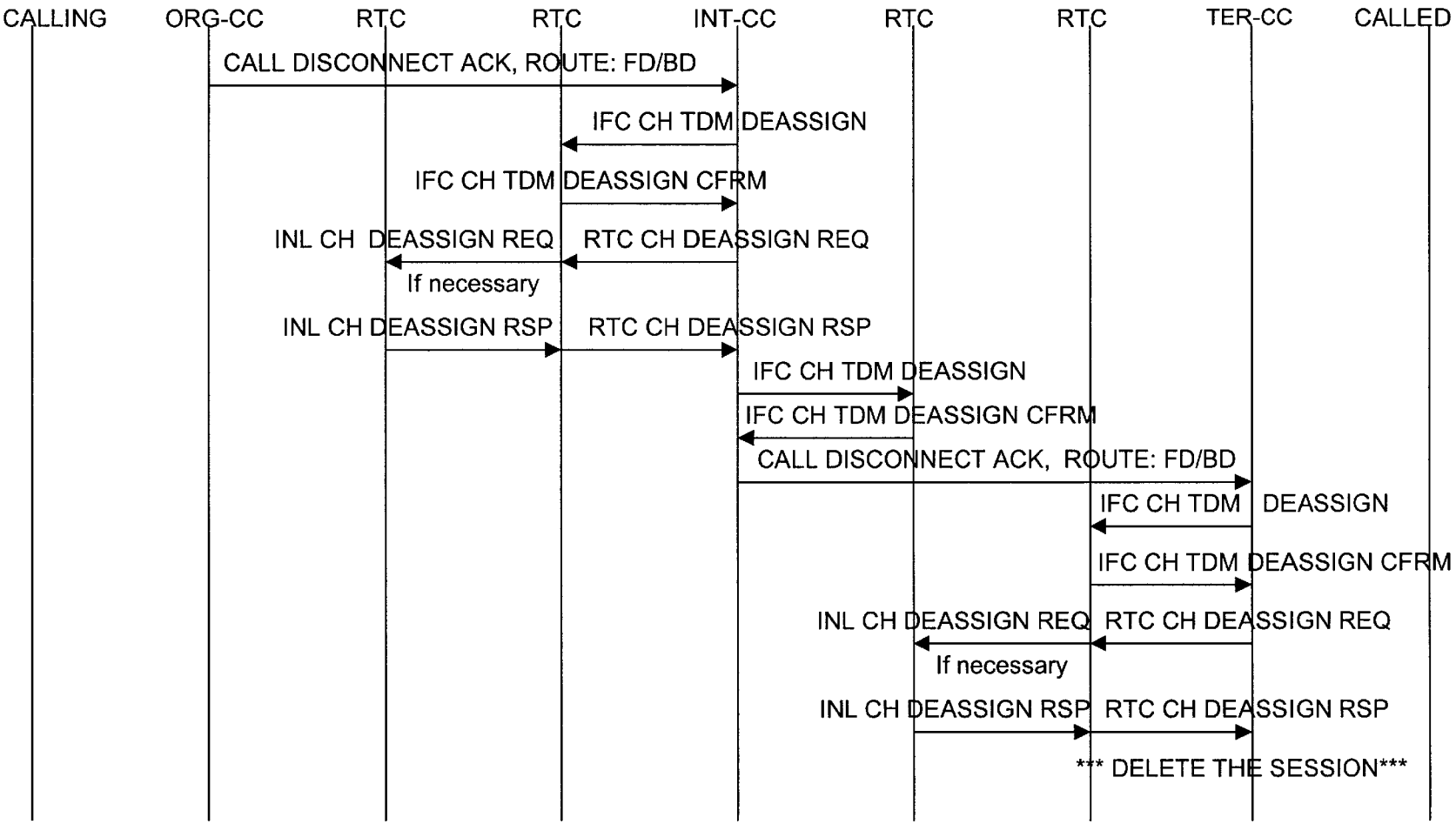
FIG. 19 shows the message interchange occurring during a call takedown process within the network.

FIGS. 15A and 15B are respectively illustrative of the message flow occurring during the receipt of a call from, and the sending of a call to, the Public Switched Telephone Network (PSTN). FIGS. 16 and 17 depict the message flow sequence corresponding to call disconnection within the inventive system, and within the PSTN, respectively. In addition. FIGS. 18 and 19 illustrate the message flow occurring during call setup and takedown procedures, respectively.

The following is a glossary of acronyms used in the message flow diagrams of FIGS. 15A–19.

| ACRONYM/ABBREVIATION | DEFINITION |
|---|---|
| ACK | Positively Acknowledged |
| CC | Common Control |
| DE1 | Direct E1 Trunk Interface |
| IPC | Interface Card |
| INL | Internode Link |
| ITS | Intelligent Telephone Set |
| NIX | Network Interface Exchange |
| NIX/CC | Common Control of NIX |
| NIX/RTC | Radio Trunk Control of NIX |
| PSTN | Public Switched Telephone Network |
| Req. | Request |
| Rsp. | Response |
| RLC | Radio Line Card |
| RTC | Radio Trunk Card |
| RTX | Rural Telephone Exchange |
| RTX/CC | Common Control of RTX |
| RTX/RTC | Radio Trunk Card of RTX |
| SCS | Service Control Station |
| SRT | Subscriber Remote Terminal |
| TDM | Time Division Multiplexing |

Channel Allocation and Assignment

Channel allocation is controlled by the Master RTC, and Channel Maps are only stored within Master RTC'S. If a Slave RTC desires to initiate channel setup or teardown, the Slave requests that the change be made by the Master RTC. The Master RTC will then inform the Slave RTC of the results of the attempt to change the Channel Map. For groups of three or more neighboring RTX units, call may be forwarded from, for example, the Master RTX to a first Slave RTX, and then from the first Slave RTX to a second Slave RTX. In a preferred implementation the path of a call through neighboring RTX units is determined by an SRT control word inherent within each transmitted frame, i.e. packet, of TDM trunked communication data. For example, each packet of TDM data may include a 4 byte control word for specifying the destination of an accompanying 32 byte message for delivery to the specified recipient SRT.

Receipt of Call from PSTN

FIG. 15A depicts the network message flow arising in connection with receipt of a call from the PSTN. Referring to FIG. 15A, in response to an incoming call from the PSTN a DE1 Incoming Connect Request is provided to NIX/CC from the DE1 Trunk Interface. From the DE1 Incoming Connect Request the NIX/CC extracts the phone number of the call, determines the RTX node with which the phone number is associated, and instructs the NIX/RTC to obtain a channel (RTC Outgoing Channel Request). In the preferred embodiment a copy of the system Channel Allocation Table is not stored within the NIX/RTC, and accordingly the NIX/RTC requests a channel (INL Channel Request) from the RTX/RTC. A channel assignment (INL Channel Response) is then provided to the NIX/RTC from the RTX/RTC. The NIX/RTC then informs NIX/CC of the channel number, if any, which was allocated to the incoming call (RTC Outgoing Response). The NIX/CC then instructs the NIX/RTC to connect one or more specified TDM Bus slots to the allocated channel (IFC Channel to TDM Assign). Next, the results of the attempt to implement the IFC Channel to TDM Assign instruction are reported to the NIX/CC (IFC Channel to TDM Confirm). If the requested TDM Bus slots) have already been assigned, an error message rather than a confirmation message is reported to the NIX/CC. In the event an error message is received, a new RTC Outgoing Channel Request is made to the NIX/RTC.

Assuming successful TDM Bus slot allocation, control over the call is transferred to the Common Control of the RTX at the specified destination node (CALL PROCEEDING). The RTX/CC then instructs the RTX/RTC to connect one or more specified TDM Bus slots to the allocated channel (IFC Channel to TDM Assign). The results of the attempt to implement this instruction are reported to the RTX/CC (IFC Channel to TDM Confirm). RTX/CC then requests, from the RTX/RLC, a channel to the SRT specified by the incoming phone number (RLC Outgoing Request). Next, an SRT Security Check Request is made to the specified SRT The SRT responds by encrypting its serial number using a six byte random key provided in the RLC Outgoing Request message SRT Security Response). The RTX/RLC then makes an ITS Security Check Request to the ITS (ITS Security), which responds (ITS Security Response) by encrypting its serial number using the six byte random key provided in the request message.

Next, the RTX/RLC informs the RTX/CC if it was able to approve a channel for allocation to the designated SRT (RLC Outgoing Response). A channel is approved only if the ITS and SRT security checks have been successfully completed. Assuming channel approval is obtained. IFC Channel to TDM Assign and Confirm messages are passed between the RTX/CC and RTX/RLC. RTX/CC then instructs the specified ITS to provide an audible signal, e.g., a ringing tone, to the user (ITS ALERT/RING). An ACTION argument within the ITS ALERT/RING signal specifics that two-way voice communication be established subsequent to lifting of the handset of the ITS by the user. Upon accepting the call, the ITS sends an ITS Accept message to the RTX/CC, at which point control is transferred to NIX/CC (CALL ACCEPTED).

As is indicated by FIG. 15A, the NIX/CC informs (DE1 incoming Connect Response) the DE1 of the attempt to implement the DE1 Incoming Connect Request. The DE1 incoming Connect Response results in the calling party receiving a status indication consisting of either a busy signal, a ringing tone, or a not-in-service message. If the status is a ringing tone, the NIX/CC also issues an IFC Channel to TDM Assign request to the DEL Assuming an available time slot exists, the DE1 provides IFC Channel to TDM Confirmation to the NIX/CC.

After the user has lifted the handset of the ITS, an ITS Answer message is sent to the RTX/CC, indicating that the ITS has accepted the call and that two-way voice communication has been activated. Upon lifting of the handset the NIX/CC informs the DE1 of ITS acceptance of the call (DE1 Incoming Connect State). If the user does not answer the call after a predefined number of rings, the DE1 Incoming Connect State indicates that a timeout has occurred. Call charging starts after the DE1 acknowledges that it has been informed of the call connection status (DE1 Incoming Connect State Ack). The call then remains in progress until either disconnection by the ITS (FIG. 16), or disconnection by the PSTN (FIG. 17).

ITS Call Origination

Referring to FIG. 15B, there is shown an exemplary message sequence occurring upon initiation of a call by an ITS within the system of the invention. Upon the ITS handset being taken off-hook, the ITS indicates via the signaling channel that it desires to originate a call. This indication is detected by the RTX/RLC during polling of each of the ITS units associated therewith (POLL RESPONSE). An SRT Security Check Request is then issued by the RTX/RLC to the specified SRT The SRT responds by encrypting its serial number using a six byte random key provided in the RLC Outgoing Request message SRT Security Response). If the encrypted serial number is correct the RTX/RLC sends an ITS Security Check Request to the ITS (ITS Security), which responds (ITS Security Response) by encrypting its serial number using the six byte random key provided in the request message.

After the user has dialed the telephone number associated with the intended recipient user, the RTX/RLC requests the ITS to transmit the accumulated dialed digits (ITS PROCEED). Next, the RTX/RLC informs the RTX/CC of the serial number of the SRT associated with the originating ITS and the intended recipient's phone number (RLC Incoming Req.). RTX/CC then requests RTX/RTC to obtain a channel for an outgoing call (RTC Outgoing Request). At this point call processing proceeds in a manner similar to that described with reference to FIG. 15A. Specifically, a channel is requested from the NIX/RTC (INL Channel Req.), and TDM Bus slot assignments are requested and confirmed (IFC Channel to TDM Assign and Confirm). Call charging starts upon the ITS acknowledging that it has activated two-way voice communication (ITS CONNECT ACK).

ITS-Initiated Call Termination

Referring to FIG. 16, there is shown an exemplary message sequence occurring in response to termination of a call subsequent to the ITS handset being placed in an on-hook position. The ITS on-hook condition is communicated to the RTX/CC via an ITS Hangup message. The RTX/CC then instructs the RTX/RLC to deassign the channel associated with the disconnecting ITS from the TDM Bus slot to which it had been previously assigned. After confirmation of the TDM channel deassignment (IFC Channel from TDM Deassign Confirm), the RTX/CC instruct the RTX/CC to disconnect the channel from the SRT associated with the disconnecting ITS. Upon receiving confirmation of the channel disconnection from the RTX/RLC, the RTX/CC ends charging of the call if call charging originated within the RTX. Otherwise, i.e., when call charging was initiated within the NIX, the NIX/CC terminates call charging and instructs the DE1 to disconnect the TDM Bus slot from the specified channel (IFC channel from TDM Deassign). Upon confirmation of the channel deassignment the NIX/CC instructs the DE1 to drop connection on the designated channel (DE1 Outgoing Channel Deassign), and commands the NIX/RTC to disconnect the designated TDM Bus slot from the specified channel (IFC Channel from TDM Deassign). The NIX/RTC then confirms channel deassignment using an IFC Channel from TDM Deassign Confirm message.

If a Master/Slave pair of RTX units were utilized in establishing the connection for the deassigned call, then the Slave RTX/CC instructs RTX/RTC to drop its connection (RTC Channel Deassign Req.) to the Master RTX unit. Next, the Slave RTX/RTC requests the Master RTX/RTC to update its Channel Map by marking the designated channel as Not Connected (INL Channel Deassign Request. The Slave RTX/RTC then waits for an INL Channel Deassign Response from the Master RTX/RTC before sending an RTC Channel Deassign Response to its RTX/CC.

PSTN-Initiated Call Termination

FIG. 17 shows an exemplary message interchange occurring subsequent to a request for call termination being received from the PSTN. The message sequence of FIG. 17 is similar to that of FIG. 16, with the exception that the initial request for channel deassignment originates within the DE1 (DE1 Incoming Channel Deassign) rather than within the ITS, The NIX/CC responds to the request with a DE1 Channel Deassign Confirm, which confirms that the designated channel has been dropped. IFC Channel from TDM Deassign Request and Confirm messages are then exchanged between the DE1 and the NIX/CC which frees the designated TDM Bus slot from the disconnected channel.

The RTX unit associated with the ITS unit to be disconnected then sends an ITS Disconnect message thereto. This message directs the ITS to drop the designated channel connection, and instructs the SRT of the disconnected ITS to wait for hang-up of the ITS handset. If the ITS remains in an off-hook state for longer than a first predefined timeout period after receiving the ITS Disconnect message, then the ITS will begin to emit a howler tone. If the ITS remains off-hook for longer than a second predefined timeout period, then the ITS will automatically enter "sleep" mode. In this way power is conserved within the ITS in the event that the user fails to return the ITS to an on-hook condition.

Intra-Network Call Placement

FIG. 18 depicts the message flow occurring upon placement of a call by an ITS unit (ITS #1) to another ITS unit (ITS #2) included within the network. Upon the handset of ITS #1 being taken off-hook. ITS #1 signals on Channel Zero (Poll Response) to an originating RTX that it desires to establish a connection. A SRT Security Check Request is then issued by the RTX/RLC to the specified SRT. The SRT responds by encrypting its serial number using a six byte random key provided in the RLC Outgoing Request message SRT Security Response). If the encrypted serial number is correct the RTX/RLC sends an ITS Security Check Request to the ITS (ITS Security), which responds (ITS Security Response) by encrypting its serial number using the six byte random key provided in the request message. If ITS and SRT Security Checks are passed, an ITS Proceed message is provided to ITS #1 from the RLC of the originating RTX and the RTX/RLC requests the ITS to transmit the accumulated digits previously dialed by the user of the ITS (ITS PROCEED). If either of the Security Checks fails, the requesting ITS is disconnected (Disc.).

Next, the RTX/RLC informs the RTX/CC of the serial number of the SRT associated with the originating ITS and the intended recipient's phone number (RLC Incoming Req.). RTX/CC then requests RTX/RTC to obtain a channel for an outgoing call (RTC Outgoing Request). The RTX/CC reads the phone number of the call, determines the RTX node with which the phone number is associated, and instructs the RTX/RTC to obtain a channel (RTC Outgoing Channel Request). In the preferred embodiment a copy of the system Channel Allocation Table is not stored within the RTX/RTC, and accordingly the RTX/RTC requests a channel (INL Channel Request). A channel assignment (INL Channel Response) is then provided to the RTX/RTC. The RTX/RTC the informs RTX/CC of the channel number, if any, which was allocated to the call (RTC Outgoing Response). The RTX/CC then instructs the RTX/RTC to connect one or more specified TDM Bus slots to the allocated channel (IFC Channel to TDM Assign). Next, the results of the attempt to implement the IFC Channel to TDM Assign instruction are reported to the RTX/CC (IFC Channel to TDM Confirm). If the requested TDM Bus slot(s) have already been assigned, an error message rather than a confirmation message is reported to the RTX/CC. In the event an error message is received, a new RTC Outgoing Channel Request is made to the RTX/RTC. The RTX/CC Recognizing the called number is within the network to call is routed as described to the next node.

The intermediary RTX/CC reads the called number and after recognizing that the number is for RTX Node #1, it instructs the RTX/RTC to obtain a channel (RTC Outgoing Channel Request). The RTX/RTC then informs RTX/CC of the channel number which was allocated to the call (RTC Outgoing Response). The intermediary RTX/CC then instructs the RTX/RTC to connect one or more specified TDM Bus slots to the allocated channel (IFC Channel to TDM Assign). Next, the results of the attempt to implement the IFC Channel to TDM Assign instruction are reported to the Intermediary RTX/CC (IFC Channel to TDM confirm). If a channel is available it is assigned (Channel to TDM Assign). and the RTX/RTC confirms the assignment (Channel to TDM Assign Confirm).

The terminating RTX/CC then instructs the RTX/RTC to connect one or more specified TDM Bus slots to the allocated channel (IFC Channel to TDM Assign). The results of the attempt to implement this instruction are reported to the terminating RTX/CC (IFC Channel to TDM Confirm). The terminating RTX/CC then requests, from the terminating RTX/RLC, a channel to the SRT specified by the number of the called party (RLC Outgoing Request). Next, an SRT Security Check Request is made to the specified SRT. The SRT responds by encrypting its serial number using a six byte random key provided in the RLC Outgoing Request message (SRT Security Response). The terminating RTX/RLC then makes anTS Security Check Request to the ITS (ITS Security), which responds (ITS Security Response) by encrypting its serial number using the six byte random key provided in the request message.

Next, the terminating node informs the RTX/CC if it was able to approve a channel for allocation to the designated SRT (RLC Outgoing Response). A channel is approved only if the ITS and SRT security checks have been successfully completed. Assuming channel approval is obtained, IFC Channel to TDM Assign and Confirm messages are passed between the RTX/CC and RTX/RLC, whereupon the RTX/RLC instructs the specified US to provide an audible signal, e.g., a ringing tone, to the users (ITS ALERT?RING). An ACTION argument within the ITS ALERT?RING signal specifies that two-way voice communication be established subsequent to lifting of the handset of the ITS by the user. Upon accepting the call, the ITS sends an ITS Accept message to the RTX/CC, at which point control is transferred to the originating RTX/CC (CALL ACCEPTED).

The calling party receives a status indication consisting of either a busy signal, a ringing tone, or a not-in-service message. If the status is a ringing tone, the originating RTX/CC also issues an IFC Channel to TDM Assign request to the RTX/RLC. Assuming the existence of an available time slot, the RLC provides IFC Channel to TDM Confirmation to the originating RTX/CC.

After the called party has lifted the handset of the ITS, and ITS Answer message is sent to the RTX/CC indicating that the ITS has accepted the call and that two-way voice communication has been activated. If the called party has not answered the call after a predefined number of rings, the Connect State indicates that a timeout has occurred. Call charging starts after the originating RTX/CC acknowledges that it has been informed of the call connection status (Connect Calling Ack). The call then remains in progress until either disconnection by the ITS, or disconnection by the called ITS.

Intra-Network Call Termination

Referring to FIG. 19, there is shown an exemplary message sequence occurring in response to termination of a call subsequent to the ITS handset being placed in an on-hook position. The ITS on-hook condition is communicated to the originating RTX/CC via an ITS Hangup message. The RTX/CC then instructs the RTX/RLC to deassign the channel associated with the disconnecting ITS from the TDM Bus slot to which it had been previously assigned. After confirmation of the TDM channel deassignment (IFC Channel from TDM Deassign Confirm). the RTX/CC instructs the RTX/CC to disconnect the channel from the SRT associated with the disconnecting ITS. Upon receiving confirmation of the channel disconnection from the RTX/RLC, the RTX/CC ends charging of the call in cases wherein call charging was originated within the RTX.

The call Disconnect Message is forwarded to the termination RTX/CC, which issues an IFC-TDM Deassign Request to the RTX/RLC. The RTX/CC also notifies the slave RTC of the Channel TDM Deassign and RLC Disconnect Request and awaits the TDM Deassign Confirm and RLC Disconnect Confirm. At this time the terminating RTX/CC informs the intermediary RTX/CC of the Call Disconnect Ack. The TDM and RTC Deassign commands are given for the link between the intermediary RTX and the terminating RTX. The Call Disconnect Ack is then sent to the RTX/CC responsible for originating the call. Next, both TDM and RTC Deassign Commands are issued for the link between the originating RTX and the intermediary RTX. The call is terminated and all resources are returned to the call processing pool.

V. Common Control (CC) Software

Figure 20:
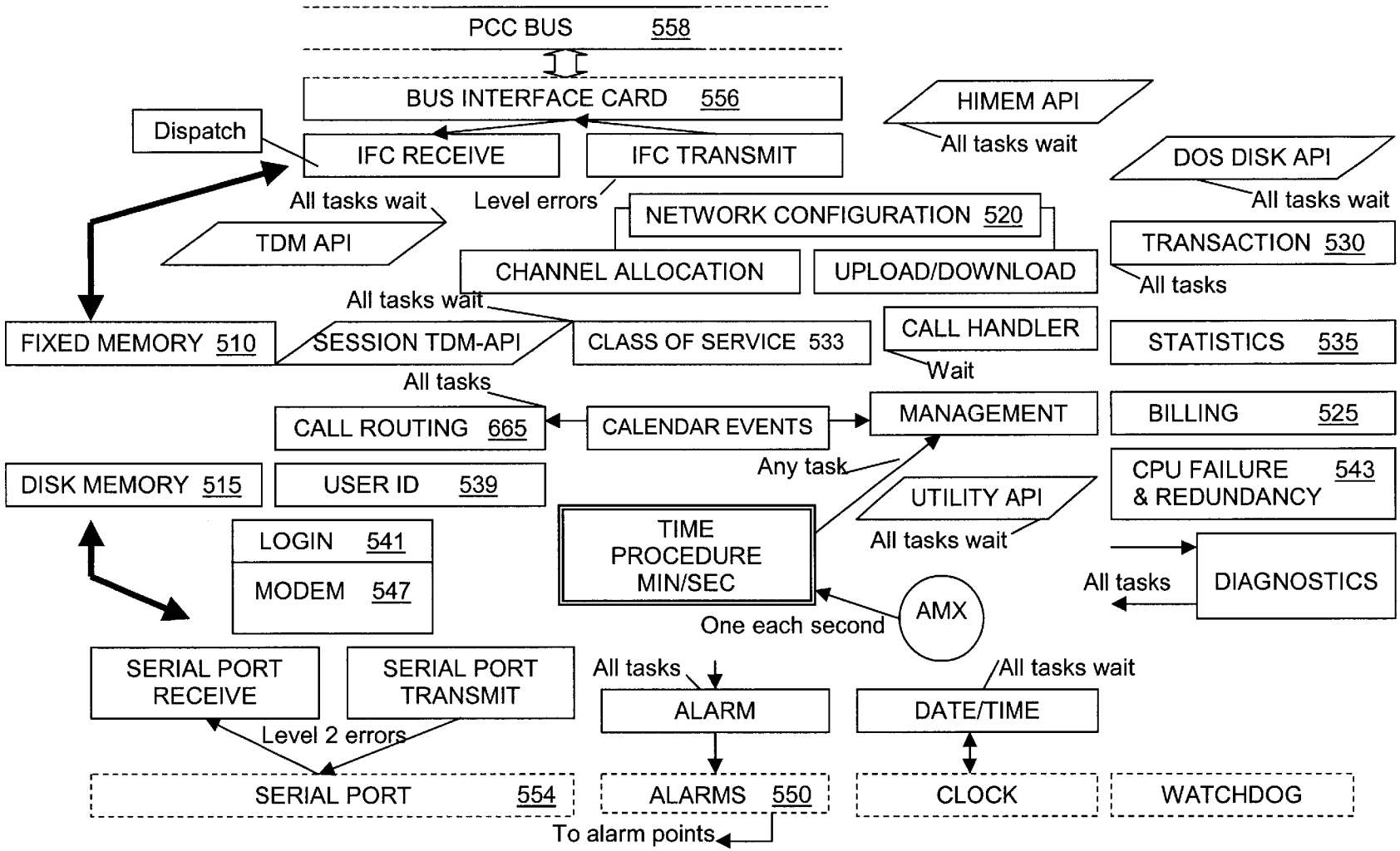
FIG. 20 is a block diagram of a Common Control (CC) software program resident within each NIX and RTX unit.

FIG. 20 is a block diagram of the common control (CC) software program, generally indicated by reference numeral 500, resident within each NIX and RTX unit. Also shown in FIG. 20 is certain processing hardware (dashed lines) typically included within each RTX and NIX unit. The CC program 500 will typically be stored in a read-only memory (ROM) unit connected to the CPU and memory circuits of each RTX and NIX. Although the CC programs resident within NIX and RTX units are substantially similar, the several software functions unique to the CC programs governing operation of RTX units are described below.

Each NIX and RTX unit will typically include fixed hard disk memory 510 (100 Mb). as well as a high-capacity/fastaccess removable memory disk 515 such as the Sundisk 40 MB flash memory card. The fixed disk 510 is utilized to store the CC software 500, network configuration data 520 billing data 525, call transaction data 530, subscriber class of service 533, statistical data 535, as well as alarm 537, user-identification data 539 and log-in data 541. The removable disk 515 serves as the system boot disk, allows updates to be made to CC 500 and network configuration software 520, and provides back-up file memory.

Referring to FIG. 20, each RTX and NIX unit includes an optionally redundant central processing unit (CPU) 543. The ROM storing the CC software will typically be utilized in conjunction with a host Intel 80486 motherboard configured with ISA (Industry Standard Architecture) bus connection slots (not shown). Connected to the ISA bus is an IDE disk controller (not shown) and a 9.6 kbps modem 547. In the preferred embodiment the host motherboard is customized to include a relay connection to an external alarm 550, a date/time clock 552, serial port 554 and a bus interface card 556 in communication with a Parallel Common Control (PCC) bus 558.

By way of introduction, various permanent files relating to Common Control operating software 500 are stored on fixed disk 510. Permanent files are also used to store information relating to; for example, network configuration 520, subscriber class of service 533, alarm-handling configurations 537, as well as information relating to PSTN interconnection and modem dial-back numbers (not shown). Updating of permanent files is accomplished via connection through serial port 554 to an NCS unit (for updating NIX unit permanent files) or to an SCS unit (for updating RTX permanent files). File modification may also be effected through the modem 547, or by way of data transfer from disk memory 515 to fixed memory 510.

Temporary files stored on fixed memory 510 include those relating to billing data 535, transaction data 530, and statistical data 535. In the preferred embodiment each NIX unit receives billing data from an associated group of RTX units approximately once every 24 hours. Billing data may be transferred from RTX to NIX units across TDM channels nominally allocation to phone conversations. It is anticipated that tip to 1 megabyte (Mb) of billing data may be required to be transferred every 24 hours from an RTX unit to an NIX unit. At a transfer rate of 64 kbps approximately two minutes are required to transfer 1 Mb of billing data. Upon confirmation by an NIX of successful reception of billing data from an RTX, the RTX clears the transferred billing data from its local storage.

The calendar date and time information generated by the clock 552 in each NIX unit is used to update the local clock of each RTX unit associated therewith. Timing synchronization is maintained between the local clocks at all RTX and NIX network nodes by routing an 8 kHz timing signal available from the PSTN (or generated on a specific node) to each network node. In this way timing synchronization is established between trunk channel communication and the TDM/TDMA communication between RTX and ITS units.

Calendar of Events in order to enable the timely performance of several functions executed by each RTX unit it is necessary that a calendar of events 560 be provided. Included among such functions, which are executed differently on certain days of the week or during particular time periods, are inter-node call routing selections, trunk group loading (i.e., call-handling) limits, and class of service determination For example, it may be desired that subscribers supported by a specified class of service be able to make international calls only on Saturday and Sunday from 9 p.m. to 6 a.m. Trunk groups can be set to route traffic over a different set of trunks (if available) should the traffic exceed a predetermined trunk group loading limit.

In the preferred embodiment the calendar of events 560 is organized into a four-level hierarchy: a default level, second and third levels, and an emergency level. The default level establishes the data record to be associated with a particular function in the event that no higher calendar level is active. As an example, the default-level data record for a given class of service may indicate that subscribers in the specified class are not allowed to place international calls. The second level within the calendar of events 560 indicates which functions may be performed differently depending on the day of week or time of day. Referring to the example given above, the second calendar level associated with the specified level of service could indicate that international calls be allowed only on Saturday and Sunday from 9 p.m. to 6 a.m. The third level is generally reserved for data records to be utilized during holidays, and overrides the default and second calendar levels. The emergency level overrides all other calendar levels and may be invoked on either an immediate or timed-delay basis.

System Alarms

Various event-triggered alarms may lead to operation in the lowest three levels being suspended and emergency level operation being invoked. In a preferred implementation examples of event-triggers include, for example, RF Power Output low and Receive Signal Strength Below Threshold. Alarm signals are transported via the CCIS messaging channel (i.e., Common Control Interface Signaling Channel), which nominally corresponds to Channel #16 of the 32 inter-node TDM channels. Alarm messages are sent via the CCIS from a network clement being monitored to the Network Control Station 32 for display. The transmission is via a digital message identifying the NIX or RTX unit in which the alarm was triggered, and specifies an alarm status condition.

Transaction Data

In the preferred embodiment transaction data 530 relating to the processing tasks executed at each RTX or NIX unit is recorded in chronological order. For example, transaction data concerning specific processing events, error conditions, system diagnostic information and the like may be accumulated for transfer from an NIX unit to its associated network control station (NCS), or for transfer from an RTX unit to its associated service control station (SCS). Each transaction record includes a 32-bit transaction number, the date and time of the event being logged, the number of the NIX or RTX unit, the transaction type, and the bit length of the accumulated transaction data.

The number of locations in fixed memory 510 allocated to storing transaction data will depend upon the expected transaction logging rate, and upon the frequency at which the file comprising the transaction data 530 is to be transferred to either an NCS or SCS unit. Included within the statistics data 535 are measures of, for example:

(i) the number of calls carried by each trunk channel during predefined (e.g., 15 min.) internals.

(ii) the number of call failures occurring over each trunk channel during predefined intervals.

(iii) average call length per trunk channel, and (iv) the number of occurrences of each type of system error.

Statistical measurements such as those listed above may be accumulated into several sets, including a first set gathered at predefined intervals during a current 24 hour period, a second set compiled over such predefined intervals during the preceding 24 hour period, and a third set including aggregate statistics for each of 6 previous days.

Referring to FIG. 20, a router routine 665 is utilized to route trunk communications between network nodes, as well as to transfer calls to and from specified ITS units. As noted above, each transmitted frame, i.e. packet, of TDM trunked communication data is identified by a 4 byte control word and 32 byte message associated with a particular destination node. The router routine 665 examines each frame (packet) of data in order to identify the control byte specifying the SRT to which a call is being directed. The router routine 665 at each network node then utilizes network configuration data 520 in order to establish a configurable list of up to four prioritized route directions from the specified node toward the specified SRT destination node. If a trunk channel is unavailable to the first node associated with the highest priority route the route with the next highest priority is considered, and so on. If all routes fail, routing is transferred back from the specified node to a previous node from which the data was received. At the previous node attempts are made to utilize lower prioritized routes.

In the preferred embodiment the router routine 665 maintains status of all DE1, RTC and RLC channels associated with the node. For example, RTC channel status information will generally indicate which trunk channels have been assigned to transferring particular calls to adjacent nodes. In the case of NIX nodes, DE1 status will indicate which channels are actively connected to the PSTN via the E1 trunk.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system for processing information signals received from trunk lines for transmission over a plurality of RF subscriber channels, comprising:

(a) a first subscriber unit;

(b) a network interface exchange configured to sample said received information signals and combine said sampled information signals into one or more multiplexed transmit channel bit streams, said network interface exchange including:

(i) a processor configured to assign a first of said sampled information signals from one of said trunk lines to an available repetitive slot of a first of said transmit channel bit streams; and (ii) a transmitter configured to transmit a forward interface signal over a network interface channel in response to said first transmit channel bit stream; and (c) a first destination node, in RF communication with said network interface exchange over said network interface channel, configured to extract said first sampled information signal from said forward interface signal and produce a first subscriber signal, and to route reverse link signals from said first subscriber unit to a second destination node, said first destination node being associated with a call request signal received over said one trunk line and including:

(i) a transmitter configured to transmit said first subscriber signal over a first of said RF subscriber channels to said first subscriber unit;

wherein said processor is configured to perform the assignment dynamically; wherein said available slot position is associated with a first of said RF subscriber channels associated with said first subscriber unit; wherein said network interface exchange is configured to perform the combination of sampled information signals sequentially;

wherein said call request signal comprises a subscriber identification signal associated with said first subscriber unit, said processor further being configured to assign said first sampled information signal to the repetitive slot position corresponding to said first of [RF subscriber channel] said transmit channel bit streams at least partially on the basis of said subscriber identification signal;

[(iii)] (*d*)a remote telephone exchange [is] associated with said first destination node and [is] located distal from said network interface exchange; wherein said remote telephone exchange produces said first subscriber signal based on said extracted first sampled information signal; wherein said remote telephone exchanges includes:

a master telephone exchange configured to generate a first inter-exchange signal on the basis of said first extracted information signal and said subscriber identification signal;

a master transceiver configured to transmit said inter-exchange signal over an inter-exchange channel; and a slave telephone exchange for providing said first subscriber signal in response to receipt of said inter-exchange signal over said inter-exchange channel.

2. A system for processing information signals received from trunk lines for transmission over a plurality of RF subscriber channels, comprising:

(a) a first subscriber unit;

(b) a network interface exchange configured to sample said received information signals and combine said sampled information signals into one or more multiplexed transmit channel bit streams, said network interface exchange including:

(i) a processor configured to assign a first of said sampled information signals from one of said trunk lines to an available repetitive slot of a first of said transmit channel bit streams; and (ii) a transmitter configured to transmit a forward interface signal over a network interface channel in response to said first transmit channel bit stream;

(c) a first destination node, in RF communication with said network interface exchange over said network interface channel, configured to extract said first sampled information signal from said forward interface signal and produce a first subscriber signal, and to route reverse link signals from said first subscriber unit to a second destination node, said first destination node being associated with a call request signal received over said one trunk line and including:

(i) a transmitter configured to transmit said first subscriber signal over a first of said RF subscriber channels to said first subscriber unit; and (d) a remote telephone exchange *that* is associated with said first destination node; is located distal from said network interface exchange and; produces said first subscriber signal based on said extracted first sampled information signal;

wherein said processor is configured to perform the assignment dynamically;

wherein said available slot position is associated with a first of said RF subscriber channels associated with said first subscriber unit; and wherein said network interface exchange is configured to perform the combination of sampled information signals sequentially;

wherein said call request signal comprises a subscriber identification signal associated with said first subscriber unit, said processor further being configured to assign said first sampled information signal to the repetitive slot position corresponding to said first of [RF subscriber channel] said transmit channel bit streams at least partially on the basis of said subscriber identification signal;

wherein said remote telephone exchange includes:

a master telephone exchange configured to generate a first inter-exchange signal on the basis of said first extracted information signal and said subscriber identification signal; and a master transceiver configured to transmit said inter-exchange signal over an inter-exchange channel;

wherein said remote telephone exchange further includes a slave telephone exchange for providing said first subscriber signal in response to receipt of said inter-exchange signal over said inter-exchange channel;

wherein said remote telephone exchange includes a plurality of slave exchanges, said master telephone exchange including a subscriber identification map for associating each of said slave exchanges with one or more of said RF subscriber channels; and wherein a first of said slave telephone exchanges is selected in accordance with said subscriber identification map to serve as a relay between said master exchange and a second slave exchange associated with said first RF subscriber channel;

wherein said first slave telephone exchange is configured to forward said first inter-exchange signal to said second slave exchange, said first slave telephone exchange including a transmitter configured to transmit a second inter-exchange signal over a second inter-exchange channel to said second slave telephone exchange; and wherein said second slave exchange is configured to provide said first subscriber signal on the basis of said second inter-exchange signal received from said first slave telephone exchange.

3. A system for processing information signals received from trunk lines for transmission over a plurality of RF subscriber channels, comprising:

(a) a first subscriber unit;

(b) a network interface exchange configured to sample said received information signals and combine said sampled information signals into one or more multiplexed transmit channel bit streams, said network interface exchange including:

(i) a processor configured to assign a first of said sampled information signals from one of said trunk lines to an available repetitive slot of a first of said transmit channel bit streams; and (ii) a transmitter configured to transmit a forward interface signal over a network interface channel in response to said first transmit channel bit stream; and (c) a first destination node, in RF communication with said network interface exchange over said network interface channel, configured to extract said first sampled information signal from said forward interface signal and produce a first subscriber signal, and to route reverse link signals from said first subscriber unit to a second destination node, said first destination node being associated with a call request signal received over said one trunk line and including:

(i) a transmitter configured to transmit said first subscriber signal over a first of said RF subscriber channels to said first subscriber unit;

(d) a remote telephone exchange [is] associated with said first destination node and [is] located distal from said network interface exchange; wherein said remote telephone exchange produces said first subscriber signal based on said extracted first sampled information signal;

wherein said processor is configured to perform the assignment dynamically; wherein said available slot position is associated with a first of said RF subscriber channels associated with said first subscriber unit; wherein said network interface exchange is configured to perform the combination of sampled information signals sequentially;

wherein said call request signal comprises a subscriber identification signal associated with said first subscriber unit, said processor further being configured to assign said first sampled information signal to the repetitive slot position corresponding to said first of [RF subscriber channel] said transmit channel bit streams at least partially on the basis of said subscriber identification signal; and wherein said first subscriber unit is configured to receive and process said first subscriber signal to replicate the first information signal received from said one trunk line.

4. A system for processing information signals received from trunk lines for transmission over a plurality of RF subscriber channels, comprising:

(a) a first subscriber unit;

(b) a network interface exchange configured to sample said received information signals and combine said sampled information signals into one or more multiplexed transmit channel bit streams, said network interface exchange including:

(i) a processor configured to assign a first of said sampled information signals from one of said trunk lines to an available repetitive slot of a first of said transmit channel bit streams; and (ii) a transmitter configured to transmit a forward interface signal over a network interface channel in response to said first transmit channel bit stream; and (c) a first destination node, in RF communication with said network interface exchange over said network interface channel, configured to extract said first sampled information signal from said forward interface signal and produce a first subscriber signal, and to route reverse link signals from said first subscriber unit to a second destination node, said first destination node being associated with a call request signal received over said one trunk line and including:

(i) a transmitter configured to transmit said first subscriber signal over a first of said RF subscriber channels to said first subscriber unit;

wherein said processor is configured to perform the assignment dynamically;

wherein said available slot position is associated with a first of said RF subscriber channels associated with said first subscriber unit;

(d) a remote telephone exchange [is] associated with said first destination node and [is] located distal from said network interface exchange;

wherein said network interface exchange is configured to perform the combination of sampled information signals sequentially;

wherein said remote telephone exchange produces said first subscriber signal based on said extracted first sampled information signal; and wherein said processor is further configured to assign said sampled information signals other than said first sampled information signal to repetitive slot positions corresponding to RF subscriber channels associated with call request signals received over said trunk lines, said network interface exchange including a slot memory configured to store said repetitive slot position assignments.

5. A system for processing information signals received from trunk lines for transmission over a plurality of RF subscriber channels, comprising:

(a) a first subscriber unit;

(b) a network interface exchange configured to sample said received information signals and combine said sampled information signals into one or more multiplexed transmit channel bit streams, said network interface exchange including:

(i) a processor configured to assign a first of said sampled information signals from one of said trunk lines to an available repetitive slot of a first of said transmit channel bit streams; and (ii) a transmitter configured to transmit a forward interface signal over a network interface channel in response to said first transmit channel bit stream; and (c) a first destination node, in RF communication with said network interface exchange over said network interface channel, configured to extract said first sampled information signal from said forward interface signal and produce a first subscriber signal, and to route reverse link signals from said first subscriber unit to a second destination node, said first destination node being associated with a call request signal received over said one trunk line and including:

[(iii)] (*i*)a transmitter configured to transmit said first subscriber signal over a first of said RF subscriber channels to said first subscriber unit;

*wherein said first destination node comprises a remote telephone exchange, and is further configured to route said reverse link signals to said second destination node along a path excluding said network interface exchange;*

[(iv)] (*d*)a plurality of subscriber units, each of said subscriber units being configured to produce a reverse subscriber signal and convert the reverse subscriber signal generated thereby into a sampled reverse subscriber signal;

[(d) a remote telephone exchange is further configured to produce a receive channel bit stream by assigning each of said sampled reverse subscriber signals received over said associated RF subscriber channels to a repetitive slot position in said receive channel bit stream;]

[wherein said first destination node comprises a remote telephone exchange, and is further configured to route said reverse link signals to said second destination node along a path excluding said network interface exchange;]

wherein each of said subscriber units includes a transmitter configured to transmit its sampled reverse subscriber signal over one of said RF subscriber channels associated with the subscriber unit; [and]

*wherein said remote telephone exchange is further configured to produce a receive channel bit stream by assigning each of said sampled reverse subscriber signals received over said associated RF subscriber channels to a repetitive slot position in said receive channel bit stream; and* wherein said remote telephone exchange includes a transmitter configured to transmit said receive channel bit stream to said network interface exchange over a reverse interface channel, said network interface exchange further being configured to extract the separate sampled reverse subscriber signal from the receive channel bit stream and generate the reverse subscriber signals from the extracted sampled reverse subscriber signals for transmission over said telephone trunk lines.

6. A method for processing information signals received from at least one telephone trunk line for transmission over a plurality of RF subscriber channels, comprising the steps of:

sampling the received information signals;

combining the sampled information signals into one or more multiplexed transmit channel bit streams;

dynamically assigning a first of said sampled information signals from said at least one trunk line to an available repetitive slot position of a first of said transmit channel bits streams provided to a destination node associated with a call request signal received over said at least one trunk line, wherein each call request signal has accompanied therewith a subscriber identification signal associated with [said] *a* first subscriber unit wherein said available slot position is associated with a first of said RF subscriber channels associated with said first subscriber unit;

wherein the repetitive slot position corresponds to said first RF subscriber channel at least partially on the basis of said subscriber identification signal;

transmitting a forward interface signal to said destination node over an RF network interface channel in response to the multiplexed channel bit stream, said destination node being located distal to said at least one trunk line;

extracting, at said destination node, the first sampled information signal from said forward interface signal and generating a first subscriber signal;

transmitting said first subscriber signal over [a] *said* first of said RF subscriber channels to [a] *said* first subscriber unit;

generating, within a master telephone exchange, a first inter-exchange signal on the basis of said first extracted information signal and said subscriber identification signal;

transmitting said inter-exchange signal over an inter-exchange channel; and within a slave telephone exchange, providing said first subscriber signal in response to receipt of said inter-exchange signal over said inter-exchange channel.

7. A method for processing information signals received from at least one telephone trunk line for transmission over a plurality of RF subscriber channels, comprising the steps of:

sampling the received information signals;

combining the sampled information signals into one or more multiplexed transmit channel bit streams;

dynamically assigning a first of said sampled information signals from said at least one trunk line to an available repetitive slot position of a first of said transmit channel bits streams provided to a destination node associated with a call request signal received over said at least one trunk line wherein each call request signal has accompanied therewith a subscriber identification signal associated with [said] *a* first subscriber unit; wherein the repetitive slot position corresponds to *a first of* said [first] RF subscriber [channel] *channels* at least partially on the basis of said subscriber identification signal wherein said available slot position is associated with [a] *said* first of said RF subscriber channels associated with said first subscriber unit;

transmitting a forward interface signal to said destination node over an RF network interface channel in response to the multiplexed channel bit stream, said destination node being located distal to said at least one trunk line;

extracting, at said destination node, the first sampled information signal from said forward interface signal and generating a first subscriber signal; and transmitting said first subscriber signal over [a] *said* first of said RF subscriber channels to [a] *said* first subscriber unit;

generating, within a master telephone exchange, a first inter-exchange signal on the basis of said first extracted information signal and said subscriber identification signal;

transmitting said inter-exchange signal over an inter-exchange channel;

utilizing a subscriber identification map to associate each of a plurality of slave telephone exchanges with one or more of said RF subscriber channels;

selecting a first of said slave telephone exchanges, in accordance with said subscriber identification map, to serve as a relay between said master exchange and a second slave exchange associated with said first RF subscriber channel;

within said first slave telephone exchange, generating a second inter-exchange signal on the basis of said first inter-exchange signal, and transmitting said second inter-exchange signal over a second inter-exchange channel to said second slave telephone exchange; and within a second slave exchange, providing said first subscriber signal on the basis of said second inter-exchange signal.

8. A method for processing information signals received from at least one telephone trunk line for transmission over a plurality of RF subscriber channels, comprising the steps of:

sampling the received information signals;

combining the sampled information signals into one or more multiplexed transmit channel bit streams;

dynamically assigning a first of said sampled information signals from said at least one trunk line to an available repetitive slot position of a first of said transmit channel bits streams provided to a destination node associated with a call request signal received over said at least one trunk line wherein each call request signal has accompanied therewith a subscriber identification signal associated with [said] *a* first subscriber unit, wherein said available slot position is associated with a first of said RF subscriber channels associated with said first subscriber unit;

assigning said first sampled information signal to the repetitive slot position corresponding to said first RF subscriber channel at least partially on the basis of said subscriber identification signal;

transmitting a forward interface signal to said destination node over an RF network interface channel in response to the multiplexed channel bit stream, said destination node being located distal to said at least one trunk line;

extracting, at said destination node, the first sampled information signal from said forward interface signal and generating a first subscriber signal;

transmitting said first subscriber signal over [a] *said* first of said RF subscriber channels to [a] *said* first subscriber unit; and within said first subscriber unit, receiving and processing said first subscriber signal to replicate the first information signal received from said one trunk line.

9. A method for processing information signals received from at least one telephone trunk line for transmission over a plurality of RF subscriber channels, comprising the steps of:

sampling the received information signals;

combining the sampled information signals into one or more multiplexed transmit channel bit streams;

dynamically assigning a first of said sampled information signals from said at least one trunk line to an available repetitive slot position of a first of said transmit channel bits streams provided to a destination node associated with a call request signal received over said at least one trunk line wherein said available slot position is associated with a first of said RF subscriber channels associated with [said] *a* first subscriber unit;

transmitting a forward interface signal to said destination node over an RF network interface channel in response to the multiplexed channel bit stream, said destination node being located distal to said at least one trunk line;

extracting, at said destination node, the first sampled information signal from said forward interface signal and generating a first subscriber signal;

transmitting said first subscriber signal over [a] *said* first of said RF subscriber channels to [a] *said* first subscriber unit;

assigning said sampled information signals other than said first sampled information signal to repetitive slot positions corresponding to RF subscriber channels associated with call request signals received over said trunk lines;

storing said repetitive slot position assignments; and referring to said stored repetitive slot positions to provide additional slot assignments in response to additional call request signals.

10. A method for processing information signals received from at least one telephone trunk line for transmission over a plurality of RF subscriber channels, comprising the steps of:

sampling the received information signals;

combining the sampled information signals into one or more multiplexed transmit channel bit streams;

dynamically assigning a first of said sampled information signals from said at least one trunk line to an available repetitive slot position of a first of said transmit channel bits streams provided to a destination node associated with a call request signal received over said at least one trunk line;

transmitting a forward interface signal to said destination node over an RF network interface channel in response to the multiplexed channel bit stream, said destination node being located distal to said at least one trunk line;

extracting, at said destination node, the first sampled information signal from said forward interface signal and generating a first subscriber signal;

transmitting said first subscriber signal over a first of said RF subscriber channels to a first subscriber unit;

wherein said available slot position is associated with [a] *said* first of said RF subscriber channels associated with said first subscriber unit;

within each of a plurality of subscriber units, generating a reverse subscriber signal and converting the reverse subscriber signal into a sampled reverse subscriber signal;

transmitting each of said sampled reverse subscriber signals over one of said RF subscriber channels;

providing a receive channel bit stream by assigning each of said sampled reverse subscriber signals received over said associated RF subscriber channels to a repetitive slot position in said receive channel bit stream;

transmitting said receive channel bit stream to said network interface exchange over a reverse interface channel; and segregating the sampled reverse subscriber signals from the receive channel bit stream and recovering the reverse subscriber signals from the sampled reverse subscriber signals for transmission over said telephone trunk lines.

11. A method for processing information signals received from at least one telephone trunk line for transmission over a plurality of RF subscriber channels, comprising the steps of:

sampling the received information signals;

combining the sampled information signals into one or more multiplexed transmit channel bit streams;

assigning a first of said sampled information signals from said at least one trunk line to an available repetitive slot position of a first of said transmit channel bits streams provided to a destination node associated with a call request signal received over said at least one trunk line;

transmitting a forward interface signal to said destination node over an RF network interface channel in response to the multiplexed channel bit stream, said destination node being located distal to said at least one trunk line;

extracting, at said destination node, the first sampled information signal from said forward interface signal and generating a first subscriber signal; and transmitting said first subscriber signal over a first of said RF subscriber channels to a first subscriber unit; and routing reverse link signals from said first subscriber unit to a second destination node;

wherein the step of routing includes the substep of choosing a path excluding said network interface channel.

12. A method for processing information signals received from at least one telephone trunk line for transmission over a plurality of RF subscriber channels, comprising the steps of:

sequentially sampling the received information signals;

combining the sampled information signals into one or more multiplexed transmit channel bit streams;

assigning a first of said sampled information signals from said at least one trunk line to an available repetitive slot position of a first of said transmit channel bits streams provided to a destination node associated with a call request signal received over said at least one trunk line;

transmitting a forward interface signal to said destination node over an RF network interface channel in response to the multiplexed channel bit stream, said destination node being located distal to said at least one trunk line;

extracting, at said destination node, the first sampled information signal from said forward interface signal and generating a first subscriber signal wherein the step of generating said first subscriber signal is based on said extracted first sampled information signal; and transmitting said first subscriber signal over a first of said RF subscriber channels to a first subscriber unit;

wherein the step of generating said first subscriber signal is based on said extracted first sampled information signal.

* * * * *